United States Patent
Sokol et al.

(10) Patent No.: US 6,658,428 B2
(45) Date of Patent: Dec. 2, 2003

(54) REPRESENTATION OF TECHNICAL CONTENT USING OBJECT-ORIENTED ABSTRACTION OF MEANING

(75) Inventors: Dan Z. Sokol, Dayton, OH (US); Igor K. Berkovich, Dayton, OH (US); Oleg V. Dashevsky, Cincinnati, OH (US)

(73) Assignee: Cohesia Corporation, Dayton, OH (US)

(*) Notice: Subject to any disclaimer, the term of this patent is extended or adjusted under 35 U.S.C. 154(b) by 0 days.

(21) Appl. No.: 10/144,104

(22) Filed: May 13, 2002

(65) Prior Publication Data

US 2003/0014424 A1 Jan. 16, 2003

Related U.S. Application Data

(63) Continuation of application No. 09/349,753, filed on Jul. 8, 1999, now Pat. No. 6,405,211.

(51) Int. Cl.[7] .............................................. G06F 17/30
(52) U.S. Cl. ........................... 707/103; 707/5; 707/3
(58) Field of Search ........................ 707/10, 3, 5, 103

(56) References Cited

U.S. PATENT DOCUMENTS

| | | | |
|---|---|---|---|
| 4,833,594 A | * 5/1989 | Familetti et al. ............... | 713/1 |
| 5,261,080 A | 11/1993 | Khoyi et al. ................ | 395/500 |
| 5,293,585 A | 3/1994 | Morita ........................ | 395/52 |
| 5,333,237 A | 7/1994 | Stefanopoulos et al. ...... | 395/12 |
| 5,424,947 A | 6/1995 | Nagao et la. ................ | 364/419 |
| 5,504,890 A | 4/1996 | Sanford ...................... | 395/600 |
| 5,530,853 A | 6/1996 | Schell et al. ................. | 395/600 |
| 5,550,746 A | 8/1996 | Jacobs ................... | 364/479.01 |
| 5,689,417 A | 11/1997 | Shockley et al. ........ | 364/401 R |
| 5,701,466 A | 12/1997 | Yong et al. .................. | 395/611 |
| 5,727,204 A | 3/1998 | Greene, VII ................ | 395/613 |
| 5,737,739 A | 4/1998 | Shirley et al. .............. | 707/512 |

(List continued on next page.)

OTHER PUBLICATIONS

Sokol, *Specification Management System for Concurrent Engineering*, Made available at National Science Foundation Conference, Sep. 1996.

(List continued on next page.)

Primary Examiner—Jean M. Corrielus
(74) Attorney, Agent, or Firm—Wood, Herron & Evans, LLP

(57) ABSTRACT

An object-based, semantic representation for documents as information containers, using a controlled taxonomy, facilitates the extraction of meaning from such information containers to provide high-level, automated document interpretation. The high-level functions that are enabled include automated filtering of an information container in accordance with the controlled taxonomy and a set of conditions, to produce a result having only those information objects that are applicable under the specified set of conditions. These functions further include automated combination of information objects which comprise the information containers, to build a composite information container that reflects combined meaning of the associated documents, and automated handling of references from one information container to another.

27 Claims, 19 Drawing Sheets

U.S. PATENT DOCUMENTS

| | | | | |
|---|---|---|---|---|
| 5,752,021 | A | | 5/1998 | Nakatsuyama et al. ...... 395/605 |
| 5,765,137 | A | | 6/1998 | Lee ................................ 705/7 |
| 5,778,378 | A | | 7/1998 | Rubin ......................... 707/103 |
| 5,799,268 | A | | 8/1998 | Boguraev ....................... 704/9 |
| 5,956,508 | A | | 9/1999 | Johnson et al. ............. 395/683 |
| 5,970,476 | A | * | 10/1999 | Fahey .......................... 705/28 |
| 5,980,096 | A | | 11/1999 | Thalhammer-Reyero .... 707/100 |
| 5,983,237 | A | * | 11/1999 | Jain et al. ................. 707/104.1 |
| 6,061,690 | A | | 5/2000 | Nori et al. ................... 707/103 |
| 6,083,276 | A | | 7/2000 | Davidson et al. .............. 717/1 |
| 6,105,022 | A | | 8/2000 | Takahashi et al. ............. 707/3 |
| 6,112,207 | A | | 8/2000 | Nori et al. ................... 707/101 |
| 6,112,210 | A | | 8/2000 | Nori et al. ................... 707/103 |
| 6,154,738 | A | | 11/2000 | Call ............................... 707/4 |
| 6,169,987 | B1 | * | 1/2001 | Knoblock et al. ............ 707/10 |
| 6,182,029 | B1 | | 1/2001 | Friedman ........................ 704/9 |
| 6,192,364 | B1 | | 2/2001 | Baclawski .................... 707/10 |
| 6,226,632 | B1 | | 5/2001 | Takahashi et al. ............. 707/3 |
| 6,249,844 | B1 | | 6/2001 | Schloss et al. .............. 711/122 |
| 6,263,332 | B1 | | 7/2001 | Nasr et al. ...................... 707/5 |
| 6,405,211 | B1 | | 6/2002 | Sokol et al. ................ 707/103 |

OTHER PUBLICATIONS

Sokol, *The Specification Definition Language,* Referenced in Phase II Final Report of Nov. 1997.

Society of Automotive Engineers, Inc., *Titanium Alloy, Bars, Wire, Forgings, and Rings,* Aerospace Material Specification, AMS 4965G, May 1996.

Sokol et al., *Concurrent Engineering in the Materials Industry: A case study in the application of information technology.,* Fourth International Conference of Management of Technology, Institute of Industrial Engineers (1994).

Sokol et al., *Integrating STEP and SGML for Concurrent Engineering,* CALS 95 International Expo (1995).

Renaissance Engineering, Inc., *Concurrent Engineering Design System for High–Technology Material Suppliers, Phase II Final Report,* National Science Foundation, Nov. 1997.

Renaissance Engineering, Inc., *Electronic Specification Interchange, Phase I Final Report,* Department of Commerce National Institute of Standards & Technology, Jan. 1996.

Renaissance Engineering, Inc., *Computer–Assisted Document Interpretation,* SBIR Phase I Proposal to National Science Foundation, Jun. 1998.

* cited by examiner

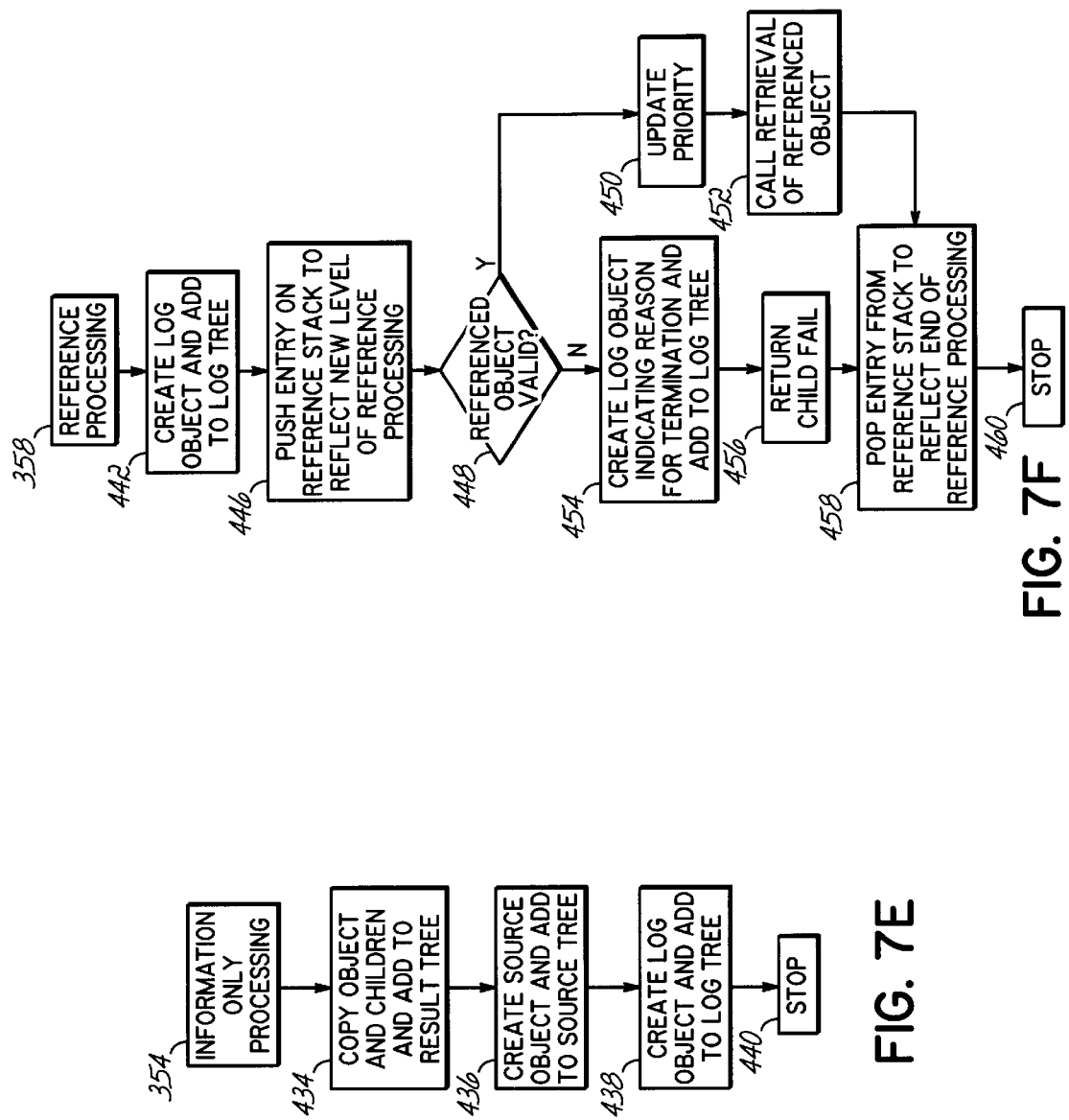

REPRESENTATION OF TECHNICAL CONTENT USING OBJECT-ORIENTED ABSTRACTION OF MEANING

CROSS-REFERENCE TO RELATED APPLICATIONS

This application is a continuation of U.S. patent application Ser. No. 09/349,753, filed Jul. 8, 1999, the entirety of which is hereby incorporated by reference herein now U.S. Pat. No. 6,405,211.

FIELD OF THE INVENTION

The present invention relates to control of process and material specifications of the kind used by a manufacturing company.

BACKGROUND OF THE INVENTION

In a typical manufacturing company, an individual part or order can be defined by anywhere from one to fifteen or more different specifications covering issues such as the material properties, processing methods, test acceptance limits, etc. Each specification can cross-reference several additional specifications. For practical use in the design and manufacture of a product, personnel from all departments need to collect and reference the requirements of all the applicable specifications.

Specifications are basically presentations of instructions including numeric data, text and graphics serving the purpose of supporting and justifying the quantitative information. While there are multiple standards for the exchange of graphical data and purchasing data (e.g., IGES for part drawing information and EDI for purchase order and other business information), there is as yet no similar defined format for the content of specifications. Thus, an author of a specification can include requirements in any form. The values can appear in a textual paragraph, a graphical table, or multiple locations within the document. As a result, determining the various requirements contained in a product's specifications requires personnel to wade through different formats and approaches to content.

Most methods for managing standards and specifications focus on text retrieval and document management. However, having the data in electronic format such as a word processing file has not substantially enhanced the use of these documents. For example, to find relevant material in an electronic text file for a specification, one must apply some sort of keywords to help identify the subject, a process which is subject to the vagaries of keyword searching in other contexts (e.g., the proliferation of synonyms in natural language, inability to search graphically-expressed content).

Another method involves reading and manually extracting quantitative values from the specification and storing these values in a simple database management system. However, a typical specification is a dynamic document than cannot be forced into a fixed tabular structure of a relational database. For example, specifications have an irregular structure with many requirements depending upon a variety of conditions, such as the dimensions of the product, the type of material, intended application, etc. Furthermore, the various quantitative values can be described in different ways. That is, in some cases a value such as a tolerance may be provided as a range of values, in other cases it may be described as a formula which depends upon a condition. There is also a substantial interpretation problem in that the specifications, because they are written in natural language, are often subject to conflicting interpretations.

The problems described above with respect to managing manufacturing specifications, have also been experienced in the context of handling other collections of richly formatted documents. A recently-introduced approach to managing structured documents is known as the Extensible Markup Language (XML), an offshoot of the Hypertext Markup Language (HTML) that has become the popular form for formatting content on the Internet There are emerging applications for XML in e-commerce and other Internet-related applications. Most of these applications operate upon documents in the XML format in order to automatically interpret the document in a meaningful way. To date, however, the extraction of meaning from XML formatted documents has not been demonstrated.

SUMMARY OF THE INVENTION

The present invention provides an object-based, semantic representation for documents as information containers, using a controlled taxonomy, and methods for extracting meaning from such information containers to provide high-level, automated document interpretation These functions include the automated filtering of an information container in accordance with the controlled taxonomy and a set of conditions, to produce a result having only those information objects that are applicable under the specified set of conditions. These functions further include automated combination of information objects which comprise the information containers, to build a composite information container that reflects combined meaning of the associated documents, and automated handling of references from one information container to another.

Specifically, in one aspect, the invention features a process of assimilating a plurality of information containers each dealing with attributes of a physical thing, system or methodology, to generate a peer information container. The information containers each comprise a plurality of information objects, each identifying an attribute and a value, value range or description of the attribute, using potentially different structures These objects are parsed, and pairs of objects identifying common attributes are identified. These pairs of objects are then combined, even if they have different structures, by combining the values, value ranges and/or descriptions of the common attribute, to produce new information objects representing the combination of the original pair. The new peer information container is constructed of one or more combined objects and/or objects from the input containers that could not be combined.

In the disclosed embodiment of this aspect of the invention, the new peer information container uses the same format as the input containers, and is utilized in generation of additional new information containers by the same process of assimilation.

In another aspect, the invention features a method of filtering an information container identifying attributes of a physical thing, system or methodology. Here again, the input information container comprises a plurality of information objects, some of which identify an attribute and a value, value range or description of the attribute. Notably, other objects identify an applicability condition for objects. The filtering process involves evaluating the applicability condition to determine applicability of one or more information objects of the information container, and filtering out information objects evaluated to be inapplicable, so that a peer information container can be generated that comprises only information objects determined to be applicable.

In a third aspect, the invention features a method of evaluating a first information container identifying attributes of a physical thing, system or methodology, that includes a reference to a second information container identifying further attributes of a physical thing, system or methodology. In this method, a peer information container is generated from the first and second information containers by obtaining information objects of the second information container as well as information objects from the first information container, and including the information objects from the first and second information container in the peer information container.

In the disclosed specific embodiment, the objects in the first information container include context objects associated with the reference, to provide a context for the reference, used when determining which information objects of the second information container have been referenced.

In a further aspect, the invention features a method of storing a semantic representation of a document identifying attributes of a physical thing, system or methodology, using a controlled taxonomy The semantic representation includes a plurality of information objects, at least some objects identifying an attribute and a value, value range or description for the attribute, and other objects providing a context for the attributes that are identified by objects.

In the disclosed particular embodiment, the value defined by an object may be a numeric value or a predefined text value. Objects may define a range, in which case additional objects are used as endpoint objects defining endpoints of the range. Each object defining a value has an object operator property defining an operator to be applied to the value, which may be one of equal (=) or not equal (≠), or in the case of endpoint objects, greater than (>), greater than or equal (≧), less than (<), or less than or equal (≦).

In this embodiment, there are further objects that define an applicability condition, so that a value, value range or description identified by an object can be made conditional based on the success or failure of the applicability condition. There may be a group of such conditions, in which case one object represents the group of conditions and further objects define each of the conditions. The object representing the group has a child logic property indicating a logical relationship between the conditions that must be met for the applicability condition to be met.

In the disclosed embodiment, the objects include properties characterizing the object and/or an attribute represented by the object, and each object is a member of an object class, objects in a common class having common properties. The objects are arranged in an hierarchy, in which there are parent objects and child objects; properties of a parent object include pointers to the child objects. In this embodiment, the assimilation procedure includes determining whether two or more of child objects identify a common attribute, and if so, combining values, value ranges and/or descriptions of the common attribute identified by the child objects, to produce a new information object for the attribute identified by the child object. Furthermore, in this embodiment the parent objects have a child logic property indicating a logical relationship between their child objects; the child logic is taken into account when assimilating two information containers by determining an appropriate combination, if any, of the child objects that is consistent with the child logic property.

In the disclosed embodiment, some of the objects may be meaning objects, which define meanings for other objects. In this embodiment, only objects with compatible meanings are combined.

While principles of the present invention are applicable to many environments, in the disclosed environment the information objects are formatted in accordance the Extensible Markup Language (XML), and the information containers incorporate an XML document type definition (DTD) to enable their use in other XML applications. Other applications and advantages shall be made apparent from the following description.

BRIEF DESCRIPTION OF THE DRAWING

The accompanying drawings, which are incorporated in and constitute part of this specification, illustrate embodiments of the invention and, together with a general description of the invention given above, and the detailed description of the embodiments given below, serve to explain the principles of the invention.

FIGS. 7A, 7B, 7C, 7D, 7E, 7F, 7G, 7H, 7I, 7J, 7K and 7L are flow charts of retrieval processing an object having a DO NOT PROCESS, CHILDREN ONLY, REGULAR/PREPARATION, CHILD DEPENDENT, INFORMATION ONLY, REFERENCE, FORMULA, RULE, ACTION, DOCUMENT, PREPARATION or UNKNOWN processing flag, respectively;

DETAILED DESCRIPTION OF SPECIFIC EMBODIMENTS

Figure 1:
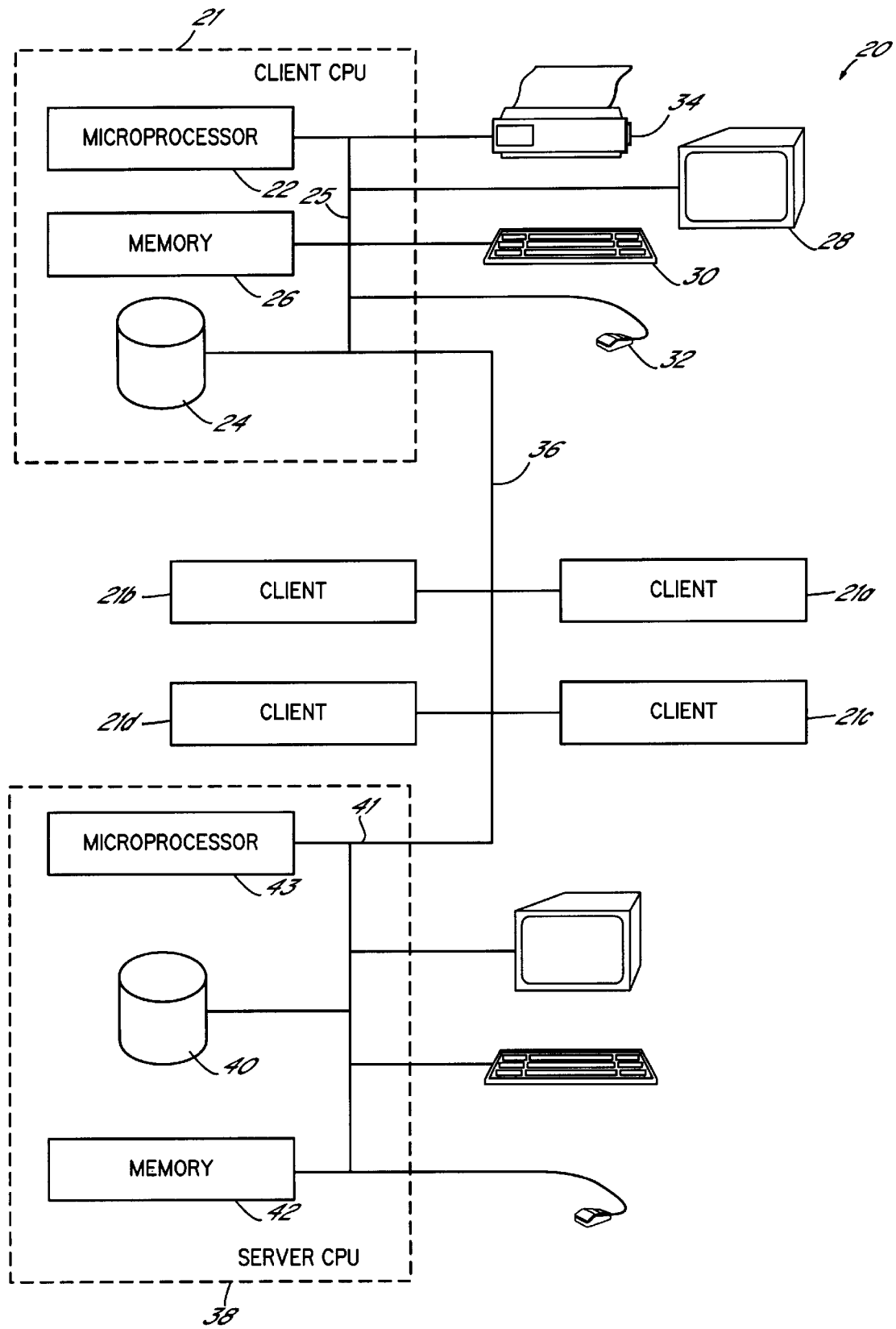
FIG. 1 is a block diagram of a computer system for carrying out the invention.

Referring to FIG. 1, computer system 20 for carrying out principles of the present invention, comprises a first or client CPU 21 and a second or server CPU 38 connected for communication over a computer network. Client CPU 21 includes typical elements found in a computer system. These elements include a microprocessor 22 for manipulating data in response to stored programs. Programs and data are stored in a hard disk drive accessible to microprocessor 22 over a system bus 25. Also connected to system bus 25 is a memory 26 utilized for rapid access storage of data and programs being used by microprocessor 22. Information produced by microprocessor 22 is output via system bus 25 to a monitor 28. Monitor 28 is controlled to implement a graphical user interface for operator input and output of data, for example, the user interface provided by the Windows operating system available from Microsoft Corporation of Redmond, Wash. Data is received by microprocessor 22 via user input devices including keyboard 30 connected to system bus 25, and a mouse 32 connected to system bus 25. Keyboard 30 and mouse 32 are used in a conventional manner to interact with a graphical user interface on monitor 28 to enter information and control the operation of microprocessor 22. To produce hard copy of data generated by microprocessor 22, a printer 34 is connected to system bus 25, enabling printed output of information from microprocessor 22.

Client CPU 21, as well as peer client CPU's 21a, 21b, 21c, etc., are connected via a network connection 36 to one or more server CPU's such as CPU 38. Client CPU's 21 and the one or more server CPU's interact in a conventional client server manner, utilizing one of a variety of network protocols such as Ethernet, Token Ring or other LAN protocols or a WAN protocol.

Server CPU 38 stores data to be utilized by client CPU's 21 in a relatively large mass storage device such as a hard drive 40. Server CPU 38, or a second server CPU 38, retrieves data from hard drive 40 to be used by microprocessor 22 in a server CPU 22 in performing functions of the present invention Additional client CPU's 21a, 21b, 21c, which are also connection to server CPU 38, have shared access to information stored in hard drive 40, thus permitting multiple computers to utilize the same shared information in carrying out principles of the present invention.

Server CPU 38 is outfitted with conventional elements of a computer system, including hard drive 40, a system bus 41, a memory 42 connected to system bus 41, a microprocessor 43 connection to system bus 41, and other input and output devices as are conventional.

In embodiments where a second server CPU is used, the processing functions described below may be divided between the server CPU's. For example, a first server CPU may be a standard query language (SQL) database server, for providing access to data, and a second server CPU may be a powerful processing CPU for processing accessed data by, for example, performing the retrieval and combining routines described below in response to requests from client CPU's and utilizing database services of the first server CPU. In such an embodiment, the client CPU's may run programs which present a graphical user interface to the system for users. It will be appreciated that other allocations of tasks are possible and within the scope of the present invention; for example, a single server could be used to provide database services as well as retrieval and combining processing. Furthermore, a single CPU could provide database services, retrieval and combining processing, and a graphical user interface, without any use of a network. Each and all of these applications are within the scope contemplated for the invention.

Figure 2:
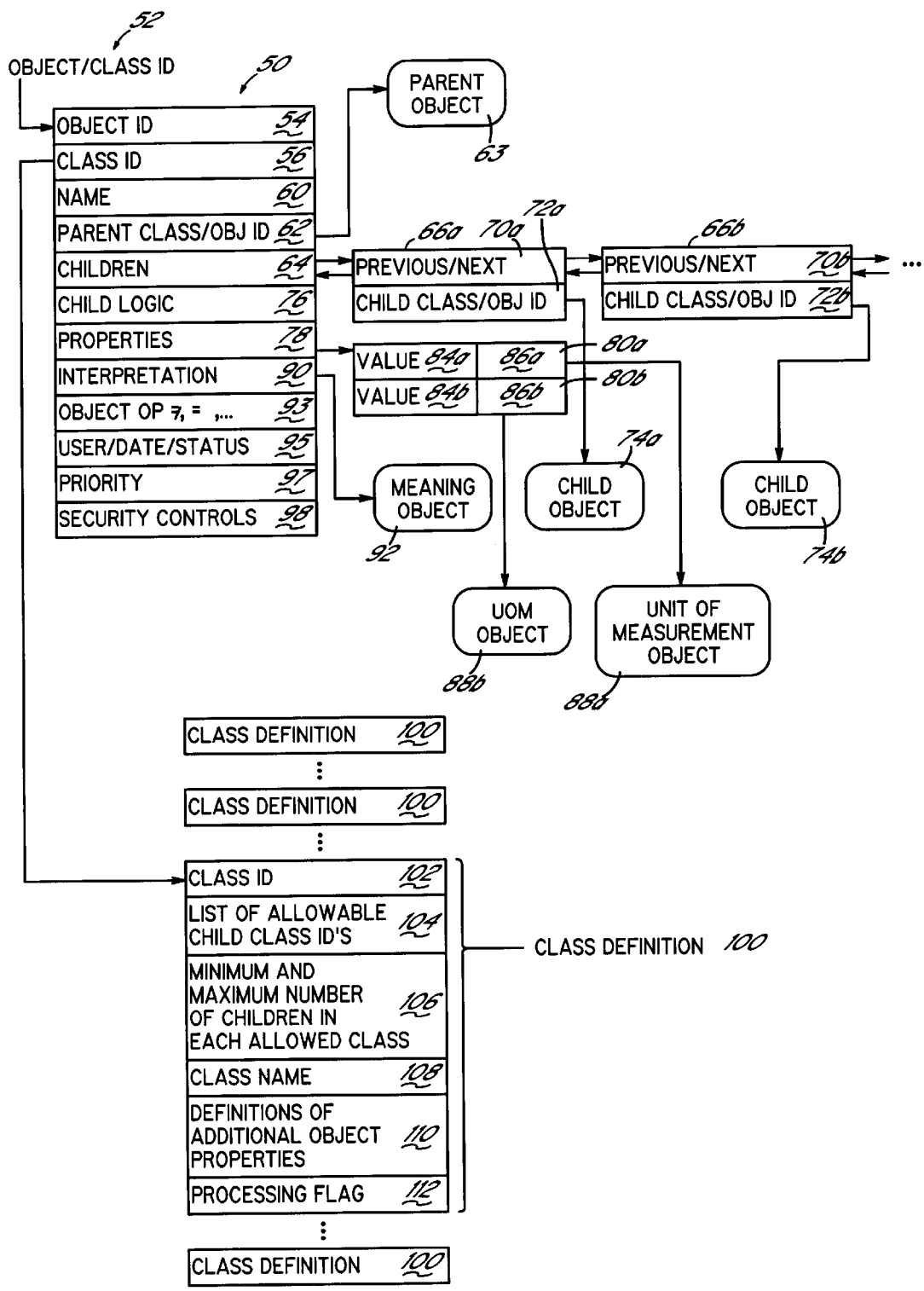
FIG. 2 is a data structure diagram illustrating an object structure used in accordance with the invention.

Referring now to FIG. 2, details of the structure of the arrangement of the objects in the database stored in the computer system 20 of FIG. 1 can be provided. It will be appreciated that a variety of databases may be used to store objects in accordance with principles of the present invention. The database stored by computer system 20 is a relational database, which stores objects that are interrelated in an object based structure, particularly suited to describe technical specifications and information relating to manufactured products. To enable this, the database manages five tables: class definitions, which store the definitions for object classes; class fields, which identifies the additional object properties for each class of object; class children, which identifies the allowable children for each class of objects; object instances, which stores instances of each object; and object field values, which stores the property values for each object. The last two tables are substantially larger than the first three, as they store the actual data for each object.

Objects in this database fall into one of a variety of classes, as will be explored in further detail below with reference to FIG. 3 through FIG. 5. The specific classes defined for the purposes of the present description of the invention, relate to storage of information contained within manufacturing specifications such as those promulgated by the Society of Automotive Engineers (SAE), the American Society for Testing & Materials (ASTM), and other standards organizations which promulgate similar technical documentation. Principles of the present invention, however, are not limited to use in storage documentation of technical documentation such as specifications, but can be extended to storage of a wide variety of other forms of technical information including product descriptions, part descriptions, internal company practices, customer agreements, research data generated in either the hard sciences or medical areas, technical information relevant to business or legal analysis, as well as other applications. To enable migration of methods and principles of the present invention to such other applications, the object classes are defined such that the class of an object, in most or all instances, does not provide a meaning for the object, but rather the meaning for the object is obtained from another object; in such an approach, the object's class only defines its structure, allowing ready migration to other environments where similar structures may be used for different meanings. In each of these various applications, while different object classes may be defined and used, the generalized structure of an object based database and assimilation of technical information into a structure of objects, will remain the same.

FIG. 2 illustrates the specific structure of objects utilized in accordance with the principles of the present invention. The illustration of FIG. 2 is generic to the object structure without regard to the type of information stored by the object, and therefore is applicable to any of the various applications described above and elsewhere throughout this specification As seen in FIG. 2, an object comprises a data structure 50 for storing core properties for the object. The data structure 50 that forms the core of an object, is stored in the computer system 20 at an indexed location. In the embodiment of the invention described herein, data structure 50 is located by reference to a class identifier and object identifier for the specific object that is represented by data structure 50. The object identifier for an object is managed so as to be unique among all objects of the same class, although potentially not unique with respect to objects of other classes. Class identifiers uniquely identify a class of objects that are stored in the database.

To facilitate retrieval and management of objects stored in the database, the core properties 50 for an object may be indexed, according to class identifier and object identifier, using the five tables described above, in a commercially available database program such as the Oracle Version 7.3 Database Engine available from Oracle Corporation. Using a database program of this kind, the object and class identifiers for an object can be used to generate a pointer to the object, such as pointer 52 illustrated in FIG. 2, such that the object can be manipulated.

FIG. 2 illustrates the fields store the core properties 50 for an object. These fields include a field 54 for storing an object identifier, and a field 56 for storing pointer to a class definition. The object and class identifiers stored in these fields correspond to the object and class identifiers used to locate the object. The class identifier 56 also links the objects to a class definition (discussed below) which defines further properties of the object.

The core properties 50 for the object further include fields used to link the object into a hierarchical tree-like structure formed of objects. These fields include a field 62 for storing a pointer to a parent object which is at the next level above the object in the hierarchical structure, and a field 64 for storing a pointer to a list of child objects which are on the next level below the object in the hierarchical structure.

The pointer in field 64 leads to a doubly linked list of data structures 66a, 66b, etc. which identify children of the object. The use of linked list structure permits object to have an unlimited number of children. Each data structure 66a, 66b includes a field 70a, 70b storing 'next' and 'previous' pointers used in navigating through the doubly linked list structure. The 'next' and 'previous' pointers in fields 70a, 70b point to the next and previous data structures 66 in the doubly linked list. The 'previous' pointer in the first data structure 66a in the list points to the core properties 50 for the parent object. The 'next' pointer in the last data structure 66 in the doubly linked list has a NIL value indicating that it is the last data structure in the list.

Each data structure 66 also includes a field 72 for storing a pointer to a child object. The pointer to the child object is in the form of a class identifier and an object identifier which uniquely identify the child object, as discussed above. The pointers in field 72a, 72b lead to child objects 74a, 74b having the same structure as is illustrated in FIG. 2.

The core properties 50 for an object also include a field 76 for storing a child logic parameter for the object. As will be seen in greater detail below with reference to FIG. 3, the child logic parameter is used whenever there is a relationship among the children of an object, to define the nature of that relationship. In particular, the child logic parameter can identify a logical relationship between the children that must exist for a condition represented by the object to be satisfied. In the present embodiment of the invention, the values that are used for the child logic parameter are.

OR—indicates that any of the conditions represented by child objects must be satisfied for the parent object condition to be satisfied.

AND—indicates that all conditions represented by child objects must be satisfied for the parent object condition to be satisfied.

GROUP—indicates that absence of any relationship between the conditions or information represented by child objects and the parent object.

SEQUENCE—indicates that every condition represented by child objects must be satisfied, in the order in which the child objects appear in the list identified by the pointer in field 66. If the conditions represented by the child objects are not satisfied in this order, then the condition represented by the parent object has not been satisfied.

IMPLICATION—indicates that an IF child object in the linked list identified by a pointer in field 66, represents a condition to be tested. If the condition of the IF child object is satisfied, then a THEN child object in the linked list represents the applicable child for the parent object. If the condition represented by the IF child is not satisfied, then an ELSE child of the parent object represents the applicable child for the parent object.

DEPENDENCY—indicates that a FOR child object in the linked list identified by the pointer in field 66, represents a condition to be tested. If the condition of the first child object is satisfied, then a USE child object in the linked list represents the applicable child for the parent object. If the condition represented by the first child is not satisfied, then an OTHERWISE child of the parent object represents the applicable child for the parent object. Implication differs from dependency in that objects having implication child logic are handled differently during retrieval, filtering and combining operations discussed below.

EXCLUSIVE AND—indicates that all conditions represented by child objects must be satisfied for the parent object condition to be satisfied, and that no other conditions can be combined with the specified conditions.

EQUALITY—indicates that all children are equal (may be used to define synonyms, e.g., in the thesaurus rules discussed below with reference to FIG. 260).

CONFLICT—indicates that the children are in conflict.

INCOMPLETE—indicates that there is an incomplete definition. Inserted during retrieval of objects to indicate insufficiently defined information, to block the combination of a set of objects that are incompletely defined.

The core properties 50 for an object further include a pointer in a field 78 which, if used, identifies a linked list of additional properties of the object. Certain classes of objects require additional properties to be completely defined. For these classes of objects, the additional properties are stored in an array that is identified by the pointer in field 78. The array includes a sequence of fields 80a, 80b, etc. each of which provides information about a particular property of the object. Each field 80a, 80b stores an additional property for the object The field may be used to store a data value of any kind, including a pointer to an object, a textual value, or a numeric value. Each field is divided into two subfields as seen at 84a, 84b or 86a, 86b. Subfields 84a, 84b store the value itself, while, for numeric value, the subfields 86a, 86b store a pointer to a unit of measure object 88a, 88b which provides an indication the unit of measure for the value stored that is stored in field 84a, 84b. When an additional property field 80 includes a textual value or a pointer to an object as the additional property in subfield 84, there is no unit of measure identified by subfield 86.

The core properties 50 for an object also include a field 90 for indicating an interpretation or meaning for the object. Where used, field 90 provides information as to how the object is to be interpreted. Typically, field 90 stores a pointer to an object 91 which provides a meaning for the object containing the pointer thereto. Details on the use of interpretation and meaning objects will be provided below with reference to FIG. 3.

The core properties 50 for an object also include an object operator in a field 93. The object operator in field 93 may have the values 'equal' (=), "not equal' ($\neq$). Based upon the interpretation of the object, an object operator of 'equal' may be interpreted as equal (=), greater than or equal ($\geq$) (e.g., if the object represents a minimum endpoint of a range, or less than or equal ($\leq$) (e.g., if the object represents a maximum endpoint of a range. Based upon the interpretation of the object, an object operator of 'not equal' may be interpreted as not equal (≠), greater than (>) (e.g., if the object represents a minimum endpoint of a range), or less than (<) (e.g., if the object represents a maximum endpoint of a range). The object operator in field 92 indicates whether a condition represented by the object is satisfied when a condition the object defines is equal, or not equal, to a current condition being evaluated. The use and interpretation of the object operator in field 93 will be further clarified in the discussion in FIG. 3 that follows.

The core properties 50 further include a field 95 for storing control information such as the name of the user that authored or edited the object, relevant dates of creation or revision, and the status of the object, e.g., ready for approval, approved, or verified through a second approval process.

The core properties 50 also include a field 97 used for identifying a priority of the object. This is a numeric value indicating the relative priority of the object when it is to be combined with other objects. For example, an object in an order override tree can be entered with a highest priority value so that it overrides any other objects during the combine process described below.

The core properties 50 can finally include a field 98 for security controls, which can be used to control access to and revision of the object.

As noted above, the class identifier in field 56 of the core properties 50, is indicative of additional properties of the object that are associated with the class of the object. These additional properties of the object can he obtained from the definition for the class which takes the form shown in FIG. 2. As seen in FIG. 2, each class has an associated definition 100, multiple such definitions being in existence, one for each class. Within each definition is specific information for objects within that class.

All class definitions have a similar format; one class definition is illustrated in detail in FIG. 2. As can be seen, each class definition includes a field 102 for storing an identifier for the class, which is used to locate that class and retrieve the additional information in the class definition 100 In field 104, a class definition provides a list of allowable child class identifiers. The information in field 104 limits the classes of objects that may he made children of the object. This is useful to prevent creation of nonsensical hierarchal tree structures of objects. It is also useful in creating a user interface, so that a user creating an object and establishing children for that object, can be provided with a drop-down list of appropriate child object types (or perhaps allowable structures of children, such as are often used to express a range or shape) to select from. This list of appropriate child types can be obtained by retrieving it from the field 104 in the class definition of the object for which a child is being added A field 106 in the class definition 100 stores a minimum and a maximum number of children that be attached to an object Where multiple classes of children are allowed, field 106 will indicate a minimum and maximum number of children from each allowed class. A field 108 in a class definition 100 provides a textual name for the class The class name provided in field 108 of a class definition 100 can be useful in providing lists of classes and their properties for evaluation or use by a user. A field 110 in a class definition 100 includes definitions of additional properties of objects in that class. As noted above, objects in particular classes may have additional properties which are stored in an array identified by a pointer in field 78 in the core properties 50. The definitions for these additional properties are provided in the field 110 and the class definition, so that each property may be retrieved and its definition evaluated by combining the retrieved property with the definitions in field 110. The definitions for additional object properties in field 110 are provided by identifiers associated with each field 80 of the array of fields.

A final property of an object that bears discussion, is identified by the object's class definition 100, and stored in field 112. This property is known as the processing flag for the object. The processing flag for an object indicates the manner in which the object should be handled when the object is retrieved by the routines described in the following FIGS. The processing flag identifies the relationship between the object and its child objects, and the manner in which the object should be handled during a retrieval and evaluation process discussed below. Particular values for the processing flag are:

CHILDREN ONLY—indicates that during retrieval of the object, the object should be eliminated and in its place, the children of the object should be retrieved.

REGULAR—indicates that the object and its children should be retrieved in a standard fashion as defined by the routines shown in the following FIGS.

CHILD DEPENDENT—indicates that the children of the object should be processed first and the object should not be processed if the conditions identified by the children of the object result in elimination of the children of the object.

REFERENCE—indicates that the object is a reference to another object which provides additional information or context to the referencing object, and should be retrieved in an appropriate manner as defined by the following routines.

FORMULA—indicates that the object represents a formula and should be retrieved in accordance with the special processing defined by the routines provided below.

DO NOT PROCESS—indicates that the object should be copied along with its children without being analyzed during retrieval and combining.

PREPARATION—indicates a reference-type object that should be subjected to regular processing during retrieval, to prevent expansion of the reference as would normally occur.

FOR INFORMATION ONLY—indicates that the object exists only for user information (i.e., storing a comment field for human evaluation), and therefore and is copied without processing during retrieval, as discussed below.

DOCUMENT PROCESSING—indicates that the object should be processed in the regular manner when combining, but should be processed like a CHILDREN ONLY status during retrieval—permits retrieved results to identify a document from which requirements were obtained.

Figure 3:
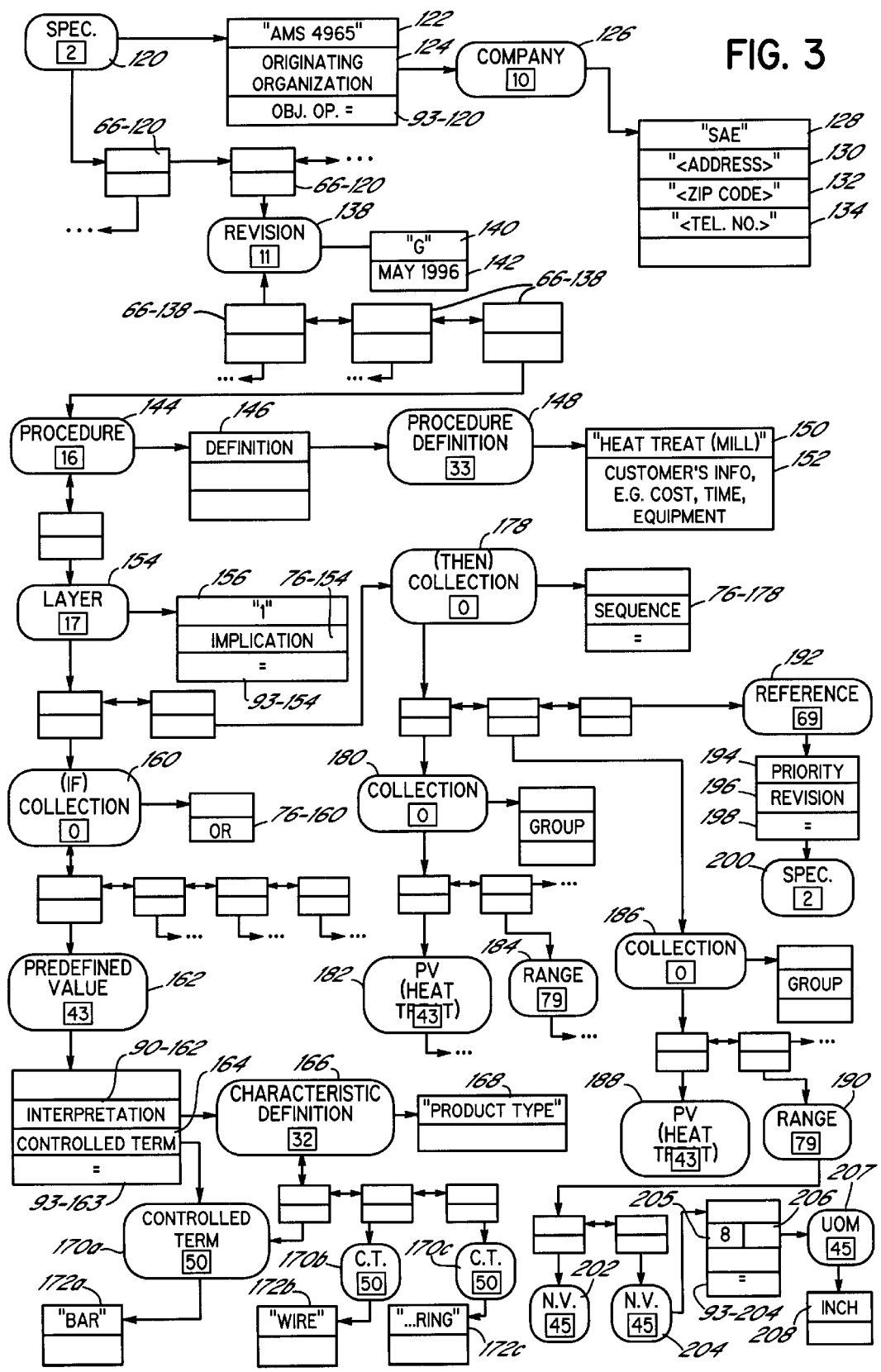
FIG. 3 is a data structure diagram illustrating a exemplary partial tree of objects capturing the meaning of a portion of a technical specification.

Referring now to FIG. 3, use of the object structure described above can be further explained through an exemplary partial tree structure. This exemplary tree structure captures the meaning of a section of text from a material specification. Specifically, text represented by the partial tree structure of objects in FIG. 3 comes from an Aerospace Materials Specification No. AMS 4965, revision G, promulgated by the Society of Automotive Engineers (SAE). The specific text segment illustrated by the partial tree structure in FIG. 3, appears on page 4 of AMS 4965, revision G, as paragraph 3.4 of the specification. This paragraph reads as follows:

3.4 Heat Treatment Bars, wire, forgings and flash welded rings shall be solution heat treated by heating in a suitable atmosphere to 1750° F.±25 (954° C.±14), holding at heat for 1–2hours, and quenching in agitated water and aged by heating to a temperature within the range 900 to 1150° F. (482–621° C.), holding at the selected temperature within ±15° F. (±8° C.) for 4 to 8 hours, and cooling in air Pyrometry shall be in accordance with AMS 2750.

The foregoing quoted paragraph from AMS 4965, revision G, provides extensive information regarding heat treatment of a metal sample including degree ranges, process parameters and specific product forms for which those parameters apply An tree structure of objects can be used to represent this set of parameters and conditions as shown in FIG. 3

Specifically, FIG. 3 illustrates the hierarchy of objects that represents the AMS 4965 specification, and in particular revision G of that specification, procedures in revision G related to heat treatment, and the layers of that procedure that are represented by paragraph 3.4 of the specification as quoted above.

This application provides a complete textual description of the tree structure of objects representing the entirety of AMS specification 4965, including all revisions, all procedures, and all layers of those procedures found in the specification. In the textual form of Appendix A, each line represents a single object, and a tab indent is inserted beneath an object to identify the children of that object. The complete textual description of AMS 4965 spans 58 pages, representing several thousand objects. The complexity of the object structure apparent from Appendix A, reflects the complexity of the AMS 4965 specification, and demonstrates the amount of information that is reflected in the small portions of text that comprise specifications.

The partial hierarchy of objects illustrated in FIG. 3 corresponds to that section of Appendix A starting on page 5 under the procedure heading "Heat Treat (Mill)".

For the purposes of simplicity, objects shown in FIG. 3 are shown with their core properties and additional properties combined together in a single list of properties attached to each object. Furthermore, the properties illustrated in FIG. 3 are only the most interesting properties for the object, i.e. the properties that are most relevant to describing the relationship of the object to other objects and the information conveyed by the object. It will be appreciated that a substantially larger quantity of properties is associated with each of the objects but not illustrated in FIG. 3.

It will also be noted in FIG. 3 that each object, represented by a circle, is associated with an object class identifier, which is an integer number in a circle inside of the circle representing the object. These class identifiers can be used with cross-reference to the table in Appendix B, to confirm the class of each object shown in FIG. 3. It will be appreciated that Appendix B tabulates a substantially number of object classes than are illustrated in FIG. 3. The complete list of object classes in Appendix B includes all other classes that have been defined in accordance with the current embodiment of the invention, to capture information relating to technical specifications. Appendix B identifies, for each object class, its numeric (integer) identifier, a descriptor or name for the class, and the value of the processing flag associated with that class. An index included in Appendix B identifies the processing flag values that are numerically represented in the third column.

Further information regarding object classes may be obtained by reference to Appendix C, which is a table of the names of additional fields utilized by objects in each class Each class that utilizes additional fields, has one or more rows in Appendix C, each row representing one of the additional fields used by objects in the class. There may be one or multiple additional fields used by a particular class of objects, therefore there are one or more rows in Appendix C for each class In each row, the left hand column identifies a class using its numeric class identifier. The second column provides a field identifier for each additional field. The third column provides a descriptive name for each additional field. The fourth column identifies the data type of each additional field. An index in Appendix C cross-references the numeric values in the fourth column to the data types of the values.

Reference may also be had to Appendix D attached to this specification, which identifies the allowable children and minimum and maximum numbers of children for each object class. The left hand column in Appendix D identifies an object class using the numeric identifiers discussed above with reference to Appendix B. The second column in Appendix D identifies classes of allowable children for the parent class, again using numeric class identifiers discussed above with reference to Appendix B. The third and fourth columns identify a minimum and maximum number of children for the allowed child class identified in the second column. Where the minimum and maximum numbers are both zero, this indicates that no minimum or maximum values are applicable.

With this background, it may be seen in FIG. 3 that the highest level object in a representation of the AMS specification 4965 is a specification class object 120, having numeric object identifier 2. Specification object 120 has three important properties: a descriptive name, "AMS 4965", which appears in additional field 122; a reference to an object indicating the originating organization for the specification, in additional field 124; and an object operator in field 93–120 having a value of 'equal' (=), indicating that a specification must have the same properties to be considered identical to AMS 4965.

The reference in field 124 of object 120 leads to a company class object 126. Company objects such as object 126 store information about an originating organization, and have a object identifier with a numeric value of 10. Among the important fields storing properties of object 126 are field 128, which stores the name of the originating organization "SAE", and fields 132 and 134 which state mailing address and telephone number for this originating organization.

Specification object 120 has a number of children, each of which represents a revision to the AMS 4965 specification These children are identified by data structure 66–120, which are in a doubly linked list associated with specification object 120. For the purpose of the present exemplary discussion, only the object representing the revision "G" is illustrated. This revision is represented by a revision class object 138, which is associated with a numeric class identifier 11. Among the properties associated with object 138 are the revision name, stored in special field 140 and having the value "G", and the revision date, stored in special field 142, and having, for this example, the date May 1996.

The children of revision object 138 represent procedures for testing or manufacturing products in accordance with the AMS 4965, revision G specification. Each procedure relates to a specific type of testing or product manufacturing step These procedures are identified by objects which are children of revision object 138. These children are identified by a linked list of data structures 66–138 associated with revision object 138. For the purposes of the present example, only one object 144 representing a procedure is shown.

Object 144 is a procedure class object having a numeric class identifier of 16. Among the properties of procedure object 144 is a reference property, stored in field 146, for referencing a definition of the procedure represented by object 144. Specifically, field 146 stores a pointer to a procedure definition object 148 which defines the procedure represented by object 144.

Procedure definition object 144 is a member of the procedure definition class, having numeric object identifier 33 Properties of procedure definition 148 provide the specific information on the manufacturing procedure. These properties include a procedure name property stored in field 150, and in the present situation having the value "Heat Treat (Mill)"—indicating that the procedure relates to heat treatment for milled products. An additional property stored in field 152 provides a description for the procedure, and further fields store properties related to the role of the procedure, its cost, its type, and other information useful in understanding the procedure.

Procedure object 144 represents all heat treatment procedures referenced or described by the AMS 4965 specification. Procedure object 144 therefore has a number of children each related to particular heat treatment procedures that are or may be applicable to particular circumstances One such layer of the heat treatment procedure is represented by layer object 154. Object 154 is a member of the layer class of objects having numeric class identifier 17. Among the important properties of layer object 154 are: the name of the layer, which in the illustrated situation has the value "1" and is stored in additional field 156; the child logic in field 76–154, indicating the logic to be applied to the child objects which represent this layer of the heat treatment procedure, in this case having d value of IMPLICATION; and the object operator stored in field 93–54, in this case having a value equal (=), which indicates that other layers must have the same structure of children to be considered the same layer.

Layer object 154 has a number of children, each representing a part of the if then statement that the layer represents. Because layer object 154 has IMPLICATION child logic as seen in field 76–154, its children have a particular logical relationship. Specifically, one child of layer object 154, which is a collection object 160, represents an IF condition to be tested to determine the applicability of the information represented by a second THEN child of layer object 154 which, in this case, is a second collection object 162.

Referring to the text quoted above from paragraph 3.4 of AMS 4965, revision G, collection object 160 can be understood to represent the implication in paragraph 3.4 that the procedures for heat treatment described in that paragraph relate only to bars, wire, forging, and flash welded rings. This implication can be drawn from the initial part of paragraph 3.4 which indicates that these forms of product are to be heat treated in the described manner. Layer object 154, which represents the entirety of paragraph 3.4 of AMS 4965, revision G, thus includes an implied condition that the heat treatment requirements stated in paragraph 3.4 are only applicable if the product to be manufactured is a bar, wire, forging, or flash welded ring Collection object 160 is a collection class object having class identifier 0. The important parameter of collection object 160 is its child logic parameter 76–160 which has a value of OR. This indicates that if any one of the conditions represented by the children of collection object 160 is met, then the condition represented by collection object 160 has been met.

Collection object 160 represents the complete condition of the first clause of paragraph 3.4 of AMS 4965, revision G, i.e., the state that paragraph 3.4 is applicable to bars, wire, forging, or flash welded rings. The children of collection object 160 each represent one of these four product types. Thus, collection object 160 has four children: a first child representing the product type "bar", a second child representing the product type "wire", a third child representing the product type "forging", and a fourth child representing the product type "flash welded ring". For the purposes of example, only the first of these children is illustrated in FIG. 3.

The first child of collection object 160 is an object 162, which is a member of the predefined value class having numeric class identifier 43. Predefined value class object 162 is being used to describe a condition, by referencing a value selected from a pre-defined list of possible values. Predefined value objects are used, wherever possible, when textual names or symbols must be compared to determine whether a condition has been met. The use of predefined values greatly facilitates the use and comparison of specification, by reducing the individuality of textual descriptions of objects Predefined values also aid in establishing rules for relating textual descriptions, by permitting the controlled use of synonyms.

The important properties of predefined value object 162 are the interpretation and meaning property stored in field 90–162, and the controlled term additional property stored in field 164.

The interpretation property stored in field 90–162 contains a pointer to a characteristic definition object 166 which defines the characteristic that is to be compared to the predefined value represented by object 162. The characteristic definition object 166 is a member of the characteristic definition class having numeric class identifier 32. Its important property is the textual name of the characteristic, which is stored in field 168, and in this case has the value "product type". Thus, characteristic definition object 166 provides predefined value object 162 with an interpretation; specifically, predefined value object 162 is interpreted as a product type.

The children of characteristic definition object 166 identify specific possible values for the product type that is defined by object 166. Accordingly, the children of object 166 include a plurality of controlled term objects. Each controlled term object 170A, 170B, 170C represents a specific defined controlled term for the product type characteristic that is defined by object 166. Controlled term objects may represent broad and narrow controlled terms, and for such a purpose can be arranged in their own object heirarchy. For example, the broad controlled term "forging" may be the parent of a narrower controlled tern "die forging"Each control object has a numeric class identifier of 50. The important property of a controlled term object is the controlled term itself, stored in a field 172A, 172B, 172C. As can be seen in FIG. 3, the collection of controlled term objects 170A, 170B, 170C establishes a set of available controlled terms for the product type, mainly "bar", "wire", "flash welded ring", and so on.

Predefined value object 162 sets a condition on the product type, by identifying a particular one of the controlled term object children of characteristic definition object 164. Specifically, the controlled tern property of predefined value object 162 is a pointer stored in field 164, leading to controlled term object 170A which represents the controlled term value "bar". It will be noted that the object operator for object 162 is stored in field 93–162, and is (=). Thus, predefined value object 162 represents the condition that the product type must be equal to "bar". This is, thus, the first of the four possible product types for which paragraph 3.4 of AMS 4965, revision G is applicable. Other children of collection object 160 similarly represent other product types for which paragraph 3.4 is applicable. Collection object 160, through its OR child logic, represents that of any of the product types described by its children are equal to the current product type, then the remainder of the paragraph 3.4 in AMS 4965, revision G is applicable.

As noted above, when the condition represented by the first child of layer object 154 is met, then the consequence represented by the second child of layer object 154 results. This consequence is the set of heat treatment conditions that are represented by collection object 178. The conditions represented by collection object 178 are exactly the conditions set forth in paragraph 3.4 of AMS 4965, revision G. A few of these conditions are illustrated in FIG. 3 for the purposes of understanding the manner in which conditions are expressed through objects.

An important property of collection object 178 is its child logic property in field 76–178 which has the value SEQUENCE. This indicates that each of the conditions set forth by the children of collection object 178 must be met in sequence in order to satisfy the requirements of the heat treatment paragraph 3.4 in AMS 4965, revision G. This is consistent with the text quoted above, which provides that there shall be solution heat treating at a particular temperature, maintenance of heat for a particular time, followed by quenching in a particular manner, and aging, followed by holding at a new temperature, heating to a new temperature and holding at a new temperature, and then cooling. The sequence child logic property, stored in field 76–178, thus represents that the processing steps described by paragraph 3.4 of AMS 4965, revision G, must be carried out in order to satisfy the conditions of that document.

The children of collection object 178 represent the sequential operations and conditions that are required by paragraph 3.4 of AMS 4965, revision G. The first child of collection object 178 is a collection object 180. This collection object 180 represents a heat treatment steps that is to be performed. The children of collection object 180 thus include a predefined value object 182 for describing the type of heat treatment to be applied, namely solution heat treatment, and a range object 184 (having class identifier 79) for identifying a temperature range for the heat treatment. A second collection object 186, which is a child of collection object 178, identifies a second heat treatment step as described in paragraph 3.4 of AMS 4965, revision G. Thus, this collection object 186 also includes a predefined value child object 188 for identifying the type of heat treatment to be performed and a range child object 190 for identifying the range of temperature to be achieved during the heat treatment.

For the purposes of explanation, the children of range object 190 are illustrated. Range object 190 has children 202 and 204 which represent numeric values for endpoints of the range represented by object 190. Objects 202 and 204 are members of the numeric value class, having class identifier 45. Numeric value objects have two important properties, these properties illustrated with reference to object 204 in FIG. 3. The first important property is an additional property 205 which provides the numeric value represented by object 204, in this case the number "8" Field 205 further includes a subfield 206 for storing a pointer to a unit of measure object 207 representing the unit of measure of the object of the numeric value in field 205. A second important property of a numeric value object is the object operator in field 93–204 of the properties of the object. The object operator will have a value of equal or not equal, as discussed above. When a numeric value is a part of range, such as that represented by range object 190, the object operator is used to determine whether the end of the range is included or excluded from the range. Specifically, if the second child 204 of a range object 190 has an object operator of equal, as shown in FIG. 3, this indicates that the range of value is within the range if it is less than or equal to the numeric value in field 205 of object 204. Similarly, if the object operator of the first child 202 of range object 190 has an object operator of equal, this indicates that the numeric value is in the range if it is greater than or equal to the numeric value associated with child object 202. If an numeric value object representing the end of a numeric range has an object operator of not equal, this indicates that a value which is exactly at the endpoint of the range represented by the numeric value object, is not within the range.

As noted above, numeric values stored by numeric value objects 202 and 204 are associated with a pointer in a subfield 206 leading to a unit of measure object such as object 207. Unit of measure object 207 is a member of the unit of measure class of objects having numeric class identifier 38. An important property of a unit of measure object is the unit of measure represented by that object, which is an additional property of the object stored in field 208. In this case, the upper end of the range represented by object 190 is eight inches; therefore numeric value object 204 has the value "8" in its field 205, and unit of measure object 207 is associated with the unit of measure "inch".

It will be noted that the text at the end of paragraph 3.4 of AMS 4965, revision G includes the sentence "Pyrometry shall be in accordance with AMS 2750". This text references pyrometry requirements in another specification. A reference of this form is represented by a reference class object 192, which is also a child of collection object 178. The important properties of reference object 192 are its priority property in field 194, which indicates whether any requirements that overlap or conflict with requirements set forth in AMS 2750 should take precedence over the requirements in AMS 4965, revision G. Another important property of reference object 192 is its revision property stored in field 196, which identifies the name of the revision of the specification referenced by reference property 192 When no specific revision is specified in field 196, the latest version of the referenced specification is used; as a result, changes to the referenced specification are automatically incorporated into the referencing specification. In some cases, this result may be undesirable. By referencing a specific revision of a referenced specification, changes to the specification in later revisions will not be automatically included in specifications which reference it. The third important property of reference object 192 is the pointer in the field 198 to the referenced specification. In this case, the referenced specification is AMS 2750, and so field 198 stores a pointer to a specification class object 200 which represents AMS 2750.

Figure 4A:
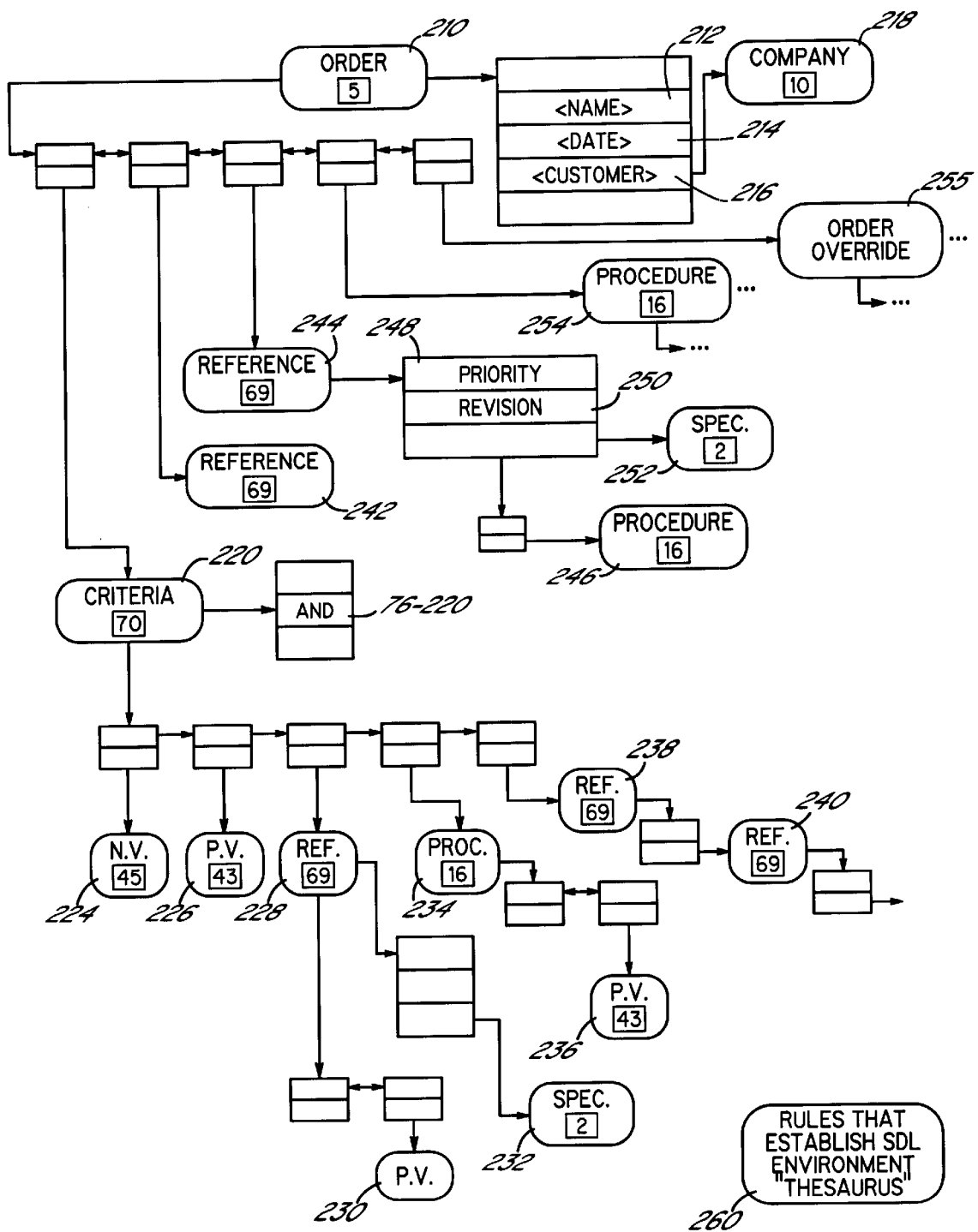
FIG. 4A is a data structure diagram illustrating an order object comprising criteria, specifications, procedure definitions for a product definition (as described in a customer's order)

With the foregoing background, it can be appreciated that extensive and detailed technical information of a technical document such as a specification can be fully described using the object based language provided by the present invention. Referring now to FIG. 4A, it will be appreciated that higher level structures can also be readily represented using the object based language of the present invention.

As seen in FIG. 4A, an order object 210 having a numeric class identifier 5, represents a request for manufactured products that conform to certain customer defined specifications. Important properties of an order object include an additional property in field 212 identifying the order by a textual name, an additional property in field 214 identifying the date on which the order was received, and an additional property in field 216 identifying the customer originating the order. The values stored in fields 212 and 214 are text and date values. The customer identifier in field 216 is a pointer to an object 218 of the company class, which identifies the company originating the order in the manner discussed above in reference to object 126 in FIG. 3.

Order object 210 represents all the criteria and requirements specified by a customer in an order for a product. These criteria may include a number of specific values such as height, size, shape, weight, etc. of the manufactured product. These customer criteria are represented by a criteria object 220 having a numeric class identifier of 70.

Criteria object 220 has a number of children, each identifying a criterion of the customer specifying the order. These children may be of any of a variety of classes, depending upon the information being represented by the criteria object 220. The child logic of the criteria object 220 is GROUP, indicating that all of the criteria beneath the criteria object must be met.

As illustrated in FIG. 4A, a first child of criteria object 220 is a numeric value object 224, having numeric class identifier 45. Numeric value 224 can provide a numeric value for a defined variable such as the temperature or product measurements described with reference to objects 184 and 190 of FIG. 3. The interpretation of the object is provided by the interpretation/meaning pointer in the object, which leads to a meaning/interpretation object.

A second child of criteria object 220 is a predefined value object 226 having numeric class identifier 43. Predefined value object 226 can represent a customers request that product be produced in accordance with a procedure or in accordance with a particular method. Thus, for example, predefined value object 226 may indicate a heat treatment type that the customer has requested. A third child of criteria object 220 is a reference object 228, having numeric class identifier 69. Reference object 228 can be used to provide specific criteria that relate only to a particular specification, revision, layer or other subportion of specifications requested by the customer. Thus, reference object 228 includes in its additional fields a pointer to a specification object 232 identifying one of the specifications indicated by the customer. The children of reference object 228 include a predefined value object 230, indicating a predefined value to be used when evaluating the specification that is represented by specification object 232 As one example, some specifications for alloys include grade designations for alloys to be made in accordance with those specifications. Grade designations are unique within individual specifications, but not unique from one specification to another. Accordingly, if a customer identifies a grade designation, the customer must also identify the specification under which that grade designation should be used. Once the customer has specified the grade designation and a specification in which it is to be used, a reference object 228 is created to identify the specification object 232 and the predefined value to be used with that specification object as represented by predefined value object 230.

The children of criteria object 220 may further include higher level structures such as procedure object 234, which has a numeric class identifier 16. Procedure object 234 has a child predefined value object 236. This structure indicates that whenever a procedure is encountered in any of the specifications identified by the order, if the procedure is of the same type as procedure object 234, then the predefined value identified by the object 236 shall be used with that procedure to identify, e.g., which of several allowed approaches should be taken. This structure allows a customer to specify, for example, that heat treatment procedures shall be conducted at a particular temperature regardless of which specifications deals with heat treatment.

The children of criteria object 220 may also include multiple layers of reference objects. Thus, reference object 238 is a child of criteria object 220. An additional field of reference object 238 points to reference object 240 and reference object 240 then may include additional children or point to additional reference objects. This structure may be used to specify criteria which are applicable when procedures are cross referenced through procedures identified by the customer. For example, with reference to the example of FIG. 3, the customer might specify that when a procedure defined in AMS2750 is performed as a consequence of the cross reference in AMS4965, revision G, to AMS2750, that a specific revision of AMS2750 shall be used. To accurately capture this structure, a reference object 238 is created which has an additional field pointing to the object 120 (FIG. 3) representing the AMS4965, revision G specification. Then, a second reference object 240 is made a child of reference object 238, and reference object 240 includes in its additional fields a pointer to a specification object representing AMS2750. This tree structure of reference objects thus mirrors the structure through which procedures and referenced specifications are incorporated into specifications that have been identified by the customer. As a result, criteria which was set forth as children of the tree structure of reference objects, will be associated with the specifications used as results of these cross references In addition to criteria object 220, the children of order object 210 further include reference objects each of which references a specification specified by the customer. For example, reference object 242 having a marked class identifying 69, may include a pointer to a specification that the customer has requested be followed in its entirety.

A customer need not, however, request that specification be followed in it entirety. For example, reference object 244, is like reference object 242 in that it has an additional field pointing to a specification object 252 which has been referenced by the customer in the order. (It will be noted that additional fields for references objects include a priority field 248 for storing a relative priority value, and a revision field 250 for storing an identifier of a revision from the referenced specifications. The revision field is typically used so that a specific revision of the specification will always be used in filling the order. A priority field is typically used to allow a mechanism to resolve conflicts between specifications identified by the customer.) In addition to these references, reference object 244 also includes child object 246, which is a procedure class object having numeric call identifier 16. The presence of procedure object 246 as a child of reference object 244 indicates that only those procedures and specification object 252 which are of the same kind as procedure object 246 shall be used in fulfilling the customers order. Other procedures will be ignored. Similar structures may be used to select a particular layer of specification to be used or multiple layers or multiple procedures by positioning the appropriate child objects beneath the reference object incorporating the specification.

The children of order object 210 further include an order override object 253. Order override object 253 represents particular actions to be taken during handling of the order represented by object 210, which deviate from normal actions taken in accordance with the designated specifications. An order override object identifies a context for the override, for example, that a particular temperature or other value is to be used in a particular procedure. This is done by placing a procedure object as a child of the order override object, identifying the procedure in which the override applies, and placing, for example, a predefined or numeric value object as a child of the procedure to identify the override that is to occur in that procedure.

The children of order object 210 also include a procedure object 254. Procedure object 254, because it is a child of order object 210, represents a procedure that is to be followed in connection with the order due to an explicit request by the customer without reference to any specifications. Because of procedure object 254 is a direct child of order object 210, its parameters with override those which are included due to reference to specifications through reference objects such as 242 and 244.

The children of order object 210 may also include a standard practice object. This object represents standard practices for the customer that have been previously requested, and are incorporated into orders for a customer. Because the standard practice object is also a child of the order object 210, its parameters will override those which are included due to reference to specifications through reference objects such as 242 and 244.

A final object illustrated in FIG. 4A, which is an important component of an order, is an object 260 that establishes rules for the environment within which the order is interpreted. These rules in effect form a thesaurus for predefined values utilized by the various criteria, specifications and procedures or layers in the order. Since specification are promulgated by different standards organizations, and since they are entered into a computer system by potentially multiple different people, it is necessary to establish a mapping or thesaurus between terminology used in specifications promulgated by the different standards organizations or entered into the computer be different persons. These rules are included into an order by reference to an object 260 that establishes all of the rules to be applied in interpreting the order. Since the rules in object 260 are also stored in an object fashion, different customers may utilize different sets of rules for establishing synonyms that are applicable to their particular industry or manufacturing environment. Thus, one customer may consider two terms to be synonymous, and another customer does not consider those terms to be synonymous. Such issues can be readily be resolved by establishing customer-specific sets of rules, one for each customer.

Figure 4B:
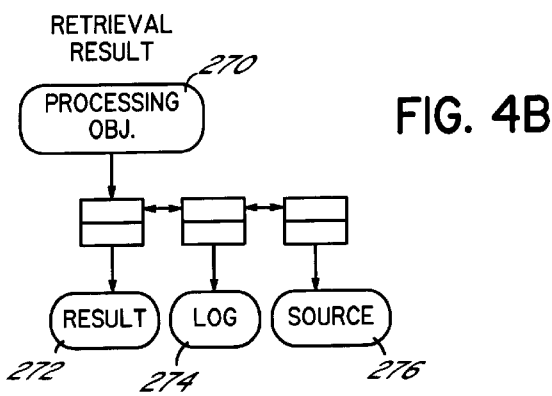
FIG. 4B is a data structure diagram illustrating the result of retrieval of an order having the form shown in FIG. 4A.

Referring now to FIG. 4B, as background for the following discussion of the retrieval of the object structures described above, a retrieval result will be described. A retrieval result includes a processing object 270 which represents the entire retrieval process applied to the customers order. The children of the processing object include a result object 272, a log object 274 and source object 276.

The result object 272 is the desired end result of the retrieval process. Through the retrieval process, the customer criteria and references to specifications are expanded to produce a single tree structure in which all relevant criteria have been applied to any objects with implication child logic, and all referenced procedures, predetermined values or other information is included in the tree structure without intervening reference objects. Thus the result object 272 is an expanded specification that can be used directly in the combine process described below to identify how a product is to be manufactured. Notably, the result object 272 has the same form as the original specifications that were referenced by the customer.

After the combine process described below has been performed, the resulting object tree can itself be part of a subsequent specification by the same customer. Thus the output of the retrieval process is a "virtual" specification, reflecting a collection of technical requirements, some originating from the customers references to others specifications, some originating from the customer's specific criteria, and some potentially originating from the manufacturing process of the supplier. By enabling a supplier to construct a virtual specification through a retrieval and combine process, that completely reflects all of the criteria to be applied a fulfillment of an order, the present invention substantially streamlines the process of specifying a manufactured product, while at the same time providing powerful handling of information at a level of sophistication that has heretofore been unknown.

Because result object 272 is an expanded and pruned version of the original order object shown in FIG. 4A, in order to have a trail through which the generation of the result object can be audited, two additional child objects are associated with processing object 270. These are the log object 272 and the source object 276.

Log object 274 is used to audit the retrieval process that generated the result object 272. Specifically, log object 274 includes objects corresponding to each object in the original order. Each object in the log tree that is headed by log object 274, is cross referenced to an object in the original order and includes fields identifying whether the corresponding objects in the order were included in the result object 272 or not, and the reasons why branches were not included in result object 272, including where applicable values which were compared, boolean values that were evaluated as part of processing implication statements, and other actions that were taken to generate the result object 272.

Source object 276 provides a trace from objects appearing in result object 272 to the original part of the original document referenced by the order from which those objects originated. The structure of the tree beneath source object 276 is identical to the structure of the tree beneath result object 272 Each object in the tree beneath source object 276 identifies the specification or criteria or other object in the original order from which the corresponding object in the result tree originated. Source object 276 can thus be used to directly trace the reference object 272 to the source location that produced it. Log object 274 can be used to determine why particular source objects in the order were carried over to result object 272 or pruned during the retrieval process.

Figure 5:
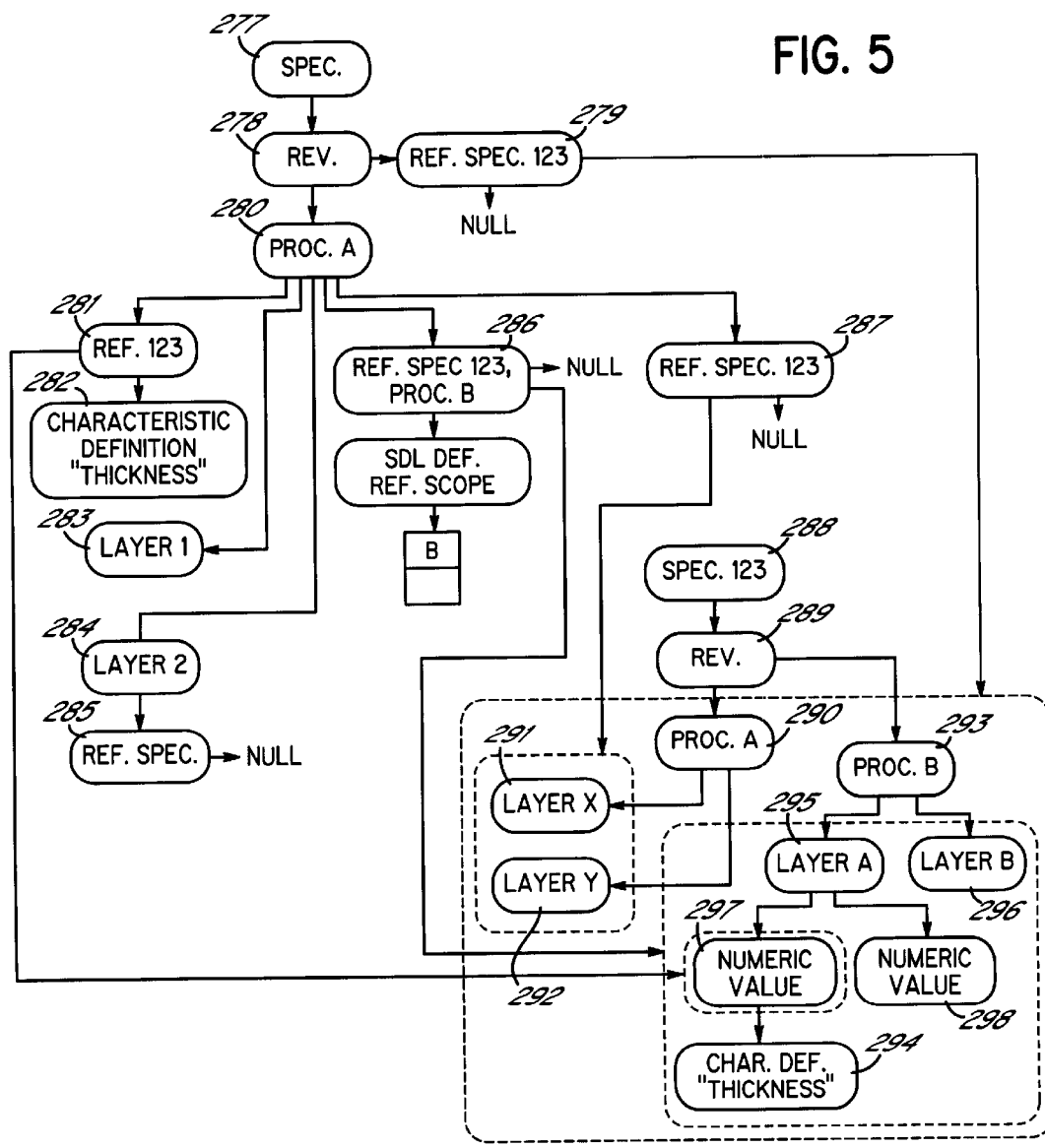
FIG. 5 is a data structure diagram illustrating the use of references in specifications at the revision, procedure and characteristic level.

Referring now to FIG. 5, for further background, the manner in which references are used, can be discussed. References are used in specifications, to incorporate relevant information found in another specification. References can come in many types. For present purposes, three types of references are allowed: revision level references, procedure level is references, and characteristic references.

FIG. 5 illustrates, in simplified form, a specification represented by specification class object 277. This specification has a revision represented by revision object 278. This revision includes a reference to another specification, which for present purposes will be known by the number "123" This reference is represented by a reference object 279 which is a child of revision object 278. A second child of revision object 278 is a procedure object 280 for a procedure, which for present purposes will be called "A"

Procedure A includes a reference to specification 123, indicating that thicknesses for procedure A shall be as specified in specification 123. This reference is represented by a reference object 281, which has an interpretation/meaning pointer to a CHARACTERISTIC DEFINITION class object 282 which defines the characteristic "Thickness". Procedure A also includes a number of layers including layer "1" (represented by layer object 283), and layer "2" (represented by layer object 284). Layer "2" includes a reference to another specification; this reference is represented by reference object 285. Procedure A also includes further references to specification 123 that are different in kind from reference object 281. Specifically, procedure A includes a reference to a procedure named "B" in specification 123, which reference is represented by object 286. Furthermore, procedure A includes a reference to the procedure named "A" in specification 123, which reference is represented by object 287. Note that reference object 287 does not include an identification of which procedure in specification 123 is being referenced. As will be seen below, under these circumstances, it is assumed that the same procedure is being referenced. Furthermore, note that the scope of the reference to the procedure "B" is defined by another object, namely the reference object 286.

FIG. 5 also illustrates, in simplified form, the referenced specification named "123". This specification is represented by a specification object 288, which has a revision object 289, and revision object 289 has a number of procedures including a procedure A (represented by object 290) and a procedure B (represented by object 293). Procedure A has two layers, named Layer X and Layer Y, and represented by objects 291 and 292. Procedure B also has two layers, Layer A and Layer B, represented by objects 295 and 296. Layer A includes identifications of numeric values, including a value for thickness; thus, thus object 295 representing layer A has child objects 297 and 298 of the numeric value class. Numeric value object 297 has an interpretation/meaning pointer identifying an CHARACTERISTIC DEFINITION object 294 defining "thickness."

FIG. 5 includes lines connecting the reference objects 279, 281, 286 and 287 to the corresponding objects in the specification "123" that are referenced thereby. As will be seen, a reference object establishes an incorporation by reference of a subset of the referenced specification. The size of the subset and the manner in which it is identified, are based upon the placement and properties of the reference object.

For example, reference object 279 is known as a "revision level" reference, for the reason that it is positioned as a child of revision object 278 and has a null interpretation/meaning pointer. A revision level reference causes incorporation of all procedures from the referenced revision of the referenced specification. If a revision-level reference does not specify a particular revision of the referenced specification, the most recent revision is implied. Thus, assuming that the revision represented by revision object 289 is the revision identified by reference object 279, reference object 279 incorporates by reference, all of procedures A and B from specification 123.

Reference object 286 is known as a "procedure level" reference because it is located below a procedure object (object 280) and has a null interpretation/meaning pointer. A procedure level reference incorporates all layers from the identified procedure in the referenced specification. Reference object 286 identifies procedure B in specification "123"; accordingly, layer A and layer B (represented by objects 295 and 296) from procedure B in specification "123" are incorporated by reference object 286.

When a procedure level reference object does not identify a particular procedure, as is the case with object 287, the reference object is assumed to refer to a procedure with the same name as the procedure that is the parent of the reference object. Thus, object 287 is taken to incorporate all layers from a procedure with the name "A" in specification 123; thus, object 287 incorporates layers 291 and 292 from procedure A of specification 123.

Procedure level reference objects need not be positioned as an immediate child of a procedure object. For example, reference object 285 is a procedure level reference because it is a descendant (child of a child) of procedure object 280.

A third level of reference is characteristic level reference. Object 281 represents a characteristic level reference to specification 123. A characteristic level reference is created by including a reference object at any level of a specification, and including in the reference object an interpretation/meaning pointer to a CHARACTERISTIC DEFINITION class object defining the characteristic that is cross-referenced. Thus, object 281 in FIG. 5 has an interpretation/meaning pointer to an object 282 defining the characteristic "thickness". Object 281 also identifies specification "123", and is a child of procedure object A. Thus, reference object 281 incorporates all objects in procedure A of specification 123 that relate to the characteristic thickness—which includes numeric value object 297.

Figure 6A:
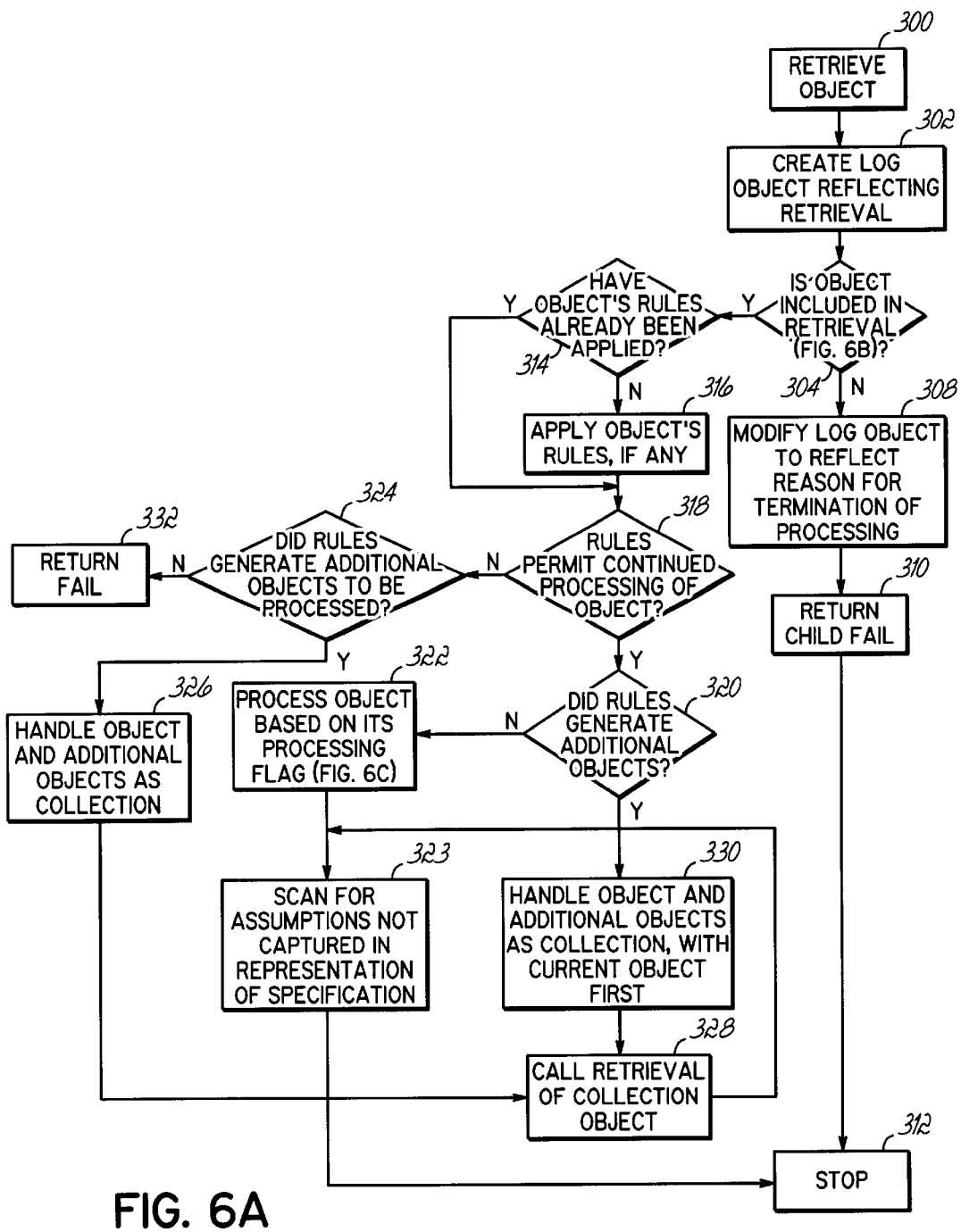
FIG. 6A is a flow chart of the entry point of a tail-recursive procedure for retrieving an object.

Referring now to FIG. 6A, with this background, the retrieval process can be described in detail. The retrieval process is a tail recursive algorithm for scanning a tree of objects and creating appropriate entries in the log, result and source that become parts of the processing object 270 (retrieval result). In each pass through the tail recursive procedure, a new object in the input order tree is handled and appropriate further actions are taken. As is typical of tail recursive procedures, the retrieval procedure calls the retrieval procedure itself as further objects in the input tree are processed, until ultimately, the end of a tree branch is reached. The end of a tree branch may be reached due to the arrival at the last object in the branch, or due to the failure of a condition that must be satisfied for further processing of the branch. The arrival at the end of a branch triggers a cascade of returns through the various calls to the retrieval procedure, ultimately completing processing of the retrieved input tree.

All invocations of the retrieval procedure begin at step 300 as illustrated in FIG. 6A. Immediately after beginning retrieval of an object, in step 302, a log object is created to reflect the retrieval of the object so that the log has complete record of all objects that have been retrieved. In step 304, the retrieved object is evaluated to determine whether it is to be included in retrieval. This step involves a complex analysis of a number of governing factors, and is detailed in FIG. 6B, below. As a consequence of this evaluation, it is determined that the object is or is not included in retrieval. If the object is not included in retrieval, then processing continues to step 308 in which the log object that was created in step 302 is modified to reflect that processing terminated at the object due to the factors evaluated in step 304. Then, in step 310, the current invocation of the retrieval process returns a "child fail" value to indicate that the current object was not retrieved. After this point, in step 312, the retrieval procedure stops.

If in step 304, it is determined that the current object is to be retrieved, then processing proceeds to step 314 in which the status of processing the object is evaluated to determine whether any system rules that relate to the object have been applied. The evaluation of system rules will be discussed below. For present purposes, it is sufficient to state that system rules may be associated with any object, and may identify special processing to be performed under certain conditions, e.g., when the object is retrieved. Also, rules may generate additional objects to be processed If the rules, if any, for the current object have not already been applied, then in step 316 the object's rules are applied. Thereafter, processing continues to step 318. If the current object's rules have already been applied then processing continues directly from step 314 to step 318. In step 318 the result of the application the rules is evaluated, to determine whether the rules permit continued processing of the current object. In some cases, the rules associated with an object may indicate that the object should be eliminated under set conditions. Only if such conditions are not met will processing continue to step 320. In step 320, the result of evaluation of the rules is considered, to determine whether additional objects have been created through evaluation of the rules. If no additional objects have been created, then in step 322 the object is processed based on its processing flag in the manner shown below with respect to FIG. 6C.

After step 322, processing,is performed in step 323 to determine whether top-level retrieval of the object initially passed to the retrieve routine has been completed. If so, further processing is performed as necessary to capture any assumptions of referenced specifications or procedures that are not reflected in it representation, and to include these into the result. For example, it may occur that a specification has a normal dependency or environment for output properties, which might not be captured by the retrieve routine. To capture such properties, the entire result tree is scanned for any characteristic definition object having an "output" role indication property. If there is such a characteristic definition, then the procedure where this characteristic definition is defined is scanned to determine whether, for that procedure, there is a normal dependency or environment for output properties. If so, then a dependency object is created in the retrieval result to reflect this normal environment or dependency. This operation will prevent a requirement from surviving its appropriate context as a result of the retrieval process.

After this processing, in step 312 the retrieval of the object is completed.

If in step 318, it is determined that the rules do not permit continued processing of the current object, then in step 324 the rules are evaluated to determine whether the rules generated additional objects that ought to be processed instead. If so, then in step 326, the current object and the additional objects are gathered together as a collection object, with the current object the first object in the collection. Then, in step 328, the retrieve procedure of FIG. 6A is reinvoked, with the new collection object as the object to be retrieved. This has the effect of incorporating additional objects with the current object. It will be noted in the second invocation of the retrieve procedure of FIG. 6A, in step 314 it will be determined that the rules for the current object have already been applied, and processing will continued directly to step 318 without re-application of the rules in step 316.

If in step 320 it is determined that the rules generated one or more additional objects, then in step 330, the current object and the additional objects are again gathered together into a collection and a new collection object is created. Here again the current object is made the first object in the collection. After step 330, in step 328, the retrieve object procedure of FIG. 6A is called again to retrieve the newly created collection object, after which the additional processing of step 323 is performed, and the retrieval procedure stops in step 312.

If in step 324 it is determined that the rules prevent continued processing of the current object and did not generate additional objects to be processed, then processing of the current object has failed, and in step 322 control is returned to the calling procedure with the return value of "fail".

Figure 6B:
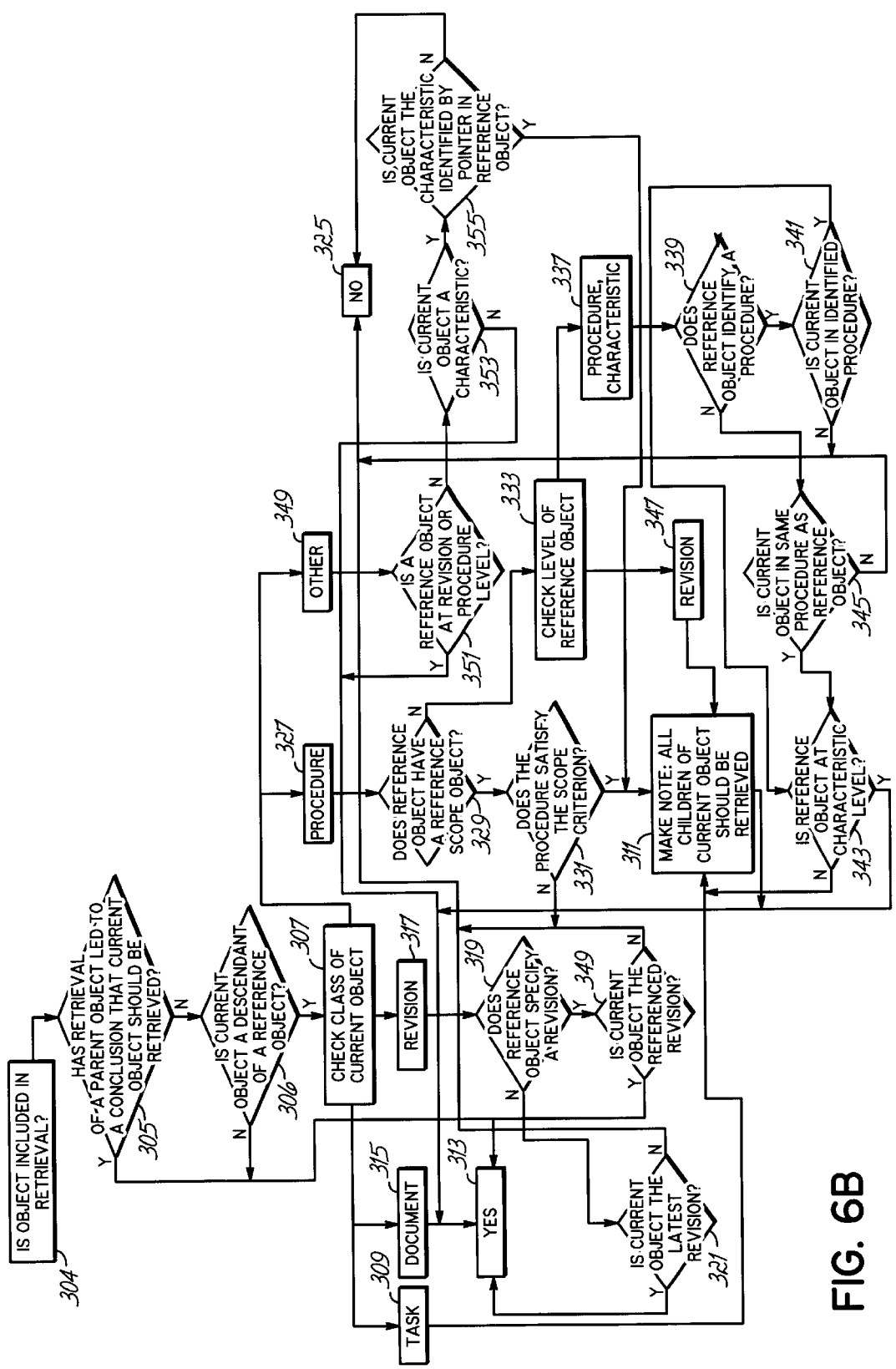
FIG. 6B is a flow chart of the process for determining whether to retrieve an object.

Referring now to FIG. 6B, the manner of deciding whether to retrieve an object (step 304, FIG. 6A) can be elaborated. In a first step 305, stored information is evaluated to determine whether retrieval of a parent object led to a conclusion that the current object should be retrieved. If so, then in step 313, processing ends with the conclusion that the current object should be retrieved. As will be seen in the following discussion, under certain conditions processing of an object can lead to a conclusion that the object and all of its children should be retrieved. Under these conditions, information is stored for later inspection at step 305, to simplify the process for retrieving the child objects.

If in step 305, it is determined that the current object has not already been identified as needing retrieval, then in step 306, the current object is evaluated to determine whether it is a descendant of a reference object. That is, the current object is descended from a reference object if, in the chain of objects that are the parents, grandparents, etc. of the object, there is a reference object. It will be noted that several references may separate an object from the order including the reference. Specifically, an order may reference a specification, and that specification may reference a second specification, and the second specification may reference a third. One of the consequences of the retrieve process described herein is the incorporation of all of the referenced specifications into the retrieved version of the order.

If the current object is not a descendant of a reference object, then the object is retrieved in step 313. If, however, the current object is a descendant of a reference object, then the object, and the reference object from which it descends, must be evaluated to determine whether the object should be retrieved. Specifically, as discussed above, a reference object typically references only a certain revision or a portion of a revision of the complete tree of objects defining the entire referenced specification. For example, as seen in FIG. 5, a reference object can reference only procedures of one revision of a specification, or only layers of one procedure, or only one characteristic of one procedure In each case, other revisions, layers and characteristics should not be retrieved Accordingly, if the current object is descended from a reference object, in step 307 the class of the current object is evaluated to determine whether the current object should be retrieved.

If the current object is a task object (step 309), then in all cases the entire task, including the current object and its children, is included in the material referenced by the reference object, and should be retrieved. Accordingly, in this situation, processing proceeds to step 311, where a note is stored to indicate that all children of the current object should be retrieved, so that in subsequent processing of these child objects, in step 305 it will be immediately determined that the child object is to be retrieved After step 311, processing proceeds to step 313, and the current object is retrieved.

If the current object is a document object (step 315), then in all cases the current object should be retrieved. Therefore, processing proceeds directly to step 313.

If the current object is a revision object (step 317), then the object should be retrieved if it is the revision that is identified by the current objects' reference object ancestor. Thus, in step 319, it is determined whether the ancestor reference object specifies a revision. If not, the most current revision should be used; thus, in this case, in step 321, the current object is evaluated to determine whether it represents the latest revision If so, then processing continues to step 313 and the current object is retrieved, if not, then processing continues to step 325 and the current object is not retrieved.

If in step 319, the ancestor reference object specifies a revision, then in step 349, the current object is evaluated to determine whether it represents the specified revision. If so, then processing continues to step 313 and the current object is retrieved; otherwise, processing continues to step 325 and the current object is not retrieved.

If the current object is a procedure object (step 327), then the object should be retrieved if it is the procedure that is identified by the current objects' reference object ancestor. Thus, in step 329, it is determined whether the ancestor reference object specifies a reference scope by way of a reference scope object. (A reference scope object defines a scope for a reference, e.g. by identifying procedures that are referenced.) If so, then in step 331 the current procedure object is evaluated to determine whether it satisfies the scope criterion. If so, then processing continues to step 311, to cause the current object and all of its children to be retrieved. If the current object does not satisfy the scope criterion, processing continues to step 325, and the current object is not retrieved.

If in step 329, the ancestor reference object does not have a scope criterion object, then a scope for the reference is assumed, based on the position of the ancestor reference object. Specifically, in this case, in step 333 the position of the ancestor reference object is evaluated. If the ancestor reference object is at the revision level (step 347), i.e., the ancestor reference object is the child of a revision object in the specification containing the ancestor reference object, then processing continues to step 311, and the current object and all of its children are retrieved.

If in step 333, the ancestor reference object is at the procedure or characteristic level (step 337), then in step 339 the ancestor reference object is evaluated to determine whether the ancestor reference object identifies a procedure. If so, then in step 341 the current procedure object is evaluated to determine whether the ancestor reference object identifies the procedure of the current object. If not, then processing proceeds to step 325 and the current object is not retrieved. If, however, the ancestor reference object identifies the procedure of the current object, then in step 343 the ancestor reference object is evaluated to determine whether it is at the characteristic level, i.e., references a characteristic. If not, the ancestor reference object must reference the entire procedure represented by the current object, and therefore processing continues to step 311 and the current object and all of its children are retrieved.

If in step 343 it is determined that the reference object is at the characteristic level, then the current procedure object should be retrieved, and processing continues to step 313.

If in step 341 it is determined that the current object is not in the identified procedure, then processing continues to step 325 and the current object is not retrieved.

If in step 339 it is determined that the ancestor reference object does not identify a procedure, then the procedure being referenced is assumed from the location of the reference object. Specifically, in this situation, in step 345 the ancestor reference object is evaluated to determine whether it is a child of an object representing the same procedure as the current object. If so, then processing continues to step 343 to determine whether the reference object is a characteristic or procedure reference, and take appropriate action.

If in step 345 it is determined that the procedure that contains the ancestor reference is different from the procedure that contains the current object, then the current object is not in the referenced procedure, so processing continues to step 325 and the current object is not retrieved.

If in step 307, it is determined that the current object is none of the other types discussed above, then in step 351 the ancestor reference object is evaluated to determine its level; specifically, the ancestor reference is evaluated to determine whether it is a child of a revision or procedure object. If this is the case, then it can be assumed that the current object should be retrieved, since the current object would not have been evaluated for retrieval had the characteristic or procedure of the ancestor reference object not already matched with parents of the current object. Accordingly, in this case processing continues directly to step 215, and the current object is retrieved.

If in step 351, the ancestor reference object is at the characteristic level, then it cannot be assumed that the current object should be retrieved. Accordingly, in this case in step 353 the current object is evaluated to determine whether it is a characteristic object. If not, processing continues to step 313 and the current object is retrieved. If, however, the current object is a characteristic object, then in step 355 the current object is compared to the ancestor reference object to determine whether the current object relates to the same characteristic as is referenced by the reference object. If not, then processing continues to step 325 and the current object is not retrieved. If, however, the current object relates to the characteristic referenced by the reference object, then processing continues to step 311 and the current object and all of its child objects are retrieved.

Figure 6C:
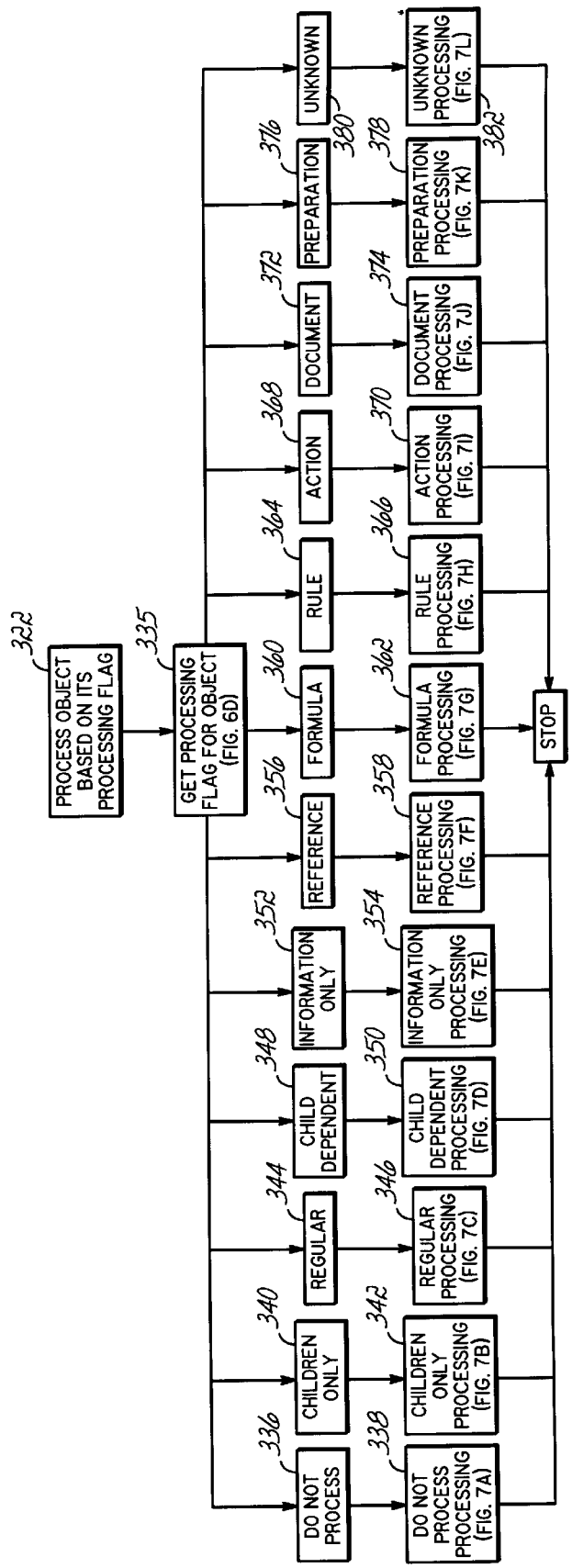
FIG. 6C is a flow chart of the process for retrieving an object in accordance with a processing flag associated with the object.
Figure 7J:
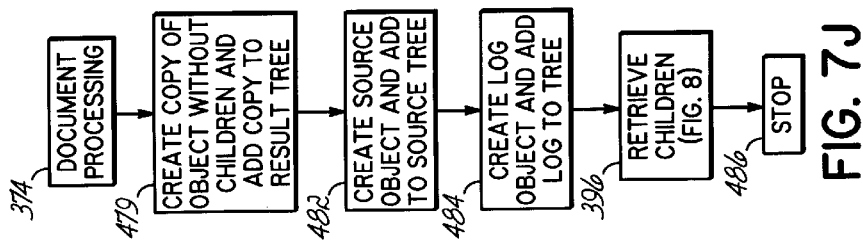
Figure 7H:
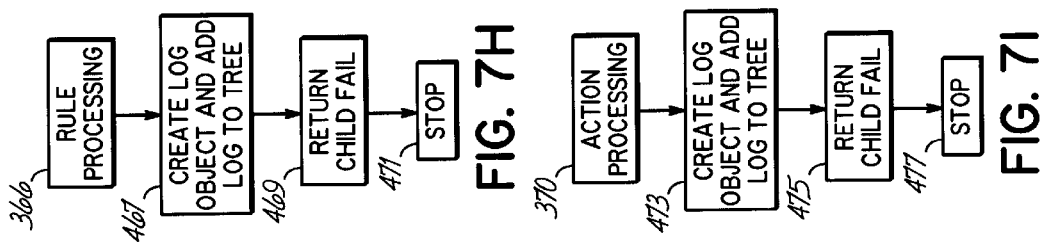
Figure 7I:
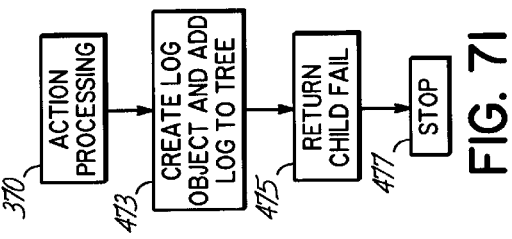
Figure 7C:
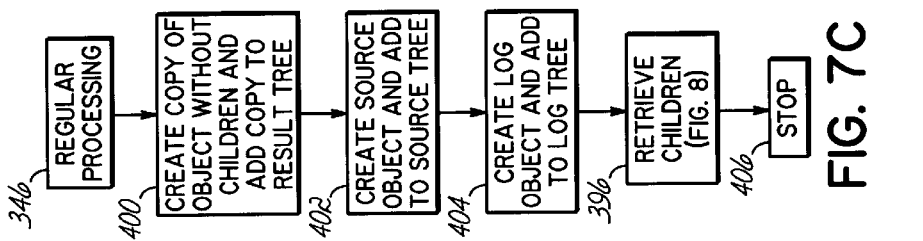
Figure 7A:
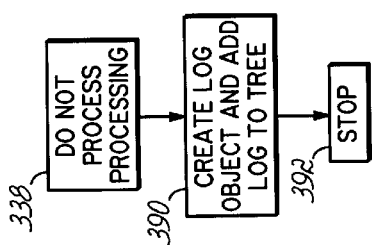

Referring now to FIG. 6C, the manner of processing an object based on its processing flag, step 322 of FIG. 6A, can be discussed. In step 322, the processing flag for an object is generated in step 335, and the appropriate action is taken based upon the processing flag for the object. If the processing flag has a value of DO NOT PROCESS 336, then in step 338 appropriate DO NOT PROCESS processing is performed as shown in FIG. 7A. If the value of the processing flag is CHILDREN ONLY 340, then in step 342, CHILDREN ONLY processing is performed. If the value of the processing flag is REGULAR 344, then REGULAR processing 346 is performed as shown in FIG. 7C. If the value of the processing flag is CHILD DEPENDENT 348, then CHILD DEPENDENT processing 350 is performed as shown in FIG. 7D. If the processing flag is INFORMATION ONLY 352, then INFORMATION ONLY processing 354 is performed as shown in FIG. 7E. If the processing flag is REFERENCE 356, then REFERENCE processing 358 is preformed as shown in FIG. 7F. If the processing flag of the object is FORMULA 360, then FORMULA processing 362 is performed as shown in FIG. 7D. If the processing flag for the object is RULE 364, then RULE processing 366 is performed for the object in FIG. 7H. If the processing flag for the object is ACTION 368, then ACTION processing 370 is performed for the object as shown in FIG. 7I. If the processing flag for the object is DOCUMENT 372, then DOCUMENT processing 374 is performed for the object as shown in FIG. 7J. If the processing flag for the object is PREPARATION 376, then PREPARATION processing 378 is performed for the object as shown in FIG. 7K. If the processing flag for the object is UNKNOWN 380, then UNKNOWN processing 382 is performed for the object as shown in FIG. 7L.

Figure 6D:
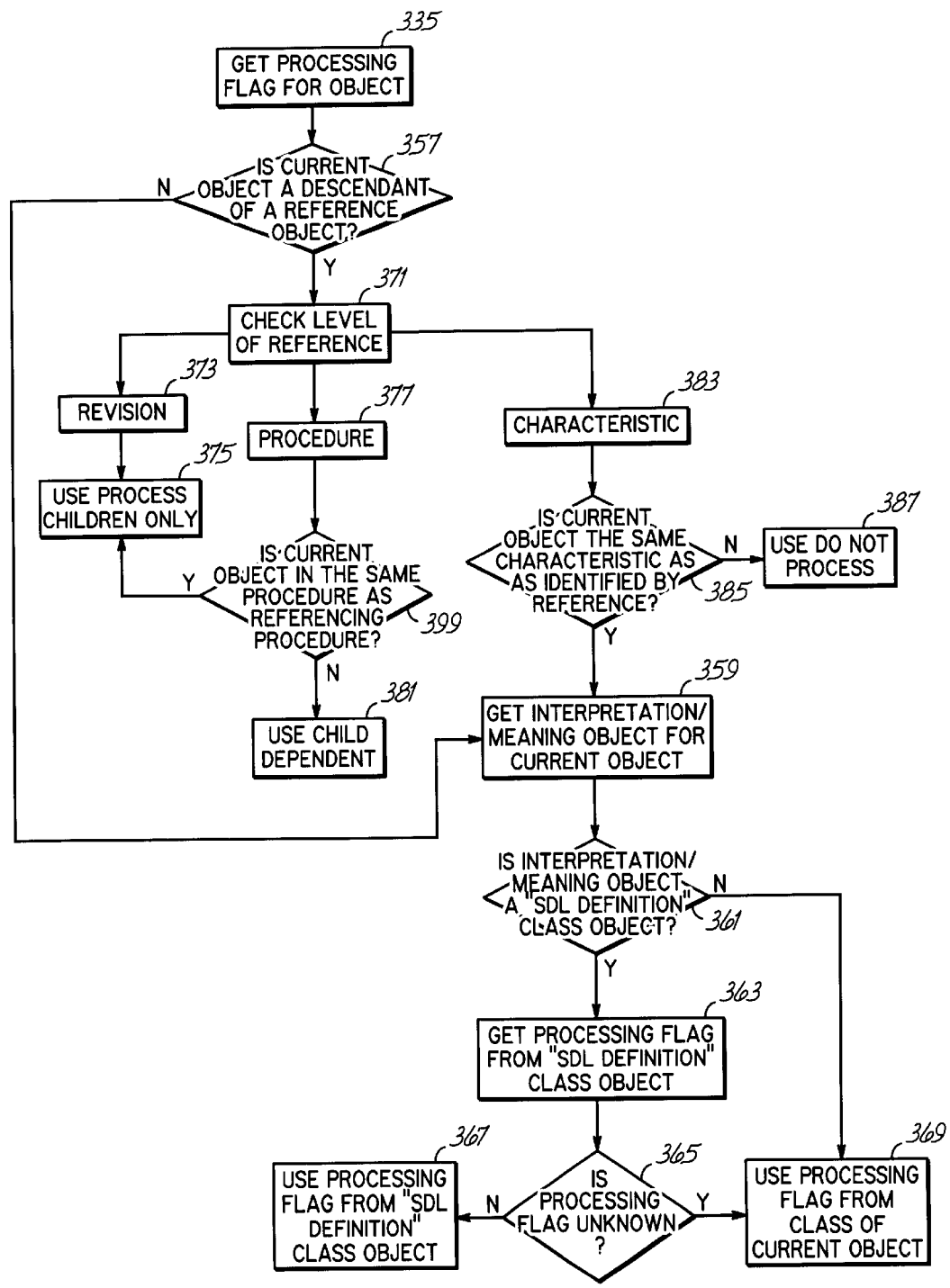
FIG. 6D is a flow chart of the process for determining the processing flag for an object.

Referring now to FIG. 6D, an explanation can be made of the manner in which the processing flag for an object is determined in step 335 of FIG. 6C. Initially, in step 357, the current object is evaluated to determine whether it is the descendant of a reference object. If not, then in step 359, the current object is evaluated to determine whether its interpretation/meaning pointer leads to a special "SDL DEFINITION" class object. If so, this indicates that the current object is defined and its processing flag should be obtained from the definition.

If the current object has a meaning defined by an SDL DEFINITION object, then in step 363, the processing flag is obtained from this SDL DEFINITION class object.

In step 365, the processing flag that was retrieved is evaluated to determine whether it has a value of "UNKNOWN". If the processing flag has a value of "UNKNOWN", then processing continues to step 369, and the processing flag stored in the class definition for the current object is used. If the processing flag is not "UNKNOWN" in step 365, then in step 367 the processing flag from the SDL DEFINITION object is used.

If in step 361, the current object does not have a meaning/interpretation pointer leading to an "SDL DEFINITION" object, then processing continues directly to step 369, and the processing flag stored in the class definition for the current object is used.

If in step 357, it is determined that the current object is a descendant of a reference, different steps must be taken to determine the processing flag for the object. Specifically, in step 371, the level of the ancestor reference object is evaluated.

If in step 371 the ancestor reference object is at the revision level (step 373), then the processing flag is returned as PROCESS CHILDREN ONLY. This prevents objects at a higher level than REVISION from being incorporated into the result.

If in step 371 the ancestor reference object is at the procedure level (step 377), then the current object is evaluated to determine whether the current object relates to the same procedure as the ancestor reference object. If so, then in step 375 the processing flag is returned as PROCESS CHILDREN ONLY. If the current object does not relate to the same procedure as the ancestor reference object, then in step 381, the processing flag is returned as CHILD DEPENDENT, Referring now to FIG. 7A, DO NOT PROCESS processing 338 can be discussed. For objects that have DO NOT PROCESS processing flags, the object is not to be retrieved. Accordingly, for these objects, in step 390, a log object is created and added to the log tree, and then processing stops 392.

Figure 7B:
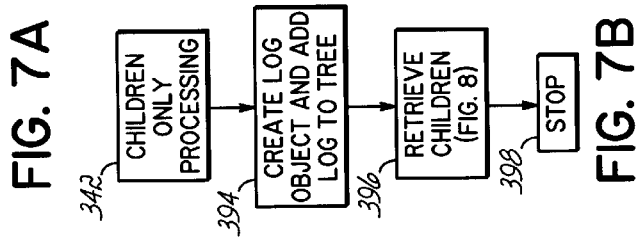
Figure 7D:
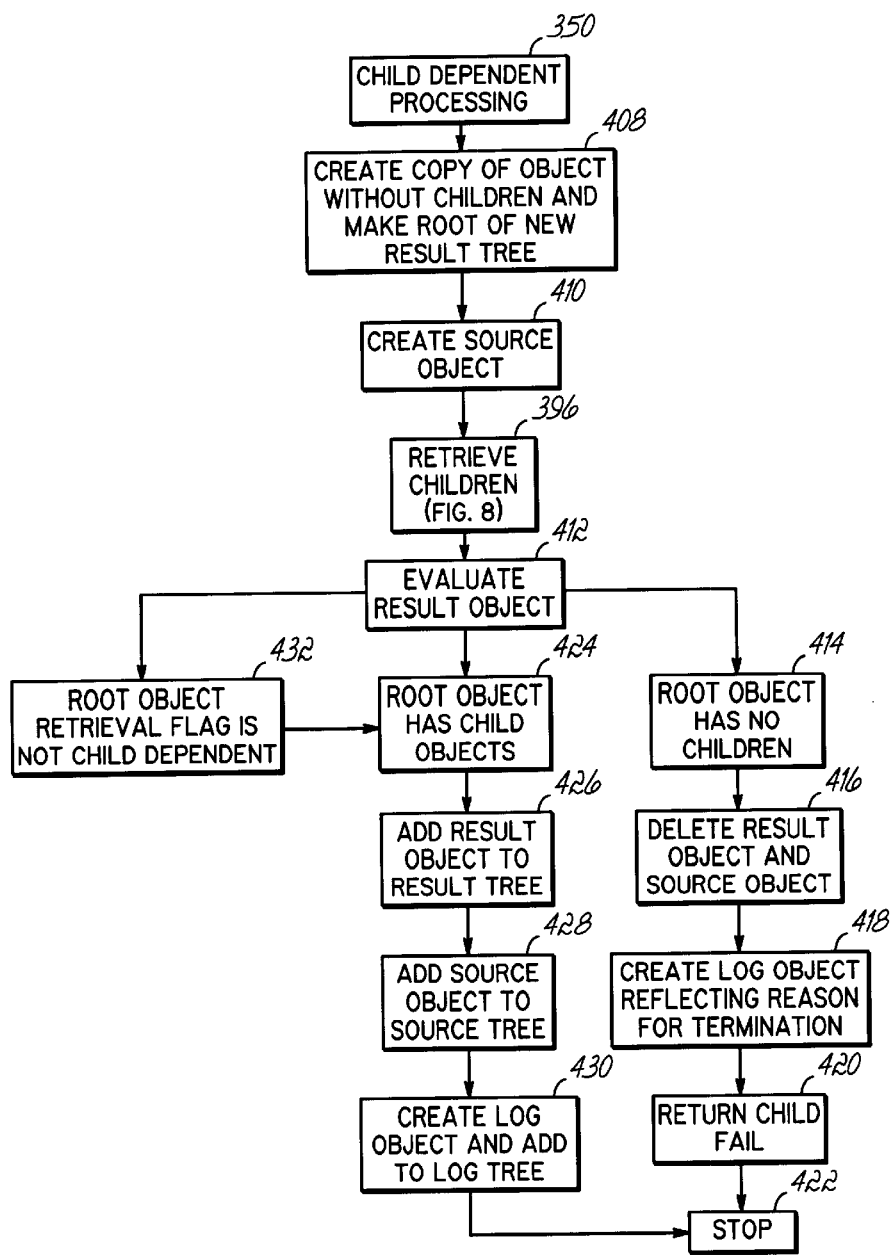
Figure 7K:
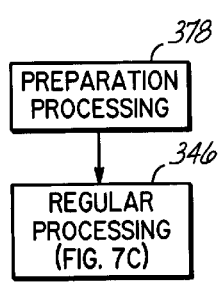
Figure 7L:
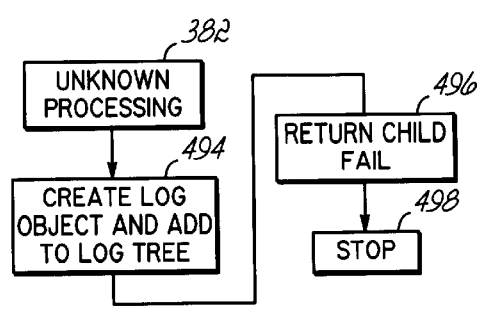

Referring now to FIG. 7B, for CHILDREN ONLY processing 342, only the children of an object are processed and the object itself is omitted from the results. Accordingly, under these conditions in step 394 a log object is created and added to the log tree to reflect that the current object was eliminated due to its CHILDREN ONLY processing flag. Then in step 396, the children of the current object are retrieved below in greater detail in FIG. 8. Thereafter, processing of the object stops 398.

Figure 8:
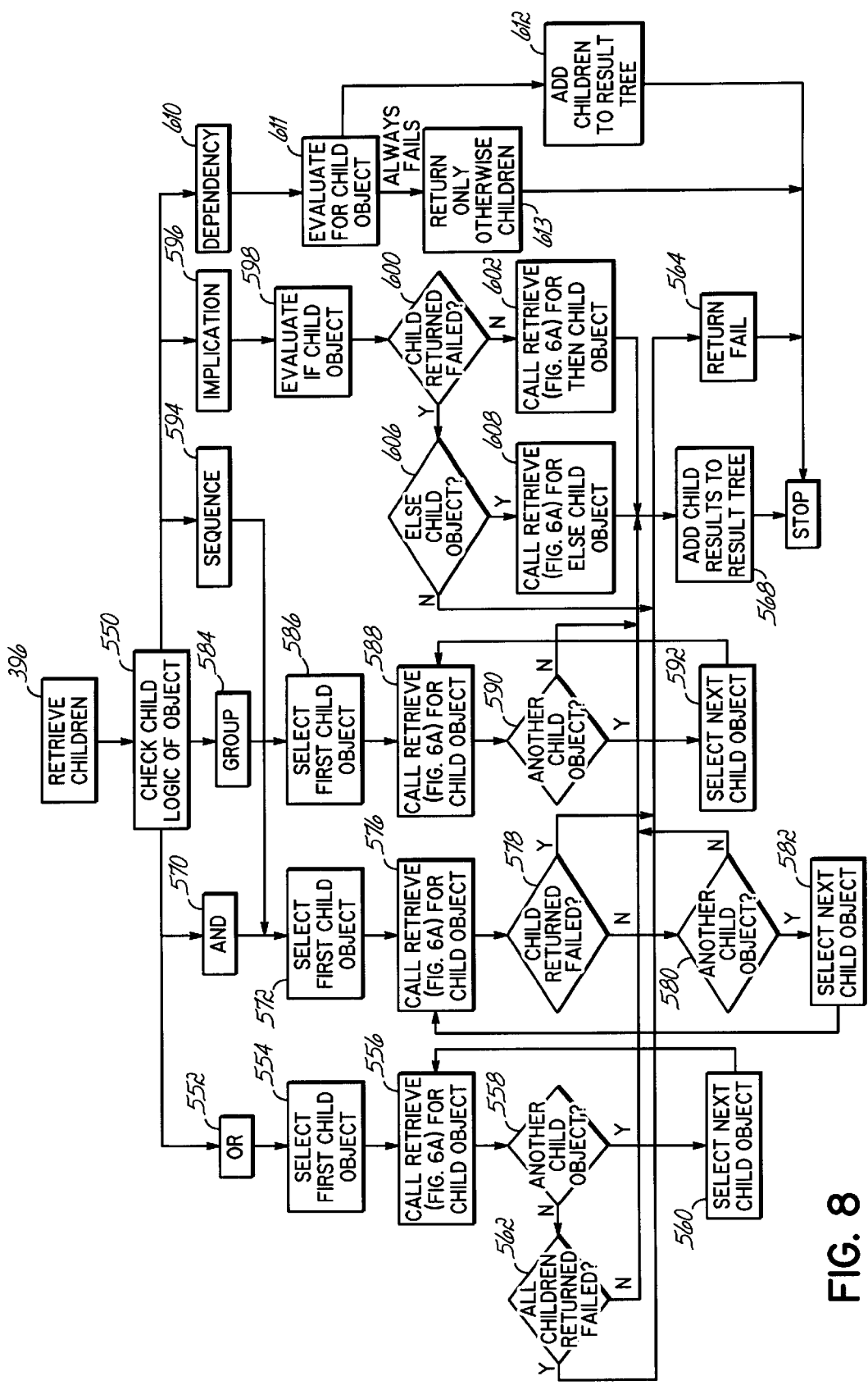
FIG. 8 is a flow chart of processing child objects.

Referring now to FIG. 7C, for REGULAR and PREPARATION processing 346 of an object, in step 400, a copy of the object is created, without its children, and the copy is added to the result tree. Thus in REGULAR processing an object is carried from the input tree structure of objects to the result tree. In step 402, a source object corresponding to the current object is created and added to the source tree. In step 404, a log object is created and added to the log tree to indicate that the object was kept because of its REGULAR processing status. Processing then continues to step 396 as shown in FIG. 8, in which children of the current object are retrieved. After retrieval of the children of the current object, processing is done 406.

Referring now to FIG. 7D, CHILD DEPENDENT processing can be described As noted above, when an object has a CHILD DEPENDENT processing status, the inclusion of the object in the result tree is a function of whether any children of the object are to be included in the result tree. Accordingly, in step 408, a copy of the current object without its children is created, and is made a root of a temporary new result tree, which can be conditionally added to the retrieval results if it is shown that the there are children surviving the retrieval process. Then in step 410, a source object is created to correspond to the new result tree. Then in step 396, illustrated in FIG. 8 below, the children of the current object are retrieved. After this step, in step 412 the results of the retrieval of the children is evaluated. The result of retrieval of the children may be the addition of the child objects to the copy of the current object created in step 408. If, however, no children survive the retrieval process, then the copy created in step 408 will not have any children Accordingly, if the root object created in step 408 does not have children after step 396, processing proceeds from step 412 to step 414 and step 416 in which the copy created in step 408 is deleted and the source object created in step 410 is deleted. Then in step 418, a log object is created reflecting that the current object was not retrieved because none of its children were retrieved. Then in step 420, a "child fail" return condition is delivered and in step 422, processing of the current object is done.

If the result of retrieval of the children of the current object is the addition of child objects to the copy created in step 408, then processing proceeds from step 412 to step 424 and step 426 in which the result object created in step 408, and therefore its children as well, are copied to the result tree. Next in step 428, the source object created in step 410 is moved to the source tree at the appropriate location. Finally, in step 430 a log object is created and added to the log tree to indicate that the object was retrieved because at least one of its children survived the retrieval process. After this is done, processing of the current object stops in step 422.

In some cases, retrieval of child objects may change properties of the parent of those child objects. Accordingly, after the retrieval of the children in step 396 in FIG. 7D, the current object being evaluated in step 412 may no longer have a CHILD DEPENDENT flag. If this occurs, processing passes through step 432 directly to steps 426, 428 and 430 to add the result created in step 408 to the result tree and the source object created in step 410 to the source tree, and create a log object and add the log object to the log tree indicating that the processing flag of the current object changed and caused retrieval of the object.

Referring now to FIG. 7E, in processing of objects having INFORMATION ONLY processing flags can be explained. Objects having an INFORMATION ONLY processing flag exists only to convey information to users, and no to be retrieved from compilation and evaluation in light of other objects. Accordingly, INFORMATION ONLY processing in step 354 merely involves copying the current object and all its children to the result tree in step 434, creating a source object for those copied objects in step 436 and creating a log object in step 4389 indicating that the current object and its children were copied due to the INFORMATION ONLY processing identified by the processing flag of the object.

Referring now to FIG. 7F, REFERENCE processing in step 358 can be discussed As a first step 442, log object is created and added to the log tree indicating that REFERENCE processing was performed on the object. The following steps utilize a stack of reference information to track whether a current object is a member of a reference subtree, and to determine whether the reference subtree corresponds to the current location of the value of other objects. In step 446, because a new object is being processed, an entry is pushed onto the reference stack to reflect a new level of reference processing. In step 448, the reference object pointer is evaluated to determine whether the object it references is valid. If the object it references is valid, then in step 450 the current processing priority is updated with the priority value in the objects special priority field. Then in step 452, retrieval of the reference object is initiated by invoking the retrieval procedure shown in FIG. 6A.

If in step 448, it is determined that the object referenced by the current object is not valid, then in step 454 a log object is created indicating that processing was terminated due to an invalid reference, and this log object is added to the log tree. Then a "child fail" status is returned to the calling procedure in step 456 After either step 456 of step 452, processing of the current object is completed and therefore in step 458, an entry is popped from the current reference stack, reflecting the end of reference processing of a current object. Processing then-stops in step 460.

Figure 7G:
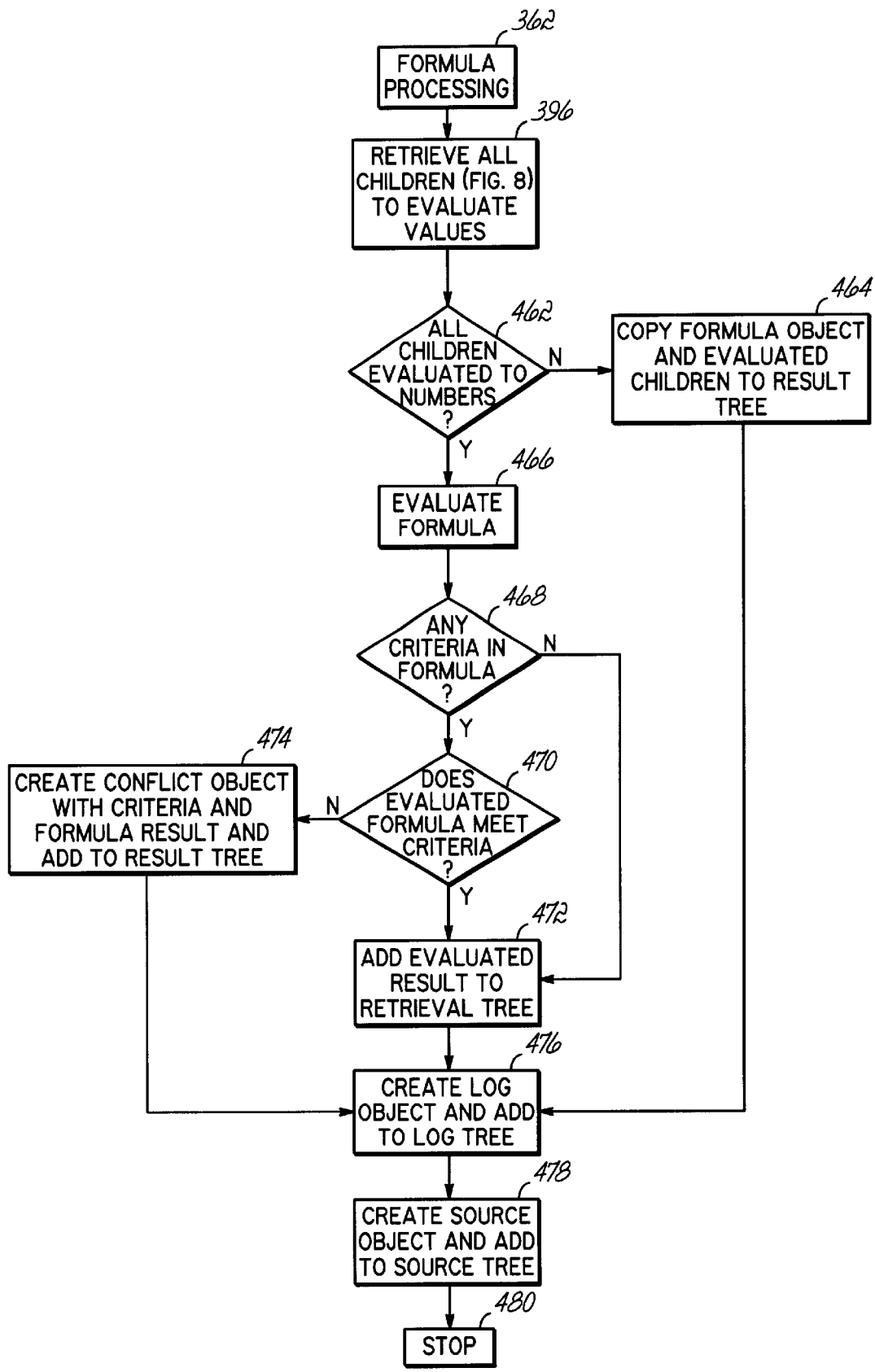

Referring to FIG. 7G, FORMULA processing of an object can be described. Formula processing involves evaluating a formula that is represented by an object. To perform processing of a formula, in step 396, all of the children of the current object are evaluated to reduce them to numeric values if possible. In step 462, it is determined whether all the children have been evaluated to numeric values. If not, then no further action can be taken on the formula and in step 464 the formula and its evaluated children are copied directly to the result tree. If, however, all of the children have been evaluated to the numeric values, then in step 466, the formula represented by the current object is evaluated, to produce a new numeric value. In this process, in step 468 it is determined whether there are any criteria embedded in the formula. If so, then in step 470, it is determined whether the evaluated formula meets these criteria. If the evaluated formula meets the criteria or if there are no criteria in the formula, then the evaluated result of the formula is moved to the retrieval tree of in step 472. If the evaluated result of the formula does not meet the criteria, then in step 474, a conflict object is created, identifying the criteria, the numeric formula result, and indicating that retrieval of the formula was not possible due to the failure of the result of the formula to meet the criteria. After any of steps 464, 472 and 474, in step 476, a log entry is created and added to the log tree to reflect the processing that was performed on the formula object. Then in step 478, a source object is created and added to the source tree to identify the source for the formula object. Processing is then stopped 480.

Referring now to FIGS. 7H and 7I, RULE and ACTION processing 366, 370 can be discussed. In a retrieval process, RULE and ACTION objects should not be encountered, and are not retrieved. Accordingly, when a RULE or ACTION object is encountered, in step 467/473, a log object is created and added to the log tree, a child fail is returned (step 469/475)and then processing stops 471/477.

Referring now to FIG. 7J, for DOCUMENT processing 374 of an object, in step 479, a copy of the object is created, without its children, and the copy is added to the result tree. Thus in DOCUMENT processing an object is carried from the input tree structure of objects to the result tree In step 482, a source object corresponding to the current object is created and added to the source tree. In step 484, a log object is created and added to the log tree to indicate that the object was kept because of its DOCUMENT processing status. Processing then continues to step 396 as shown in FIG. 8, in which children of the current object are retrieved. After retrieval of the children of the current object, processing is done 486.

Referring now to FIG. 7K, PREPARATION processing 378 is performed in the same manner as REGULAR processing 346, as described above with reference to FIG. 7C.

Referring now to FIG. 7L, UNKNOWN processing 382 can be discussed. In a retrieval process, UNKNOWN objects should not be encountered, and are not retrieved. Accordingly, when an UNKNOWN object is encountered, in step 494, a log object is created and added to the log tree, a child fail is returned (step 496) and then processing stops 498.

Referring to FIG. 8, the process for retrieving the children of an object (step 396) begins with evaluating 550, the child logic of the current object. If the child logic of the current object is OR 552, then in step 554, the first child object is selected, and in step 556 the retrieval process of FIG. 6A is called for this child object. In step 558, if another child object is available, then in step 560 this additional child object is selected, and processing returns to step 556 to call the retrieval process of FIG. 6A for the next child object. After all of the child objects have been retrieved in step 562, it is determined whether all of the children return failed. If all children return failed, then in step 564, a "fail" value is returned, and retrieval of the children is done 566. If, however, at least one child object did not return failed, then because the child logic for the current object is OR, then in step 568 the results produced by retrieval of the child objects are added to the result tree, and then processing stops.

If the child logic of the current object is AND 570, then processing of the children takes a slightly different form. In step 572, the first child object is selected and in step 576, the retrieval process of FIG. 6A is invoked for the first child object. Immediately after this retrieval in step 578 a determination is made whether the child retrieved in step 576 return failed. If the child return failed, processing immediately proceeds to step 564 to return a failed value, and then stops. Only if the child did not return failed, processing proceeds to step 580 in which it is determined whether there is another child object for the current object. If there is another child object, then in step 582, the additional child object is selected and processing returns to step 576 to retrieve the additional child object. After all child objects have been retrieved, processing proceeds from step 580 to step 568 in all of the objects produced as a result of retrieval of the children are added to the result tree and then processing stops. Thus, only if all children do not return failed will children be added to the result tree.

If the child logic of the current object is GROUP 584, in step 586 the first child object is selected, and in step 588 the retrieve process of FIG. 6A is invoked for this first child object. In step 590, it is determined whether there is another child object, and if so in step 592 this additional child object is selected and processing returns to step 588 to retrieve the next child object. After all child objects have been retrieved, whether or not failed, processing proceeds from step 590 to step 568 to add the results of the retrieval of the children to the result tree.

If the child logic of the current object is SEQUENCE 594, processing of the object continues in the same manner described above with reference to child logic of AND.

If the child logic of the current object is IMPLICATION 596, then in step 598 an evaluation engine is invoked for the IF child object. In step 600, the result of evaluation of the IF child object is used. If the result of the retrieve of the IF child object is not a failed condition, then processing proceeds to step 602, where the retrieval procedure of FIG. 6A is again called for the THEN child object Then processing proceeds to step 568 to add the child results to the results to the results tree.

If the result of evaluation of the IF child object is a failed condition, then processing proceeds from step 600 to step 606, in which it is determined whether there is an ELSE child object. If there is no ELSE child object, processing proceeds directly to step 564 and a failed condition is returned. If there is an ELSE child object, then in step 608 the retrieval procedure of FIG. 6A is invoked for this third child object. After retrieval of the ELSE child object, processing will continue to step 568 and the result of the retrieval of the child object will be added to the result tree.

If the child logic of the current logic is DEPENDENCY 610, then, as noted above, during the retrieval process limited actions are taken to evaluate the logical relationship of the children and the object. Accordingly, in step 611, the FOR child object is evaluated to determine whether it will always fail. If not, then in step 612, all children of the dependency object are moved directly to the result tree without further retrieval, and then processing is stopped. If the FOR child will always fail, then in step 613, only the OTHERWISE child(ren) are retrieved and added to the results tree.

Figure 9A:
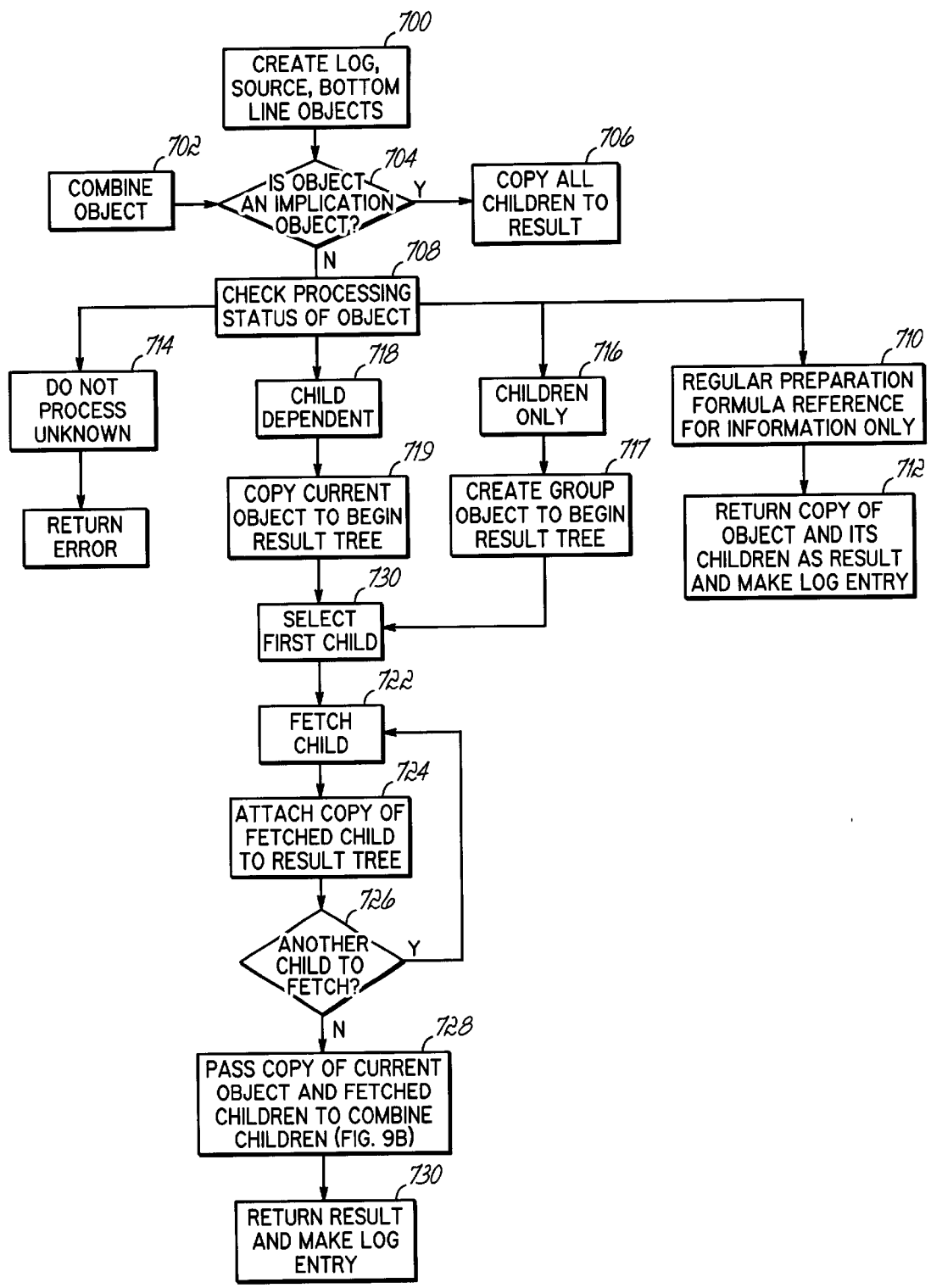
FIG. 9A is a flow chart of a tail-recursive procedure for combining an object.

Referring now to FIG. 9A, a process for combining retrieved objects to form a combination object can be explained. As noted above, through the combine routine, multiple trees of objects representing technical documents that are to be combined are converted to a single tree of objects that represents the combined requirements of each of the documents. This single object is referred to as a bottom-line object. Accordingly, in a first step 700 of the combine routine, a bottom-line object is created. In addition, a log object is created, which is used to indicate what routines were performed during combine and a source object is created, which is used to indicate the source of the various results in the bottom-line object.

The combine routine, like the retrieve routine, is a tail recursive procedure in which current invocations of the procedure recursively call the same procedure as the tree of objects being delivered to the combine routine is scanned. In any subsequent invocation of the combine routine, control passes to step 702 rather than step 700 so that the log, source and bottom-line objects are not unintentionally regenerated.

After step 700 or 702, in 704 a first analysis of the object being combined is made. Specifically, it is determined whether the object is an implication class object. As noted above, implication class objects identify conditions and consequences of those conditions, but are not evaluated during combine routines. Accordingly, if the current object is an implication class object, control passes to step 706, in which all children of the implication object are copied to form a result object for the combine routine, and then processing of the combine routine is completed.

If the current object is not an implication class object, then control passes from step 704 to step 708 in which the processing status of the current object is evaluated. As will be seen in the following, different actions are taken in combining an object based upon its processing status. But if the processing status in step 710 is REGULAR, PREPARATION, FORMULA, REFERENCE, or FOR INFORMATION ONLY, then in step 712 copy of the object and any of its children are returned as the result of the combine routine, and a log entry is created reflecting that the object is included in the combine If, in step 714, the processing status of the current object is DO NOT PROCESS or UNKNOWN, then the combine routine terminates immediately, as such objects should not be processed or cannot be processed.

If, in step 716, the processing of the current object is DOCUMENT or PROCESS CHILDREN ONLY, then in step 717, a group object is created to form the first object in the result of the combine routine. This reflects the fact that objects with processing status of DOCUMENT or PROCESS CHILDREN ONLY are to be deleted as part of the combine routine.

Objects with CHILD DEPENDENT processing status are to be processed, so that if any children remain after the combine routine, the object is included in the result, but otherwise the object is not included. To facilitate this routine, in step 719, the object with CHILD DEPENDENT processing status is copied to form the beginning of a result tree.

After step 719 for a CHILD DEPENDENT object, or step 717 for a group object, processing proceeds to step 720 in which the first child of the object is selected. Next, in step 722, the child object is fetched. Then, in step 724, a copy of the fetched child is attached to the result object. In step 726, it is determined whether there is another child, and if so, processing returns to step 722. After all of the children have been fetched in this manner, processing proceeds to step 728, in which the result object and its children are passed to the combine children routine described below with reference to FIG. 9B. After the children have been combined in the process described in FIG. 9B, and the result is the same number or fewer children, which are then returned along with the result object as the result of combination of the original tree. This result is returned in step 730 and a log object is created to reflect the manner in which it was created.

Figure 9B:
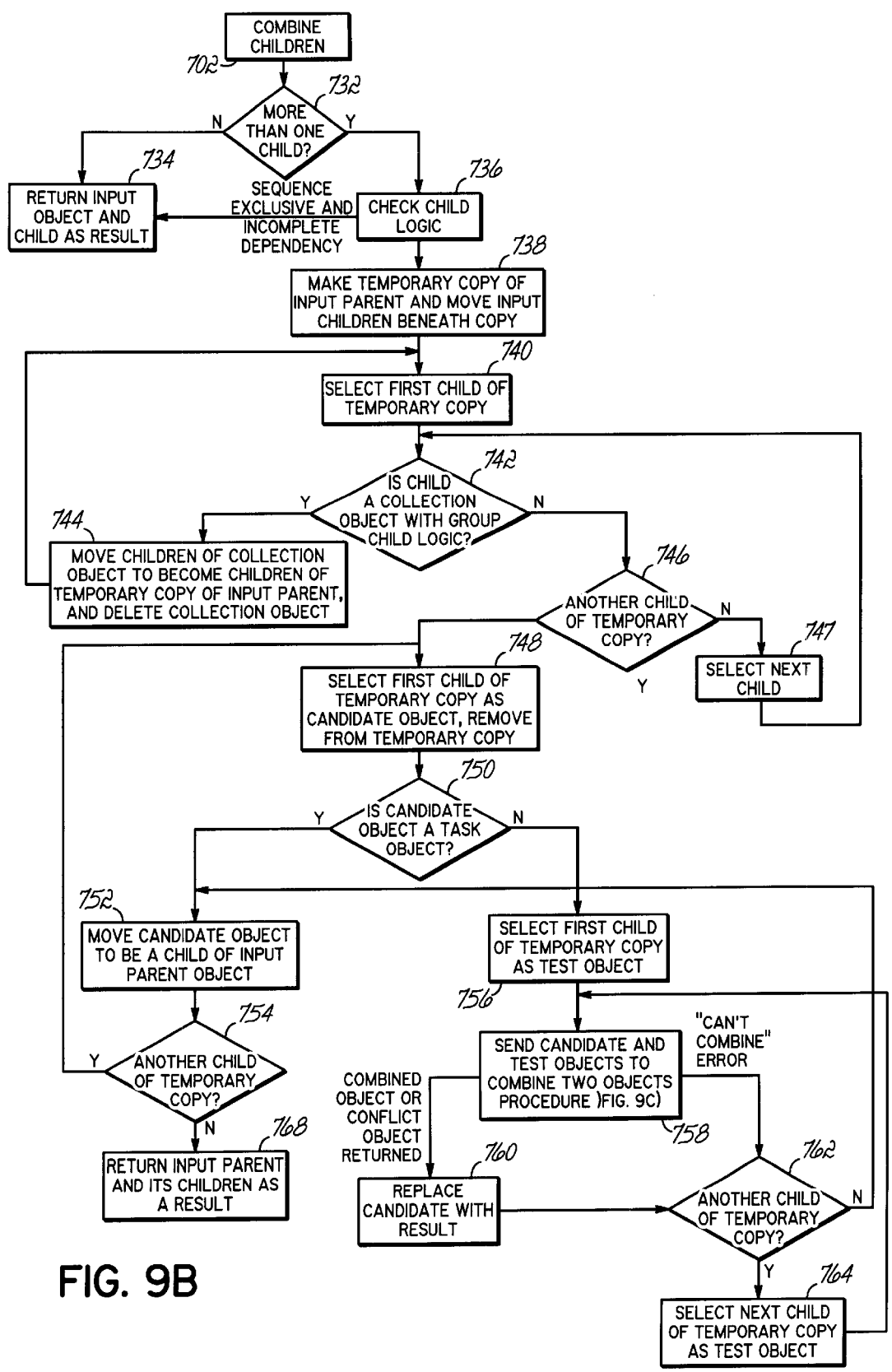
FIG. 9B is a flow chart of combining the children of an object.

Turning now to FIG. 9B, the process for combining the children of an object can be described. This process begins with step 732 in which the children of the object are evaluated to determine whether there is more than one child. If there is not more than one child, then in step 734 the child that was received as an input is returned as a result. If there is more than one child, then in step 736 the child logic of the parent is evaluated. If the child logic of the parent is SEQUENCE, EXCLUSIVE AND INCOMPLETE or DEPENDENCY, then in step 734 the input children are returned as the result. In all other cases, processing proceeds to step 738.

In step 738, the generation of a new result is initiated by making a temporary copy of the parent object and moving the children received to the process beneath the temporary copy. Next, in step 740, the first child of the temporary copy is selected. In step 742, the first child is evaluated to determine whether it is a collection object with GROUP child logic. If so, then in step 744, the children of the collection object are moved to become children of the temporary object, and the collection object is deleted. This causes collection objects to be removed as part of combining children. After step 744, processing returns to step 740 to again select the first child of the temporary parent object.

If, in step 742, the current child being processed is not a collection object with GROUP child logic, then in step 746, the children are evaluated to determine if there is another child. If so, processing returns to step 742 to evaluate the next child.

After all children have been processed in this manner, processing proceeds from step 746 to step 748 in which the first child is again selected as a candidate object and is removed from the parent object. Next, in step 750, the candidate object is evaluated to determine if it is a task object. If the candidate object is a task object, then in step 752 the candidate is moved back to the position of a child of the parent object that was received by the combine children routine of FIG. 9B. Then, in step 754, the temporary object is evaluated to determine if there are other children to be processed. If so, then processing returns to step 748 to select the first child for subsequent processing.

If, in step 750, the candidate object is not determined to be a task class object, then in step 756 the first child remaining under the temporary parent object is selected for use as a test object. Next, in step 758, the candidate object and the test object are delivered to a combine two objects routine of FIG. 9C routine described below in FIG. 9C. As elaborated below, the procedure of FIG. 9C will evaluate the two objects to determine whether their meanings permit combination of the objects. If the objects cannot be combined, then an error condition will be returned and processing will continue from step 758 to step 762, in which the temporary parent is evaluated to determine if there is another child to be used as a test object. If so, then processing proceeds to step 764 to select the next child as the test object, then returns to step 758 to repeat the combine two objects routine of FIG. 9C. If there are no other children to be used as test objects, then processing proceeds from step 762 to step 752, the candidate object is moved to become a child of the parent child input to the combine children routine of FIG. 9B, as noted above.

Figure 9C:
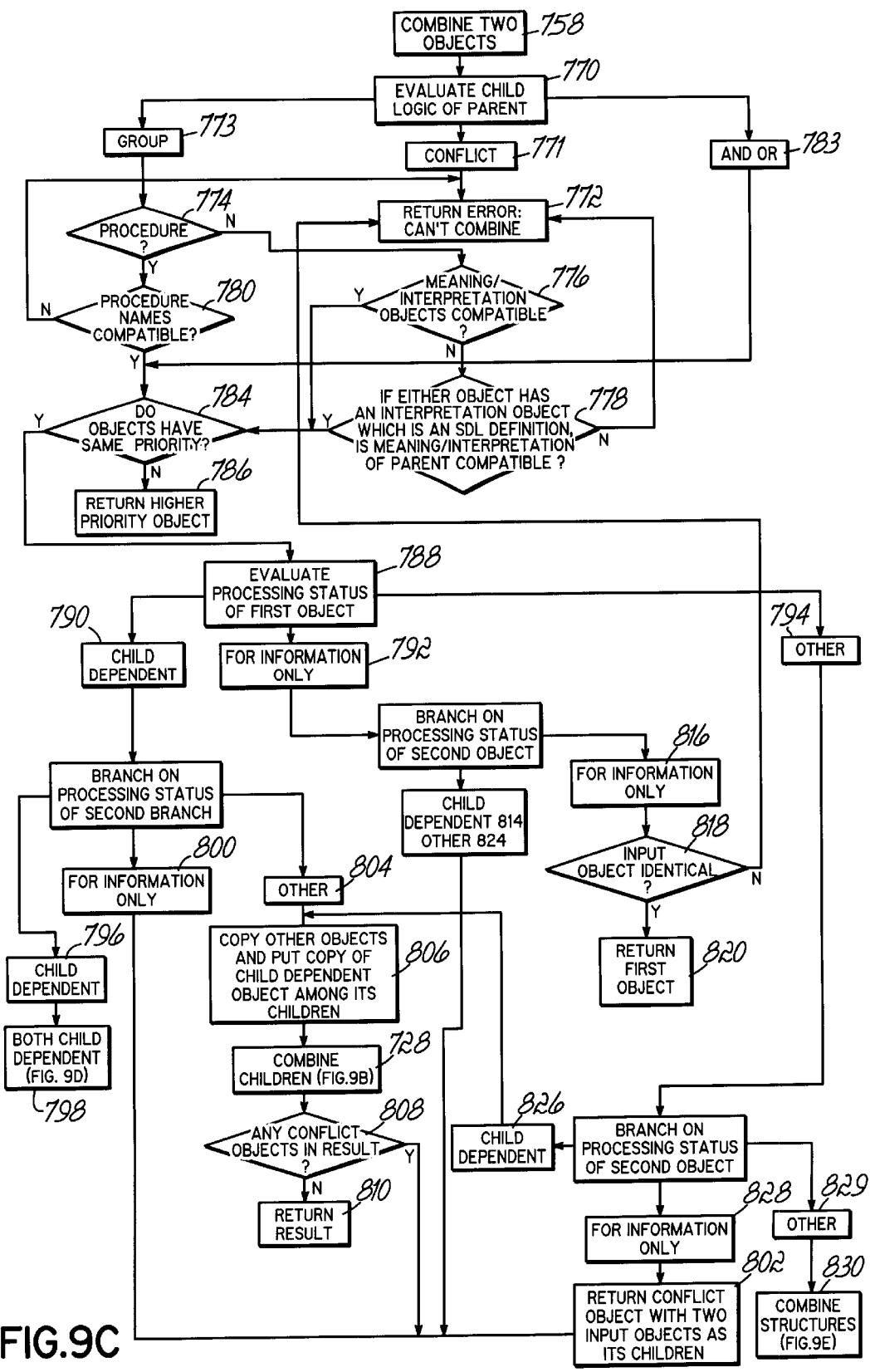
FIG. 9C is a flow chart of combining two objects.

If in step 758 it is determined that the meaning of the two objects delivered to the combine two objects routine of FIG. 9C allows those objects to be combined, then a single object will be returned. This single object will either be a combined object reflecting the combined meaning of the two input objects, or will be a conflict object, reflecting that the two combined objects cannot be reconciled. In either case, processing proceeds to step 760 where the candidate object is replaced with the result object produced in step 758. Processing then proceeds to step 762 to determine whether there is another child of the temporary parent object to be tested as described above.

After all children of the temporary parent object have been tested for combination with other children and returned to a position as children of the Input parent object, in step 754 it will be determined that there are no other temporary children of the parent. In this case, processing proceeds to step 768 in which the input parent and its children which have been combined are returned as the result of the combine children routine of FIG. 9B.

Referring now to FIG. 9C, the process for combining two objects can be explored. This process begins with step 770 in which the child logic of the parent of the two objects is evaluated. Different actions are taken for different objects, as explored below If the child logic of the parent is CONFLICT, 771, this indicates the children cannot be combined and, therefore, in step 772, an indication is returned that the child objects cannot be combined.

If the child logic is GROUP 773, then in step 774 the two objects are evaluated to determine if both objects are procedures. If not, then in step 776 the two objects are evaluated to determine if their meaning or interpretation are compatible. Specifically, the meaning/interpretation pointed in each object is evaluated to determine if both pointers identify the same meaning object. If the meaning/interpretation pointers for the two objects are not compatible, then in step 778, it either or both of the two objects has an interpretation or meaning object which itself is an SDL definition, then the meaning of the parent of the SDL definition is obtained and it is compared in the same manner for compatibility If, in this second step, it is determined that the objects do not have compatible meanings, then processing continues again to step 772 and an error result is returned indicating that the objects may not be combined.

If, in step 774, it is determined that the objects to be combined are procedures, then in step 780 the procedure names are compared to determine whether they are compatible, i.e. identical. If not, then the objects may not be combined and processing continues to step 772. If the child logic of the parent object is either AND or 783, or if the meaning and interpretation of the objects are compatible in step 776 or step 778, then in step 784 the priorities of the two objects are compared. If the two objects do not have the same priority, then in step 786 the object with the higher priority is returned as the result of combining the two objects. This causes higher priority objects to override lower priority objects. A similar procedure may be used in alternative embodiments of the invention to prioritize verified objects, i.e. those that have been determined to be correct representations of a specification, over unverified objects that have not yet been determined and verified to be a correct representation of a specification. Prioritization based on approval status, i.e. verified and unverified status, may be performed before or after prioritization based on the priority property of the objects.

If the objects to be combined are the same priority in step 784, then in step 788 different actions are taken based upon the processing status of the two objects. Specifically, based on the processing status of the first object to be combined, processing will branch to CHILD DEPENDENT 790, FOR INFORMATION ONLY 792 and all other 794 branches. Under each of these branches, further branches will be performed based upon the processing status of the second object. Specifically, when the first object is CHILD DEPENDENT 790 and the second object is CHILD DEPENDENT 796, special processing for combining two objects which are both CHILD DEPENDENT will be performed in step 798 as elaborated below with reference to FIG. 9D. If the first object is CHILD DEPENDENT 790 and the second object is FOR INFORMATION ONLY 800 then in step 802 a conflict object will be returned with the two objects as children, indicating that the two objects may not be combined. If the first object is CHILD DEPENDENT 790 and the second object is some other value 804, then in step 806, a copy of the CHILD DEPENDENT object will be included in the children of the other object. Then in step 728, the combine children routine of FIG. 9B will be repeated to attempt to combine the CHILD DEPENDENT object with the children of the other object. In step 808 the result is evaluated to determine whether any conflict object was created. If not, then the combination of the object is successful, and then in step 810 the result is returned. If a conflict object was created, then there is a conflict between the CHILD DEPENDENT and other objects and so a conflict object is created in step 802 with the CHILD DEPENDENT and other object as children of the conflict object, and this conflict object is returned as the result of the combine two objects routine of FIG. 9C.

If the first object is FOR INFORMATION ONLY 792, then the second object is either CHILD DEPENDENT 814, or other 824, processing proceeds to step 802 to return a conflict object. If the first object is FOR INFORMATION ONLY 792, and the second object is FOR INFORMATION ONLY 816, then in step 818 it is determined whether the two objects are exactly identical. If so, the first object is returned 820 as the result of combining the two objects. If not, then the two objects cannot be combined and an error condition is returned by proceeding to step 772. If the first object is other 794, and the second object is CHILD DEPENDENT, 826, then processing continues to step 826 to attempt to combine the two objects as described above. If the first object is other 794 and the second object is FOR INFORMATION ONLY 828, then processing proceeds to step 802 to return a conflict object as discussed above. If the first object is an other object 794 and the second object is an other object 829, then processing continues to a combine structures routine 830 described below with reference to FIG. 9D.

Figure 9D:
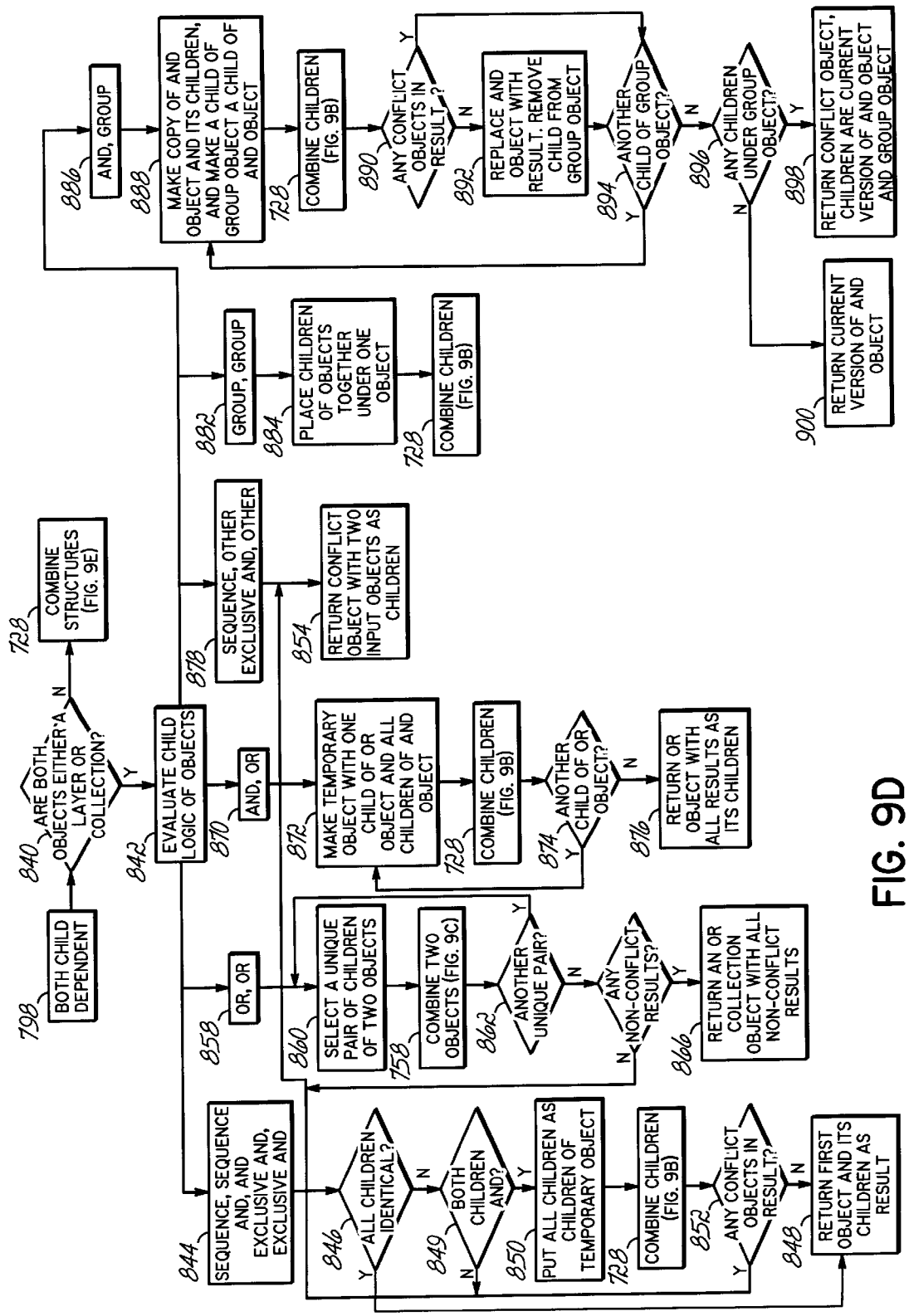
FIG. 9D is a flow chart of processing involved in combining two objects both having CHILD DEPENDENT child logic.

Referring now to FIG. 9D, the process for combining two objects which are both CHILD DEPENDENT (step 798) can be described. In a first step 840, the objects are evaluated to determine whether the objects are either layer or collection class objects. If not, processing continues to a combine structures routine described below with reference to FIG. 9E. If the two objects are either a layer or collection object, then in step 842 the child logic of the two objects is evaluated to determine the appropriate action to take. As will be seen below, the action to be taken with respect to the two objects is highly dependent upon the child logic of the two objects. If the child logic of the two objects is both SEQUENCE, both AND or both EXCLUSIVE AND 844, then in step 846 the two children are evaluated to determine if they are exactly the same. If so, in step 848, the first object is returned as the result. If the children are not exactly the same, then in step 849, it is determined whether the two objects are both AND. If not, then in step 854 the conflict object is created. If both objects are AND, then in step 850, all of the children of the two objects are placed beneath a temporary parent object. Then, in step 728, the combine children routine of FIG. 9B of FIG. 9B is invoked to attempt to combine the children into a smaller number of objects. Thereafter, in step 852, the result of the combine children routine of FIG. 9B is evaluated to determine whether any conflict objects were returned. If there were conflict objects returned, then in step 854 the conflict object is returned with the two objects input to the CHILD DEPENDENT processing routine 798 as its children. If no conflict objects are returned in step 728, then in step 856, the first object delivered to the CHILD DEPENDENT processing routine 798 is returned, with its children equal to the results returned in step 728.

If the child logic of the two objects to be combined is both OR 858, then in step 860, a unique pair of children from the two objects is selected, and this pair of children is passed to the combine two objects routine of FIG. 9C of FIG. 9C. Thereafter, if there is another unique pair in step 862, processing returns to step 758 to pass this unique pair to the combine two objects routine of FIG. 9C of FIG. 9C. After this process has been performed for every unique pair of children of the two objects, then in step 864, it is determined whether any non-conflict results were produced. If so, then in step 866 an OR object is returned with all the non-conflict results as its children. If not, then in step 854 a conflict object is returned with the two objects passed to the CHILD DEPENDENT processing routine 798 as its children. If the two CHILD DEPENDENT objects to be combined have CHILD DEPENDENT child logic 870, then in step 872 a temporary object is created having as one child a first child of the OR object, and as a second set of children all of the children of the AND object. Then in step 728 the combine children routine of FIG. 9B of FIG. 9B is invoked. Thereafter, in step 874, if there are any other children of the OR object, processing returns to step 872 to make a new temporary object having the next child of the OR object and all of the children of the AND object and the combine children routine of FIG. 9B of FIG. 9B is again invoked. After all of the children of the OR object have been combined with the children of the AND object, then in step 876 an OR object is returned, including all of the results produced in step 728 as its children.

If the child logic of the two CHILD DEPENDENT objects is SEQUENCE and other or EXCLUSIVE AND and other 878, then in step 854, a conflict object is returned having these two objects as their children, since objects with this combination of child logic cannot be combined.

If the child logic of the two CHILD DEPENDENT objects to be combined is GROUP 882, then in step 884 the children of the first and second objects are put together under one of the two objects and this object is then passed to the combine children routine of FIG. 9B of FIG. 9B. The result of the combine children routine of FIG. 9B will then be the result of combining the two CHILD DEPENDENT objects.

If the child logic of the two CHILD DEPENDENT objects is AND and GROUP 886, then in step 888 a temporary copy is created of the AND object and the children of the AND object and a child of the GROUP object is included amongst the children of the copy of the AND object. Then, in step 728, the combine children routine of FIG. 9B of FIG. 9B is invoked to attempt to combine the children of the new temporary object. In step 890, it is determined whether any conflict objects were produced as a result of the combine children routine of FIG. 9B. If not, then at step 892 the AND object is replaced with the result of the combine children routine of FIG. 9B, and the child of the GROUP object that was used is removed from the GROUP object. Thereafter, or immediately after step 890 if a conflict object was produced, the GROUP object is evaluated to determine if it has another child in step 894. If so, then processing returns to step 888 in which the AND object and its children are copied and another child of the GROUP object is added to the children of the copy of the AND object. After all children of the GROUP object have been evaluated in this manner, processing proceeds from step 894 to step 896 where it is determined whether there are any children of the GROUP object remaining. Children will be remaining in the GROUP object if conflicts were created between the children of the AND object and any one child of the GROUP object. If children are remaining, then in step 898, a conflict object is returned including the current AND object and the GROUP object as its children. If no children remain in the GROUP object, then none of the children of the GROUP object conflicted with children of the AND object, and in this case, in step 900, the AND object is returned.

Figure 9E:
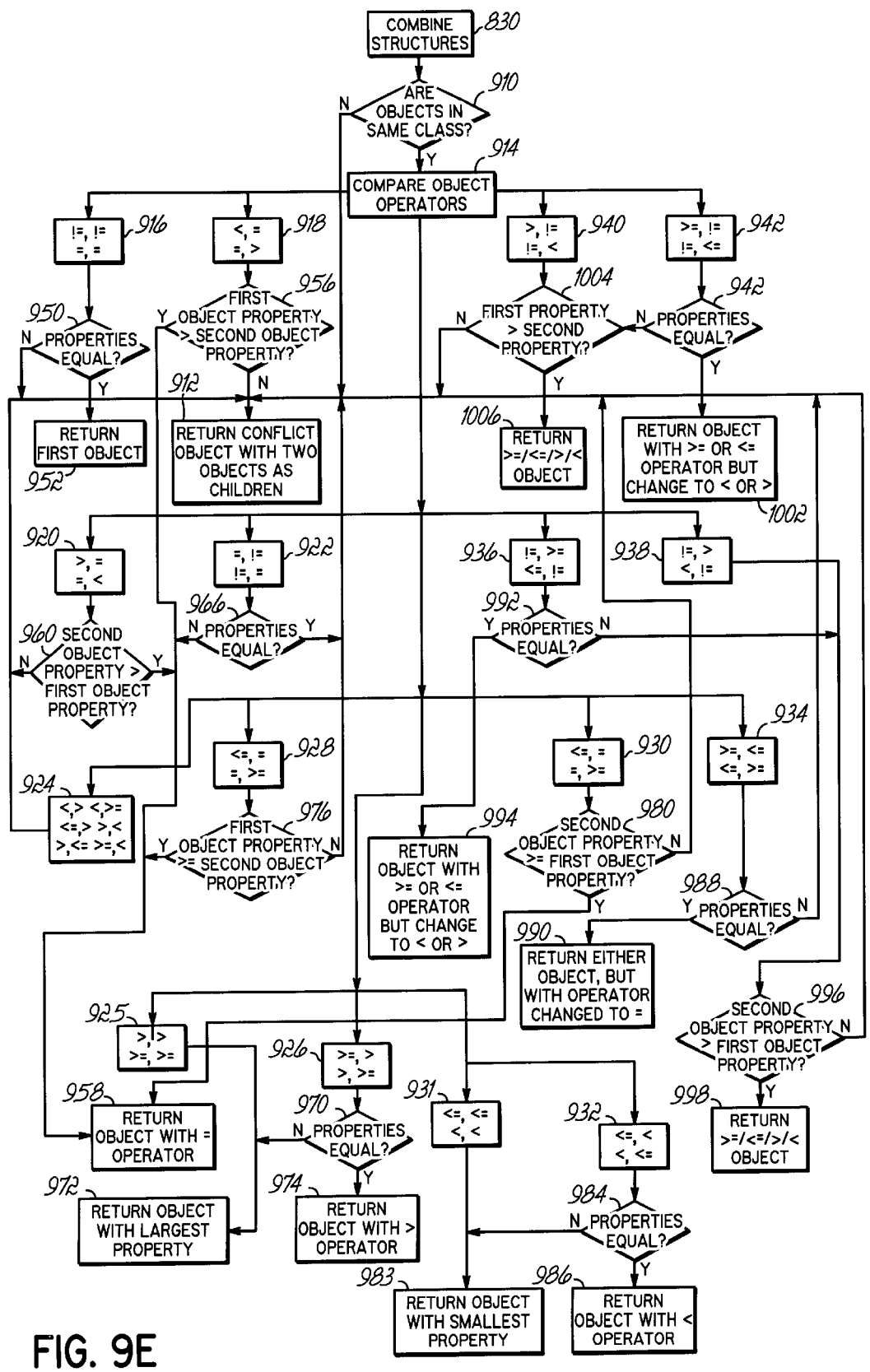
FIG. 9E is a flow chart of combining the structures of two objects having combinable meanings.

Referring now to FIG. 9E, the process for combining structures of step 830 can be elaborated. This process is used to combine structures having combinable meanings. As a first step in this process, in step 910, the objects are evaluated to determine if they are of the same class. If not, then in step 912, a conflict object is returned with two objects as its children. Only if the objects are of the same class is an attempt made to combine the objects. Specifically, in step 914, the object operators of the two objects are compared.

As will be seen below, different actions are taken for different combinations of object operators in the two objects being combined. Cases are illustrated in FIG. 9E at steps 916, 918, 920, 922, 924, 926, 928, 930, 932, 934, 936, 938, 940 and 942. In each illustrated case, the object operator of the first object and then the object operator of the second object are identified as an ordered pair. Note that != indicates an object operator of not equal ($\neq$), >= indicates an object operator of greater than or equal ($\geq$), and <= indicates an object operator of less than or equal ($\leq$).

In case 916, where the object operators are either both not equal ($\neq$) or both equal (=), the objects can be combined only if the properties of the objects are also both exactly equal.

Thus, in step 950, the properties of the two objects are compared. If the two properties are equal, then in step 952 the first object is returned as the result of the combine routine. If the properties of the two objects are not equal, then in step 912, a conflict object is returned having the two objects as children.

In case 918, the first object property must be compared to the second object property to determine whether there is consistency. Specifically, in step 956, it is determined whether the first object's property is greater than the second object's property If so, then in step 958 the object having an object operator of equal (=) is returned as the result of the combination. If not, in step 912, a conflict object is returned.

In case 920, the two object properties must be compared as well. Specifically, in step 960, it is determined whether the second object's property is greater than the first object's property. If so, then in step 958, the property having the object operator of equal (=) is returned. If not, in step 912, a conflict object is returned.

In case 922, the object properties must be compared to determine whether they are equal. Thus, in step 966, the properties are compared to determine whether they are equal. If the properties are not equal, then in step 958 the object having the object operator of equal (=) is returned. If the properties are equal, then in step 912 a conflict object is returned.

In case 924, the objects are irreconcilable and a conflict object is returned in step 912.

In case 925, both objects have an object operator of greater than (>). In this situation, the largest property is returned in step 972.

In case 926, one property has an object operator of greater than (>), and the other object has an operator of greater than or equal (≧). In this situation, the properties must be compared to determine the appropriate action. Specifically, in step 970, the properties are compared to determine if they are equal. If so, in step 974, the property having the greater than (>) object operator is returned. If the properties are not equal, then the property having the largest value is returned in step 972.

In case 928, the object properties must be compared to determine if they are consistent. Specifically, in step 976, it is determined whether the first object's property is equal to or greater than the second object's property. If so, then in step 958, the object having the equal (=) object operator is returned. If not, then in step 912 a conflict object is returned.

In case 930, the objects must again be compared to determine if they are consistent. Specifically, in step 930, it is determined whether the second object's property is greater than or equal to the first object's property. If so, then in step 958, the object having the object operator of equal (=) is returned. If not, then in step 912 a conflict object is returned.

In case 931, both object operators are less than or equal (≦). In this situation, in step 983, the object having the smallest property is returned.

In case 932, the properties must be compared to determine what action to take. Specifically, in step 984, the properties are compared to determine whether they are equal. If the properties are equal then step 986 the object having the object operator of less than (<) is returned. If the properties are not equal, then in step 983, the smallest property is returned.

In case 934, the properties must be compared to determine if they are consistent. Specifically, in step 988, the properties are compared to determine if they are equal. If the properties are equal, then in step 990, either of the two objects is returned as the result, but its object operator is changed to equal (=) to reflect the fact that there is only the single point which satisfies both objects. If the properties of the two objects are not equal, then in step 912 a conflict object is returned. It will he noted that there may be a range of values for the property which satisfies both objects. However, the objects are not combined unless a single object can replace the two objects. Therefore, in this case, any situation in which the properties are not equal is considered a conflict.

In case 936, again the properties must be compared to determine the appropriate action to take. In step 992, the properties are compared to determine whether they are equal. If so, then in step 994, the object having an operator of less than or equal (≦) or greater than or equal (≧) is returned, but its object operator is changed to less than (<) or greater than (>), respectively. If the properties of the two objects are not equal, then in step 996 it is determined whether the property of the second object is grater than the property of the first object. If so, then in step 998 the object with an operator of greater than or equal (≧) or less than or equal (≦) is returned. If not, in step 912 a conflict object is returned.

In case 938, the properties must be compared in step 996 to determine the appropriate action to take, and then proceed to step 998 or 912.

In case 940, the properties must be compared to determine the appropriate action to take. Specifically, in step 1004, it is determined whether the first property is greater than the second property. If not, then in step 912 a conflict object is returned. If so, then in step 1006 an object having the object operator of less than (<) or greater than (>) or less than or equal (≦) or greater than or equal (≧) is returned.

In case 942, again the properties must be compared to determine the appropriate action to take. Specifically, in step 1000, it is determined whether the properties are equal. If so, then in step 1002 the property having an object operator greater than or equal (≧) or less than or equal (≦) is returned, but the object operator is changed to greater than (>) or less than (<). If, in step 1000, the properties are not equal, then processing proceeds to step 1004 to determine the appropriate action to take, as described above.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

SDL Document Name: AMS 4965
Originating Organization: SAE
Appendix A
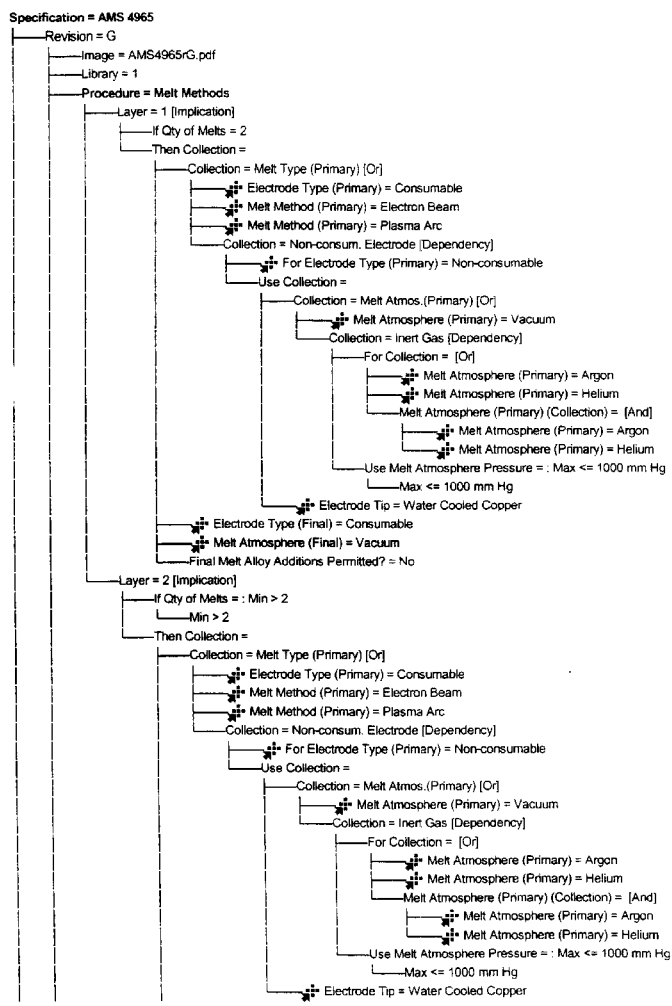

Appendix A
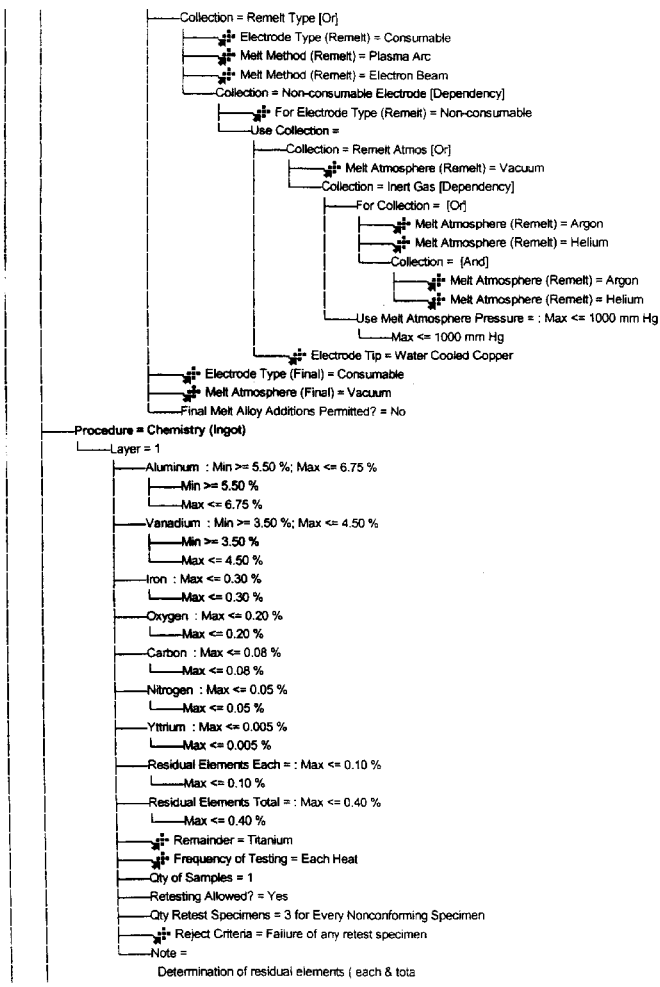

Appendix A

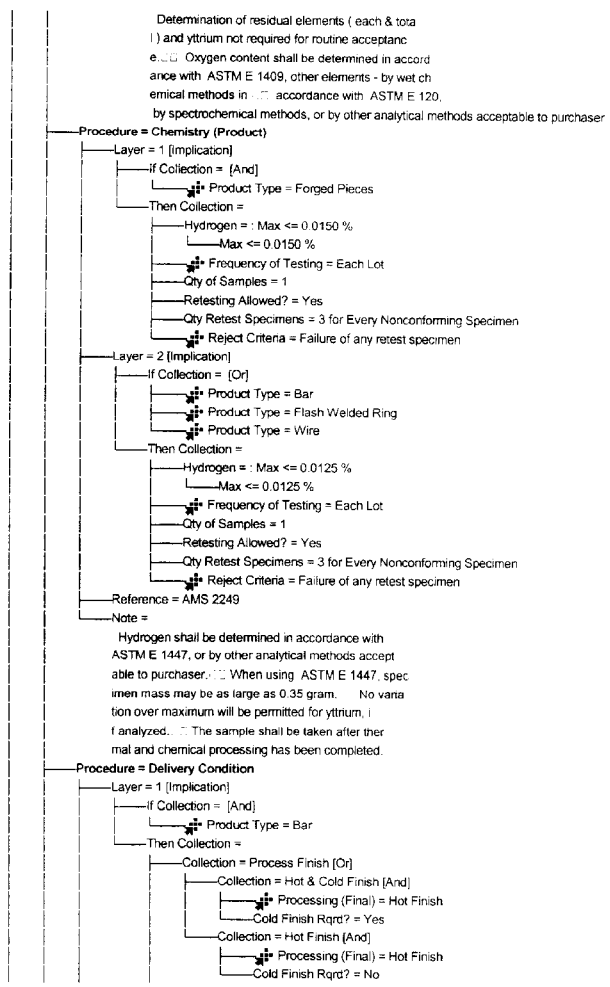

```
        |       Determination of residual elements ( each & tota
        |       l ) and yttrium not required for routine acceptanc
        |       e.    Oxygen content shall be determined in accord
        |       ance with ASTM E 1409, other elements - by wet ch
        |       emical methods in     accordance with ASTM E 120,
        |       by spectrochemical methods, or by other analytical methods acceptable to purchaser
        |-----Procedure = Chemistry (Product)
        |         |-----Layer = 1 [Implication]
        |         |       |-----If Collection = [And]
        |         |       |        L----* Product Type = Forged Pieces
        |         |       L-----Then Collection =
        |         |                |-----Hydrogen = : Max <= 0.0150 %
        |         |                |        L----Max <= 0.0150 %
        |         |                |----* Frequency of Testing = Each Lot
        |         |                |-----Qty of Samples = 1
        |         |                |-----Retesting Allowed? = Yes
        |         |                |-----Qty Retest Specimens = 3 for Every Nonconforming Specimen
        |         |                L----* Reject Criteria = Failure of any retest specimen
        |         |-----Layer = 2 [Implication]
        |         |       |-----If Collection = [Or]
        |         |       |        |----* Product Type = Bar
        |         |       |        |----* Product Type = Flash Welded Ring
        |         |       |        L----* Product Type = Wire
        |         |       L-----Then Collection =
        |         |                |-----Hydrogen = : Max <= 0.0125 %
        |         |                |        L----Max <= 0.0125 %
        |         |                |----* Frequency of Testing = Each Lot
        |         |                |-----Qty of Samples = 1
        |         |                |-----Retesting Allowed? = Yes
        |         |                |-----Qty Retest Specimens = 3 for Every Nonconforming Specimen
        |         |                L----* Reject Criteria = Failure of any retest specimen
        |         |-----Reference = AMS 2249
        |         L-----Note =
        |                 Hydrogen shall be determined in accordance with
        |                 ASTM E 1447, or by other analytical methods accept
        |                 able to purchaser.    When using ASTM E 1447, spec
        |                 imen mass may be as large as 0.35 gram.    No varia
        |                 tion over maximum will be permitted for yttrium, i
        |                 f analyzed.    The sample shall be taken after ther
        |                 mal and chemical processing has been completed.
        |-----Procedure = Delivery Condition
        |         |-----Layer = 1 [Implication]
        |                 |-----If Collection = [And]
        |                 |        L----* Product Type = Bar
        |                 L-----Then Collection =
        |                          |-----Collection = Process Finish [Or]
        |                          |        |-----Collection = Hot & Cold Finish [And]
        |                          |        |        |----* Processing (Final) = Hot Finish
        |                          |        |        L-----Cold Finish Rqrd? = Yes
        |                          |        L-----Collection = Hot Finish [And]
        |                          |                 |----* Processing (Final) = Hot Finish
        |                          |                 L-----Cold Finish Rqrd? = No
```

Date: 7/7/1999

Appendix A
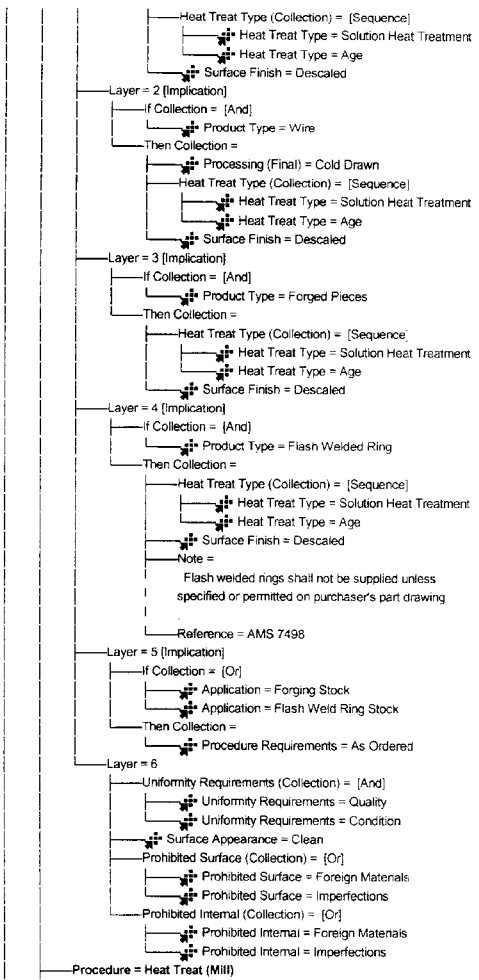

Appendix A
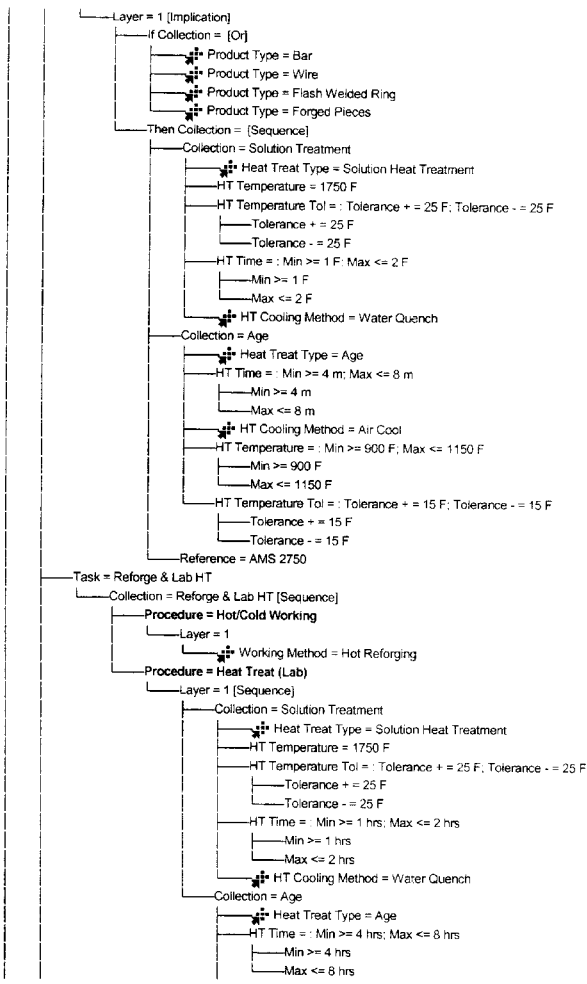

Appendix A
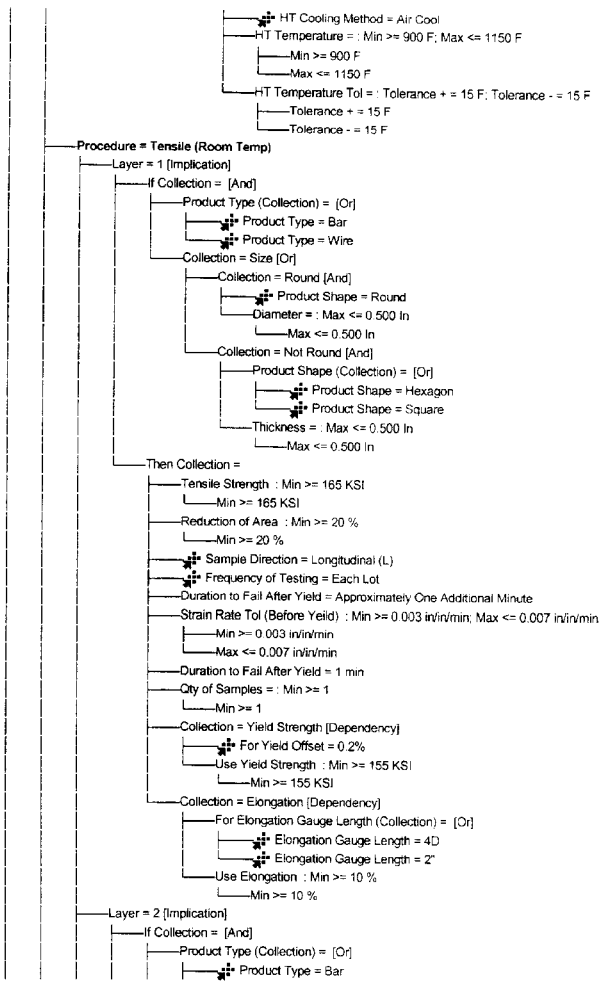

Appendix A
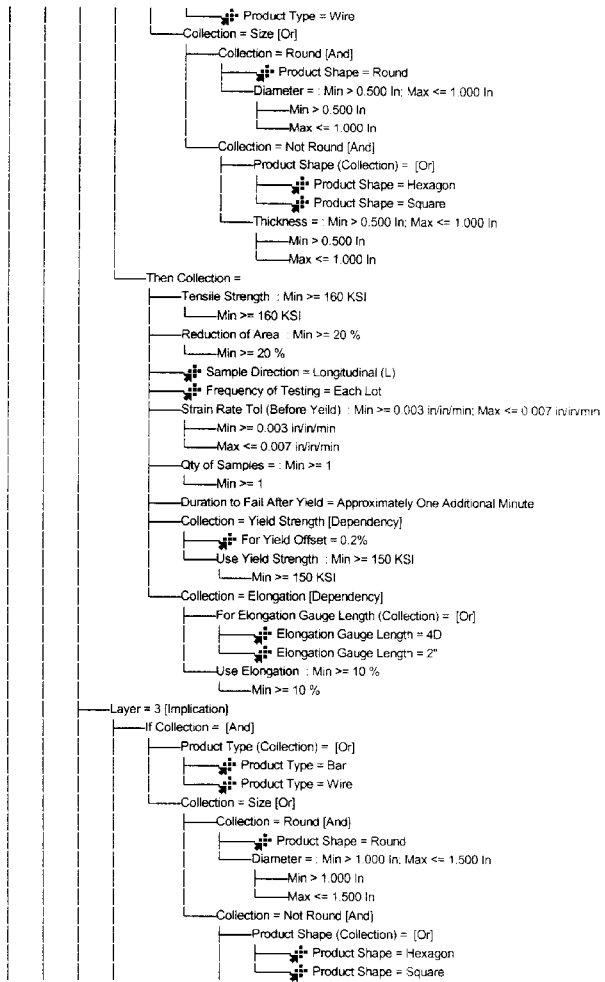

Appendix A
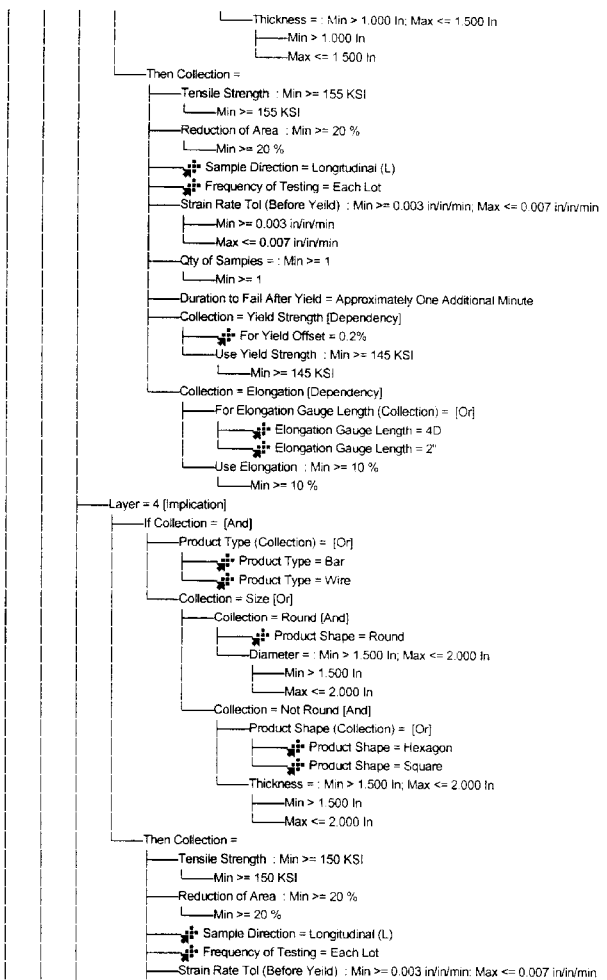

Appendix A
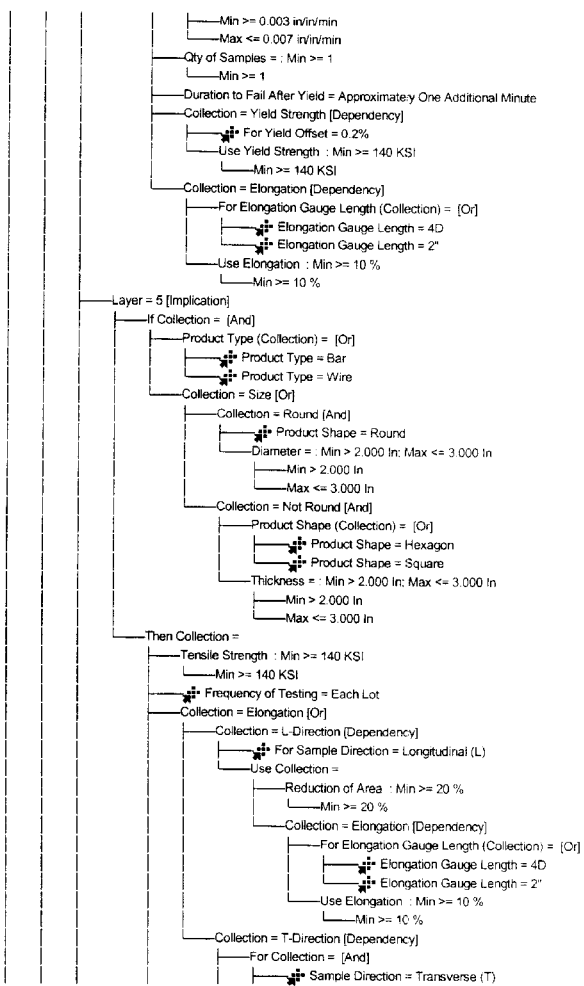

Appendix A
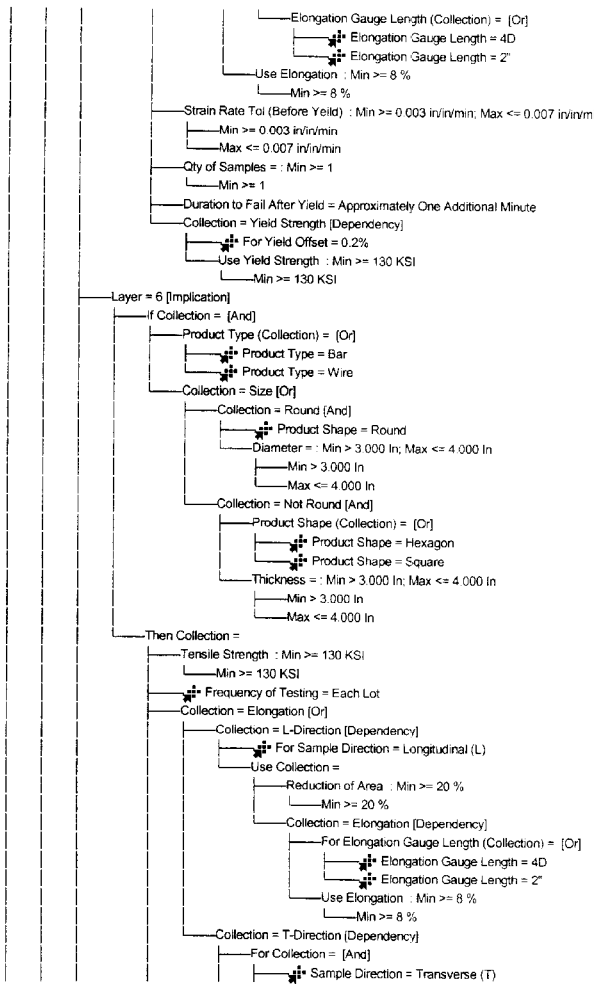

Appendix A
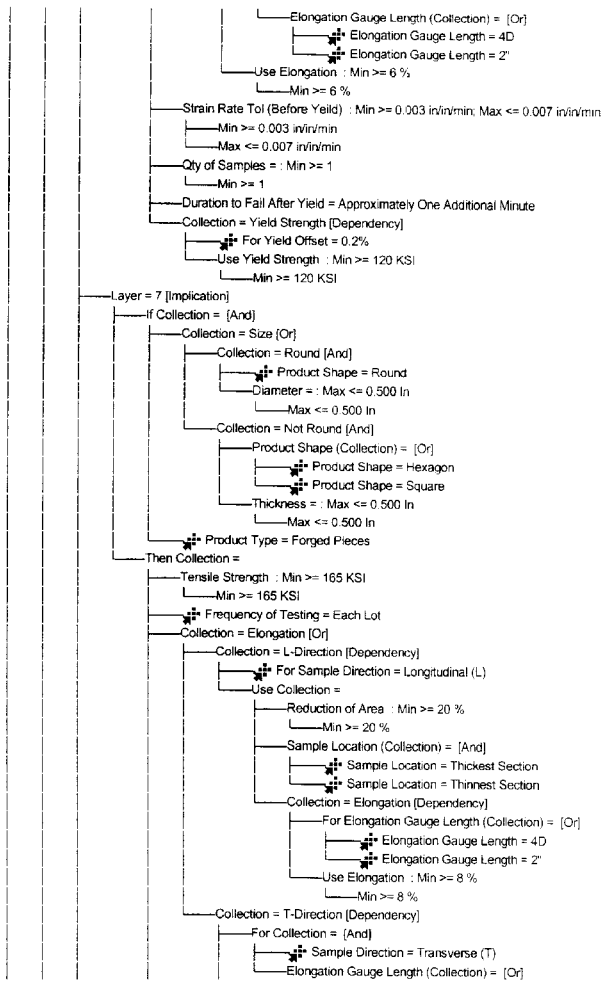

Appendix A
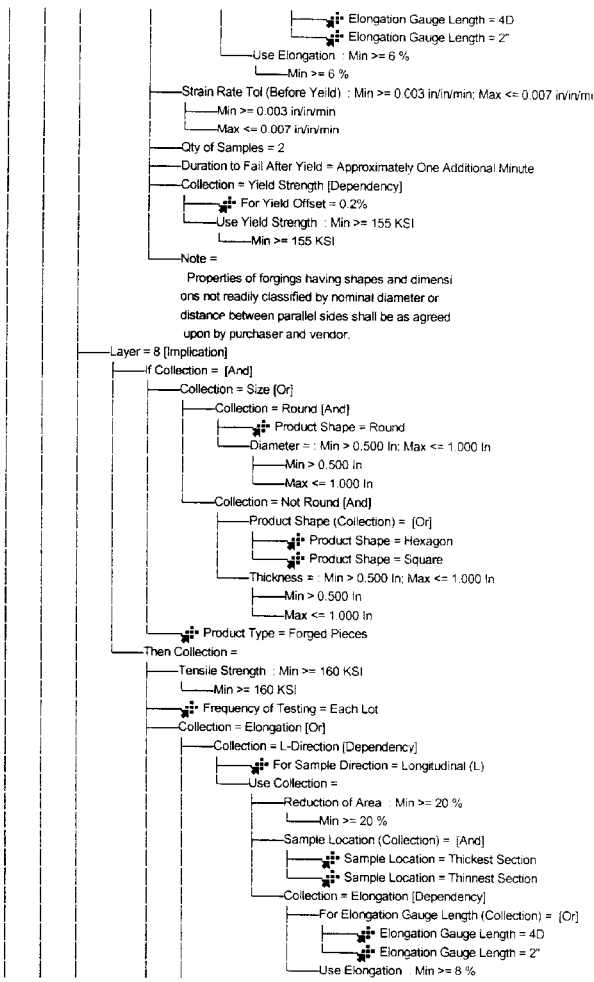

Appendix A
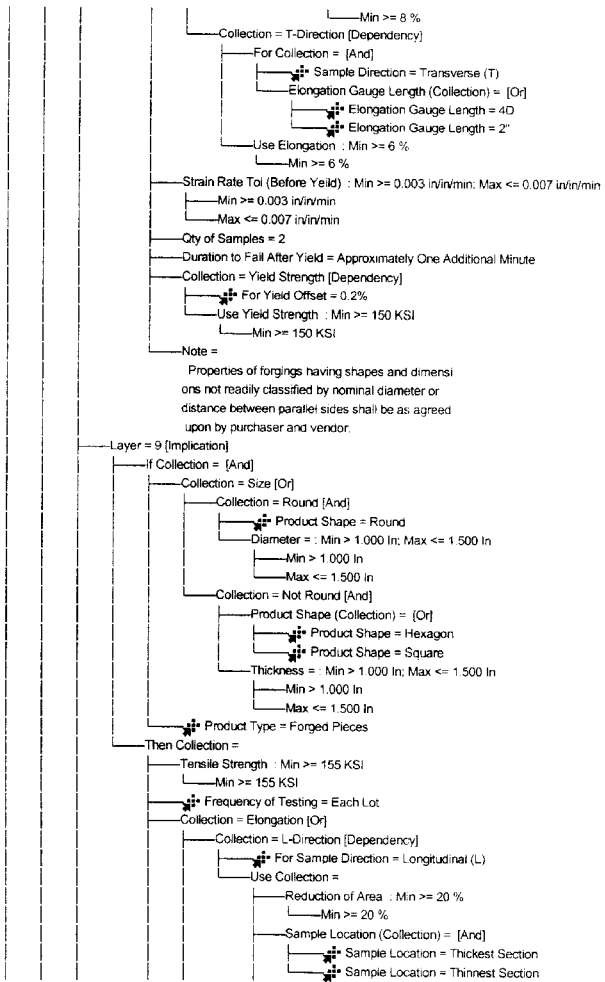

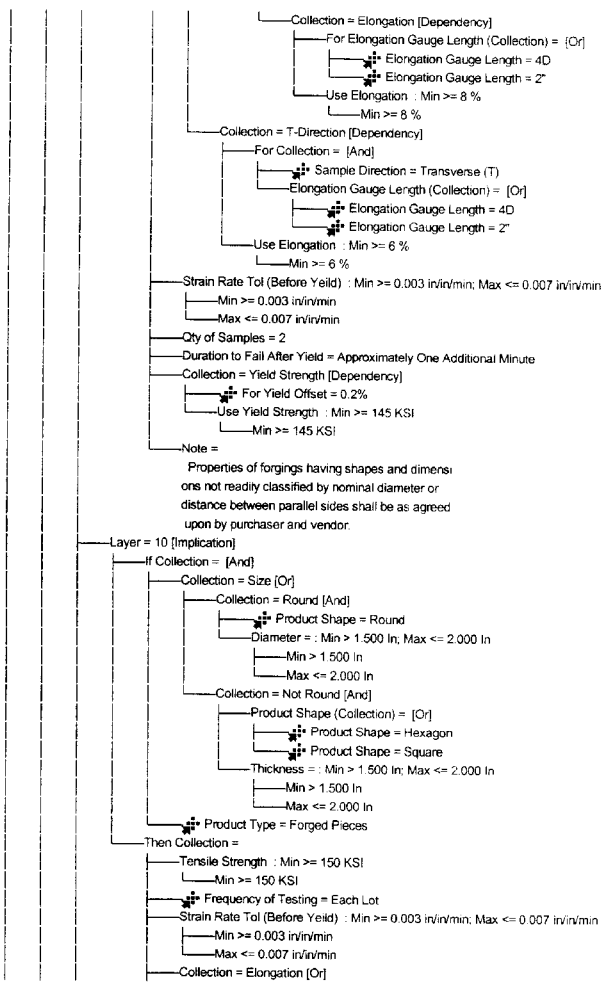
Appendix A

Appendix A
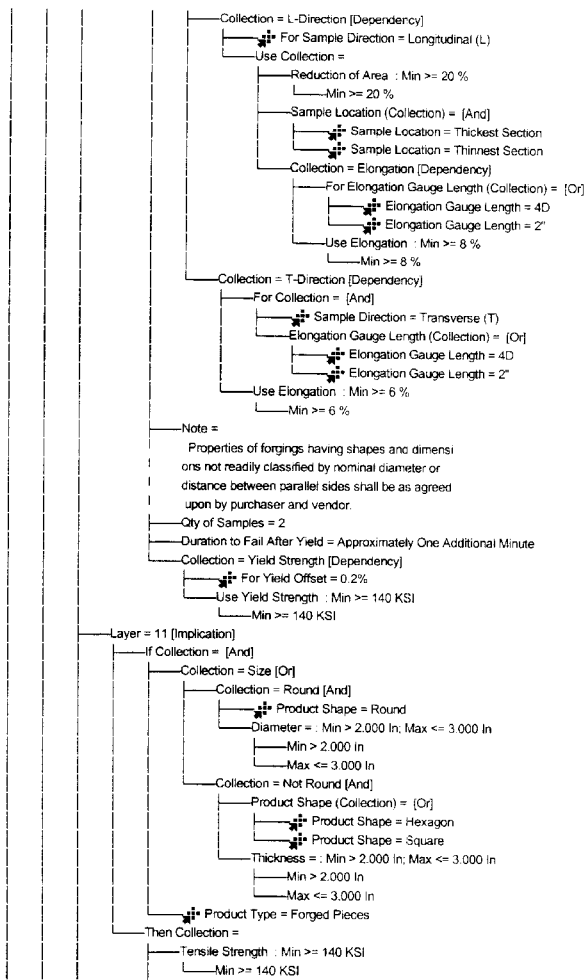

Appendix A
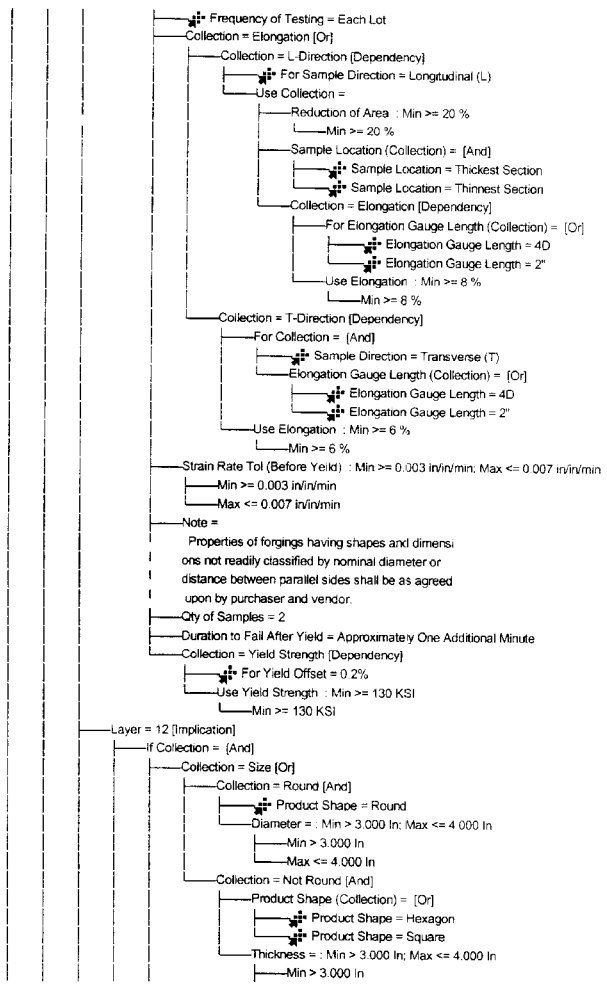

Appendix A
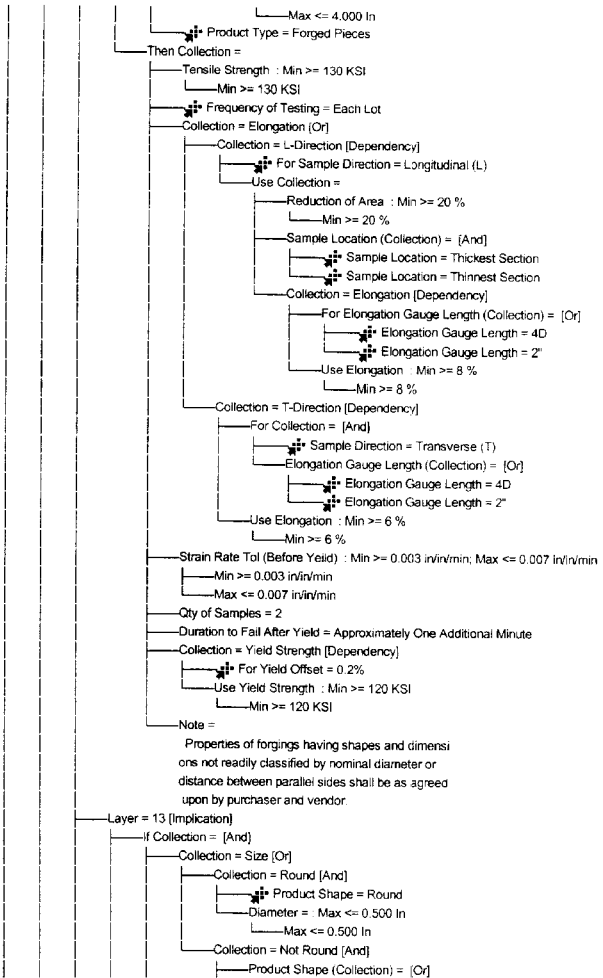

Appendix A
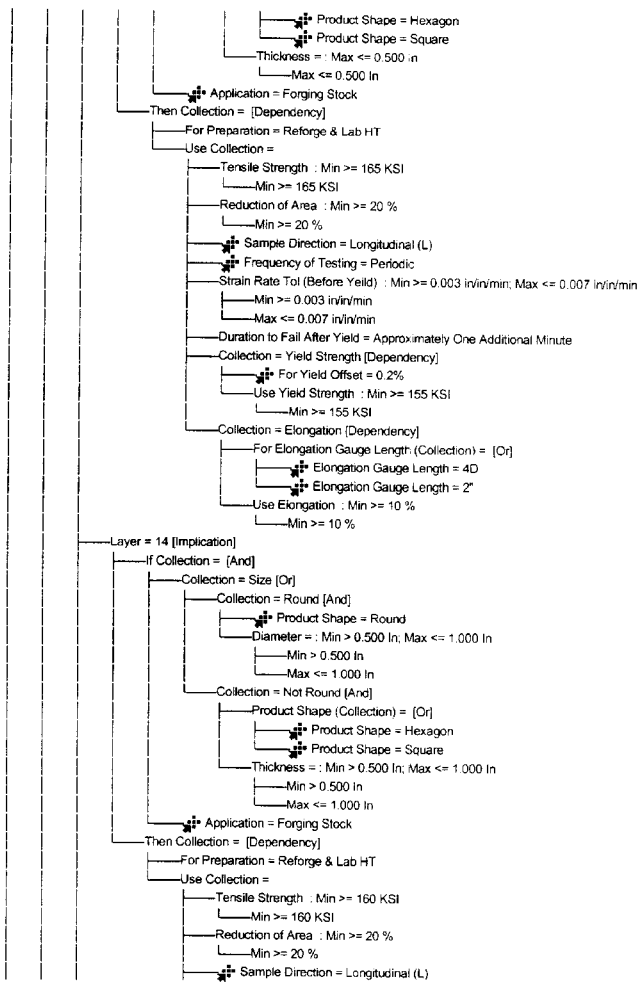

Appendix A
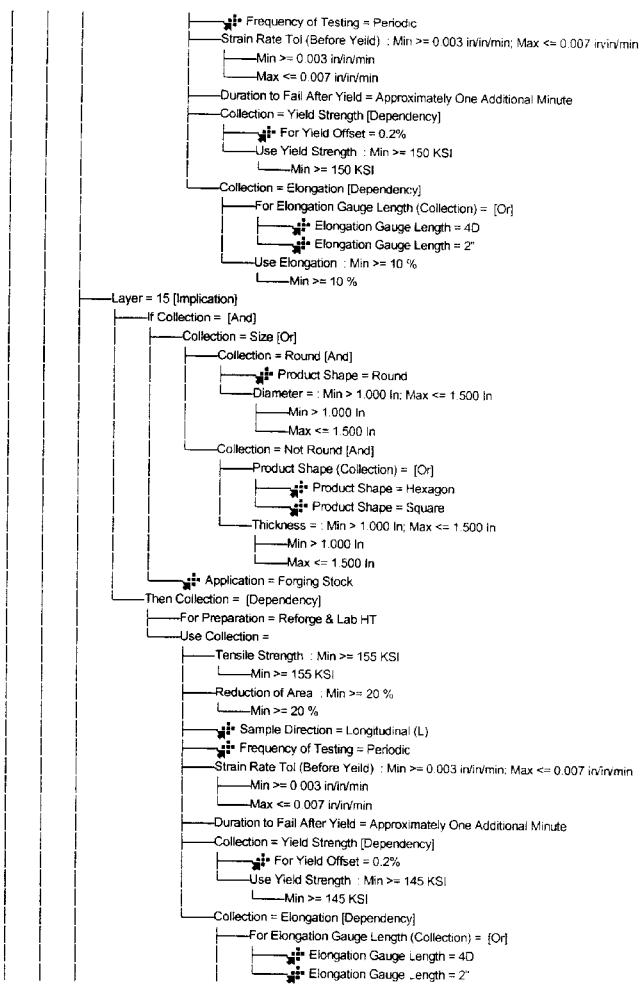

Appendix A
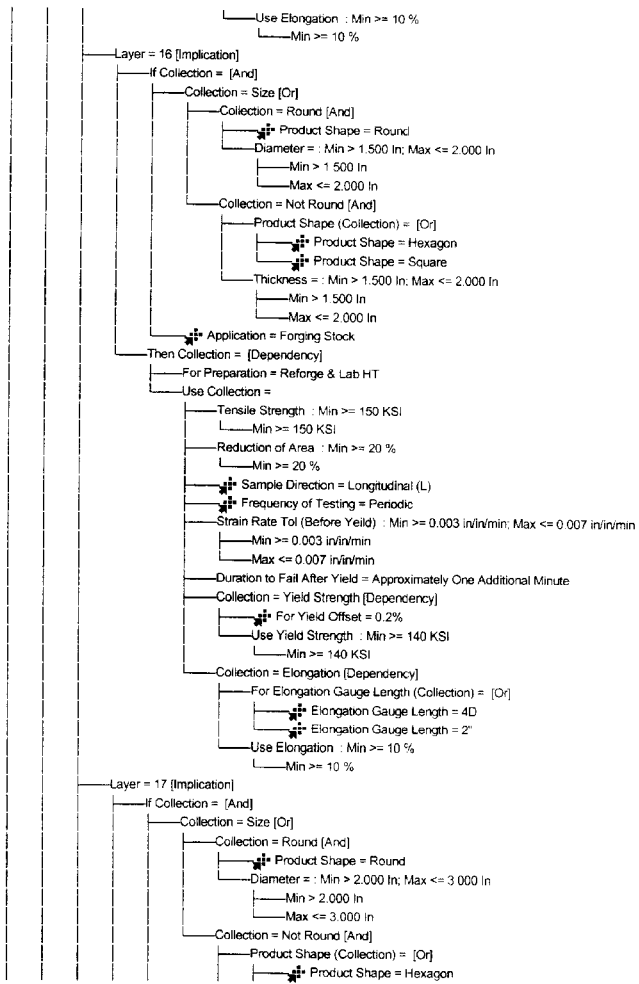

Appendix A
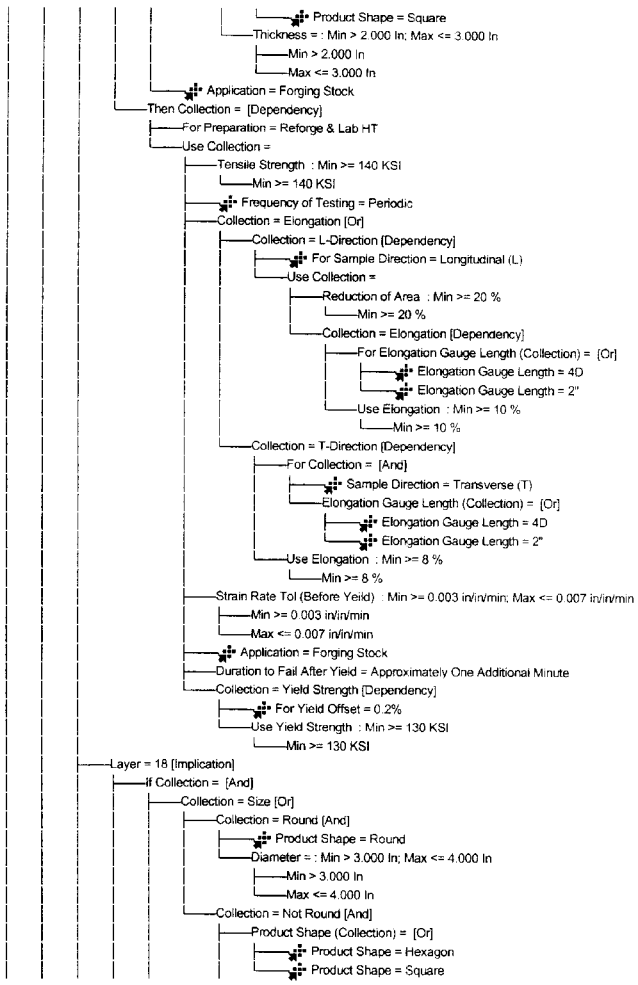

Appendix A
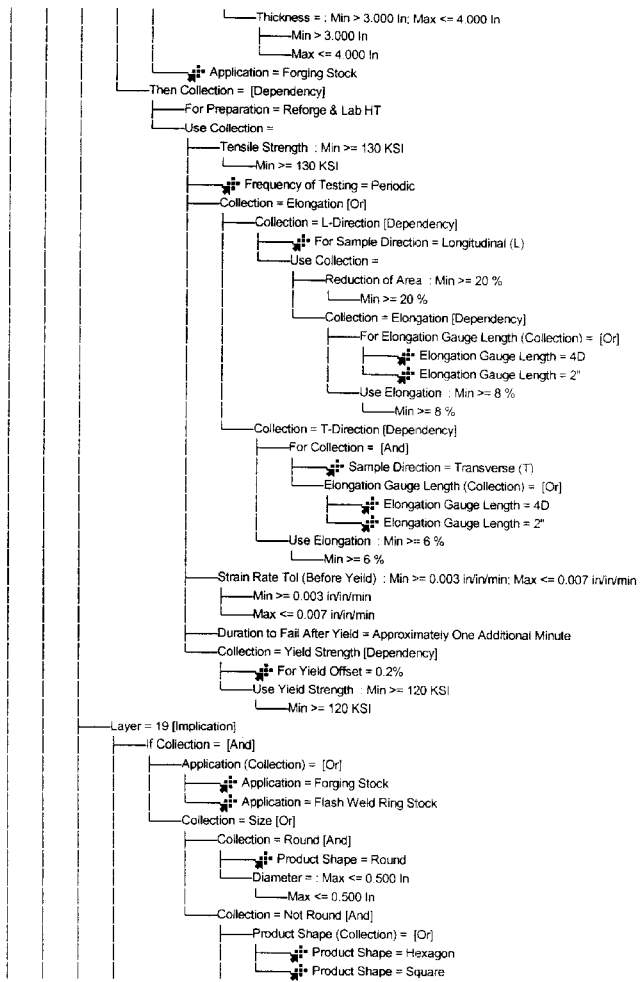

Appendix A
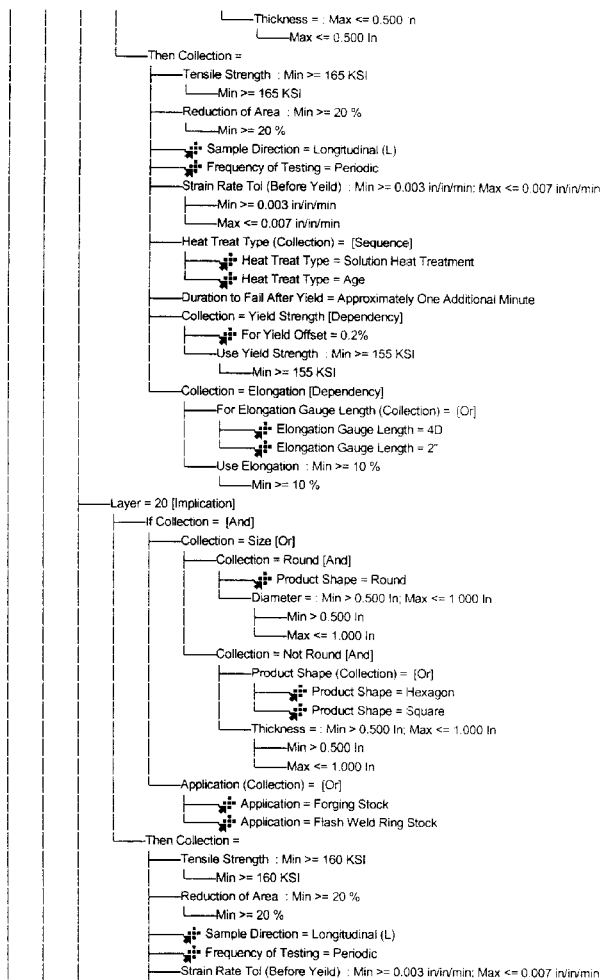

Appendix A
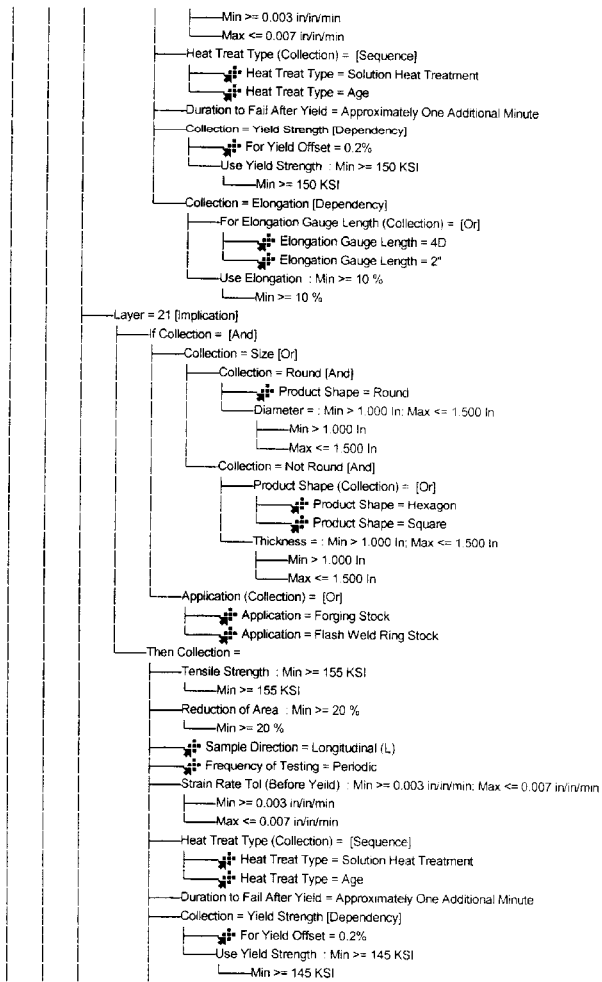

Appendix A
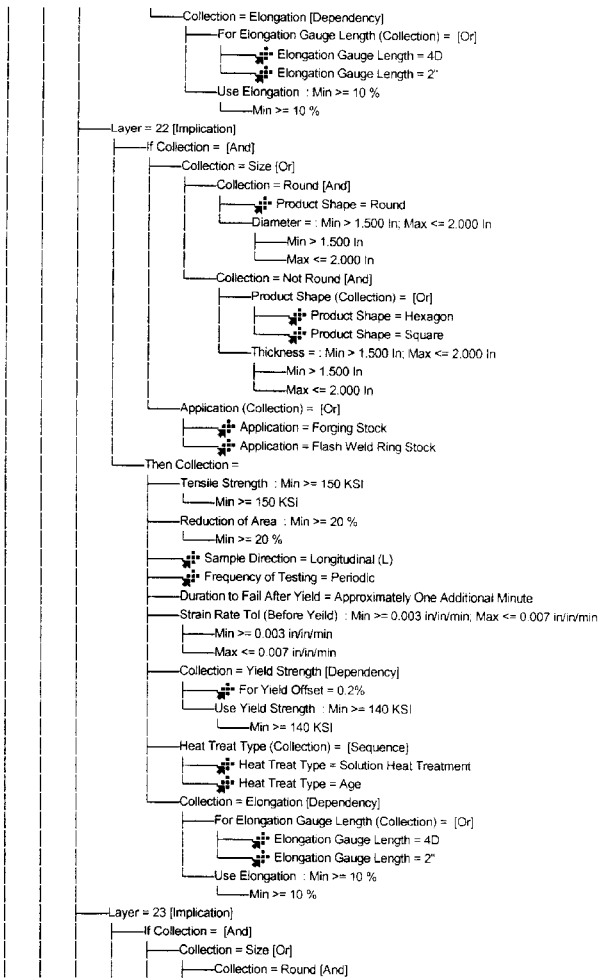

Appendix A

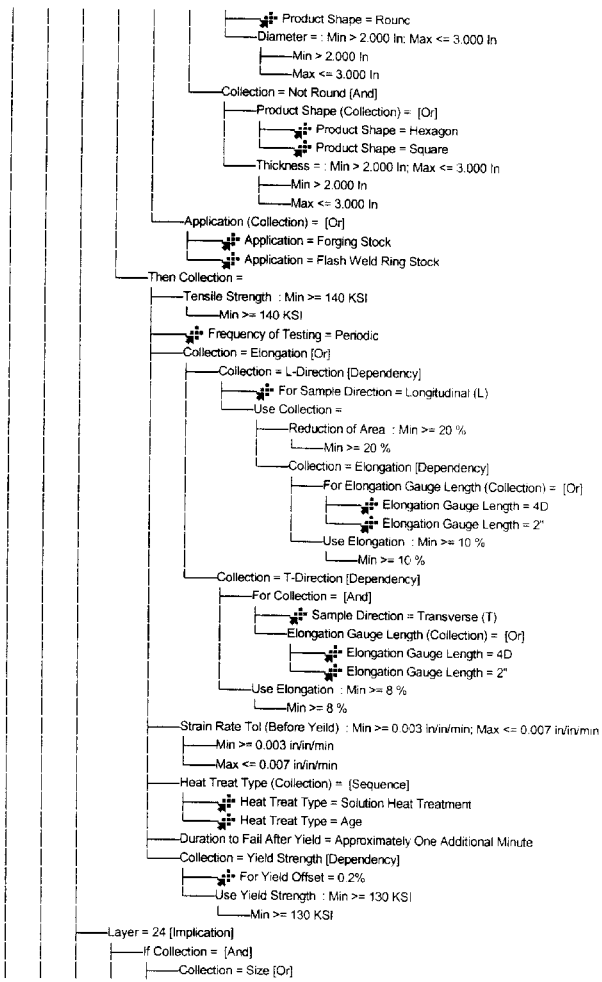

```
                      ├──┬- Product Shape = Round
                      │  └──Diameter = : Min > 2.000 In; Max <= 3.000 In
                      │           ├────Min > 2.000 In
                      │           └────Max <= 3.000 In
                      └──Collection = Not Round [And]
                          ├──Product Shape (Collection) = [Or]
                          │    ├──┬- Product Shape = Hexagon
                          │    └──┬- Product Shape = Square
                          └──Thickness = : Min > 2.000 In; Max <= 3.000 In
                                 ├────Min > 2.000 In
                                 └────Max <= 3.000 In
         └──Application (Collection) = [Or]
                ├──┬- Application = Forging Stock
                └──┬- Application = Flash Weld Ring Stock
   └──Then Collection =
         ├──Tensile Strength : Min >= 140 KSI
         │    └──Min >= 140 KSI
         ├──┬- Frequency of Testing = Periodic
         ├──Collection = Elongation [Or]
         │    ├──Collection = L-Direction [Dependency]
         │    │    ├──┬- For Sample Direction = Longitudinal (L)
         │    │    └──Use Collection =
         │    │          ├────Reduction of Area : Min >= 20 %
         │    │          │       └────Min >= 20 %
         │    │          └────Collection = Elongation [Dependency]
         │    │                 ├────For Elongation Gauge Length (Collection) = [Or]
         │    │                 │       ├──┬- Elongation Gauge Length = 4D
         │    │                 │       └──┬- Elongation Gauge Length = 2"
         │    │                 └────Use Elongation : Min >= 10 %
         │    │                         └────Min >= 10 %
         │    └──Collection = T-Direction [Dependency]
         │         ├──For Collection = [And]
         │         │    ├──┬- Sample Direction = Transverse (T)
         │         │    └──Elongation Gauge Length (Collection) = [Or]
         │         │          ├──┬- Elongation Gauge Length = 4D
         │         │          └──┬- Elongation Gauge Length = 2"
         │         └──Use Elongation : Min >= 8 %
         │               └────Min >= 8 %
         ├────Strain Rate Tol (Before Yeild) : Min >= 0.003 in/in/min; Max <= 0.007 in/in/min
         │        ├────Min >= 0.003 in/in/min
         │        └────Max <= 0.007 in/in/min
         ├────Heat Treat Type (Collection) = [Sequence]
         │        ├──┬- Heat Treat Type = Solution Heat Treatment
         │        └──┬- Heat Treat Type = Age
         ├────Duration to Fail After Yield = Approximately One Additional Minute
         └────Collection = Yield Strength [Dependency]
                  ├──┬- For Yield Offset = 0.2%
                  └──Use Yield Strength : Min >= 130 KSI
                         └────Min >= 130 KSI
└──Layer = 24 [Implication]
    ├──If Collection = [And]
    │    ├────Collection = Size [Or]
```

Appendix A
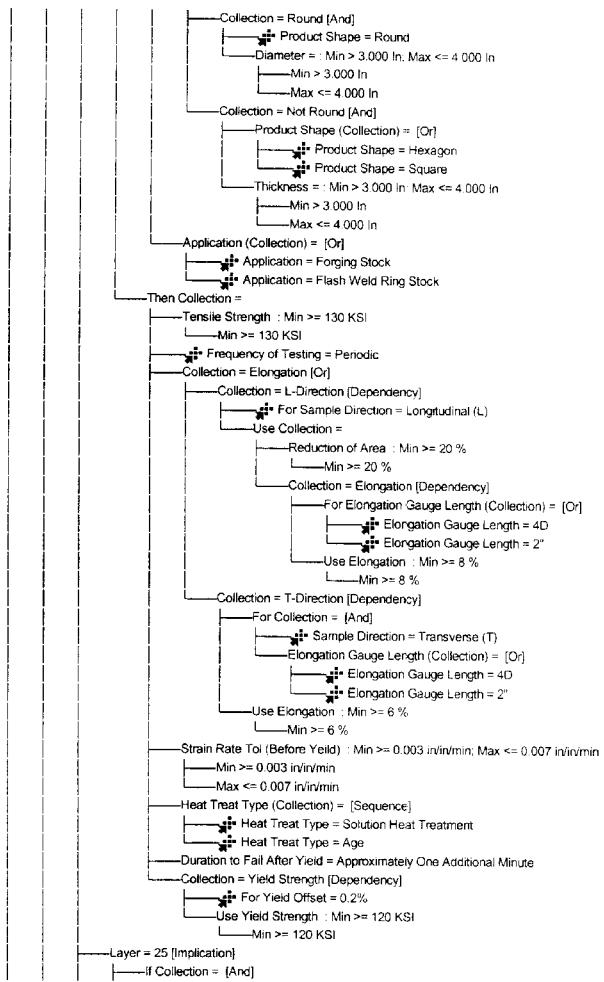

Appendix A
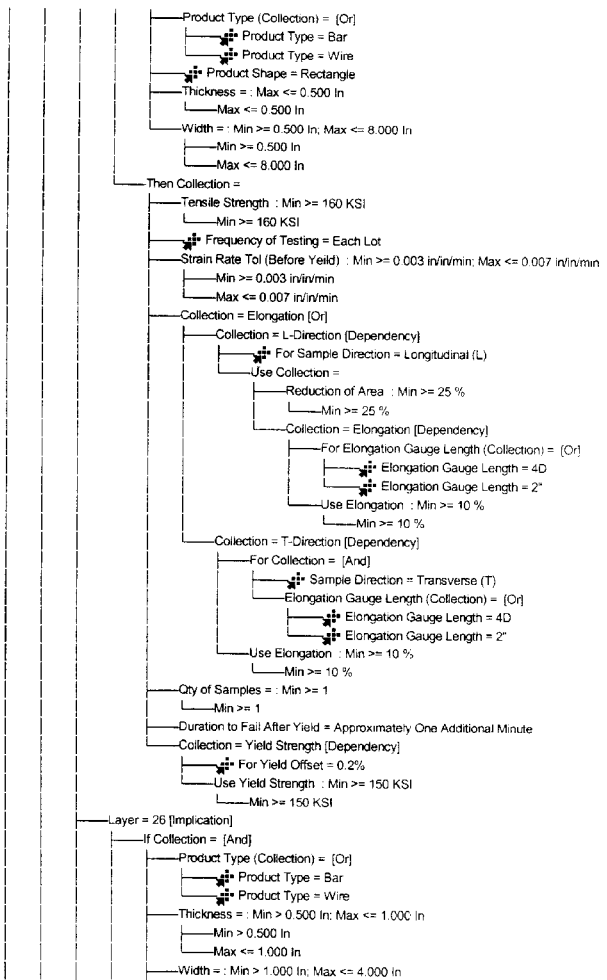

Appendix A
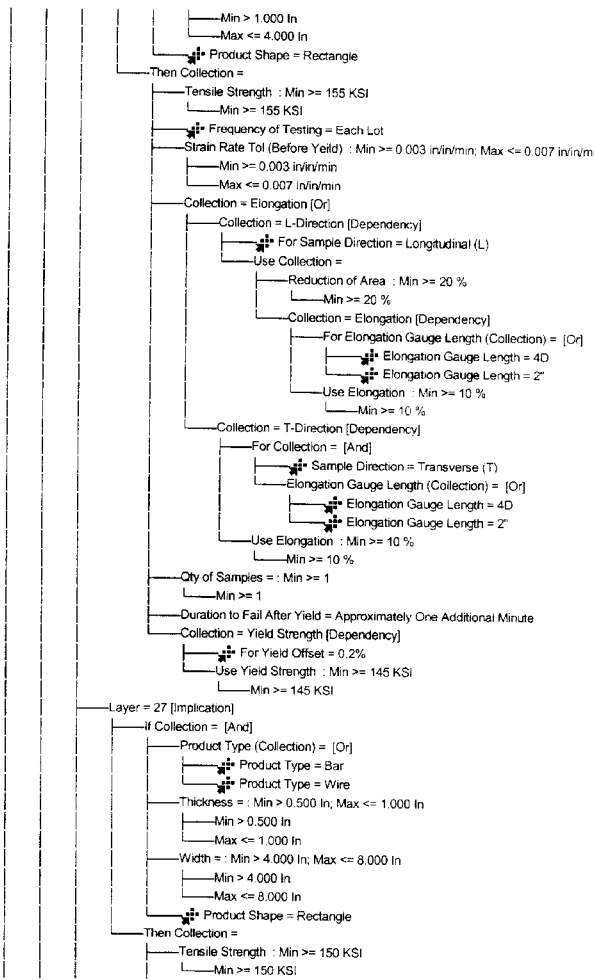

Appendix A
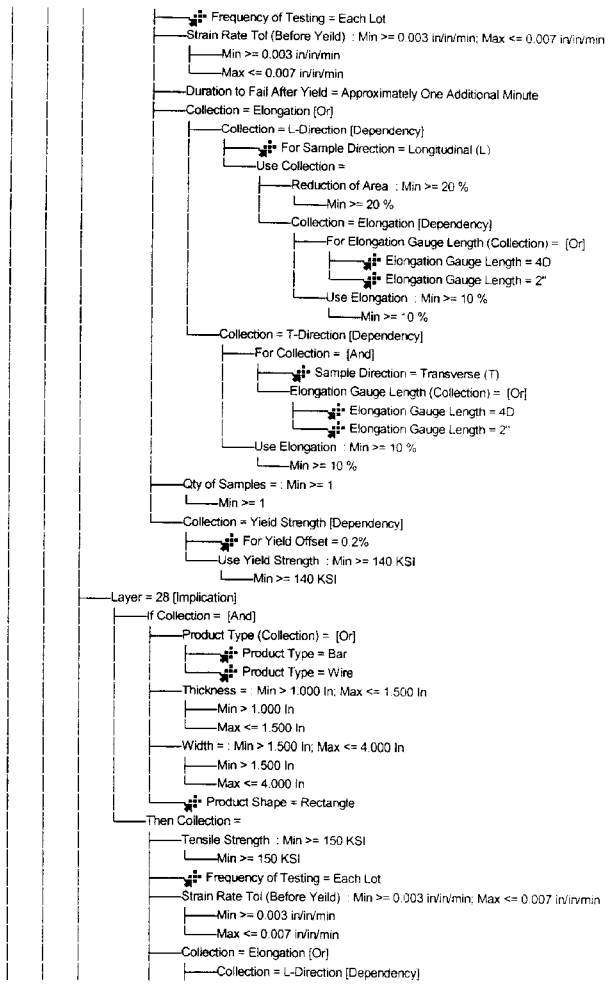

Appendix A
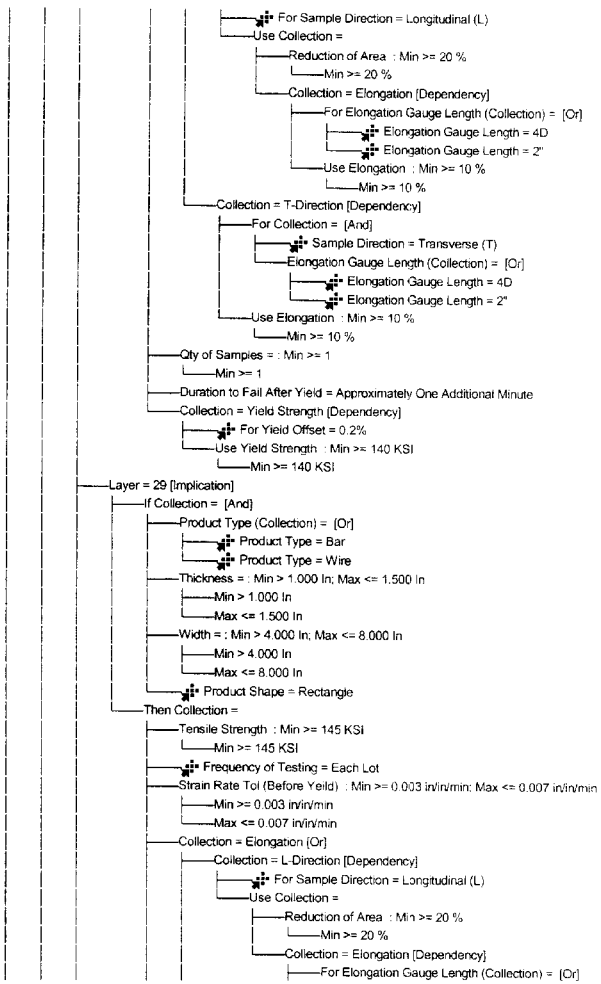

Appendix A
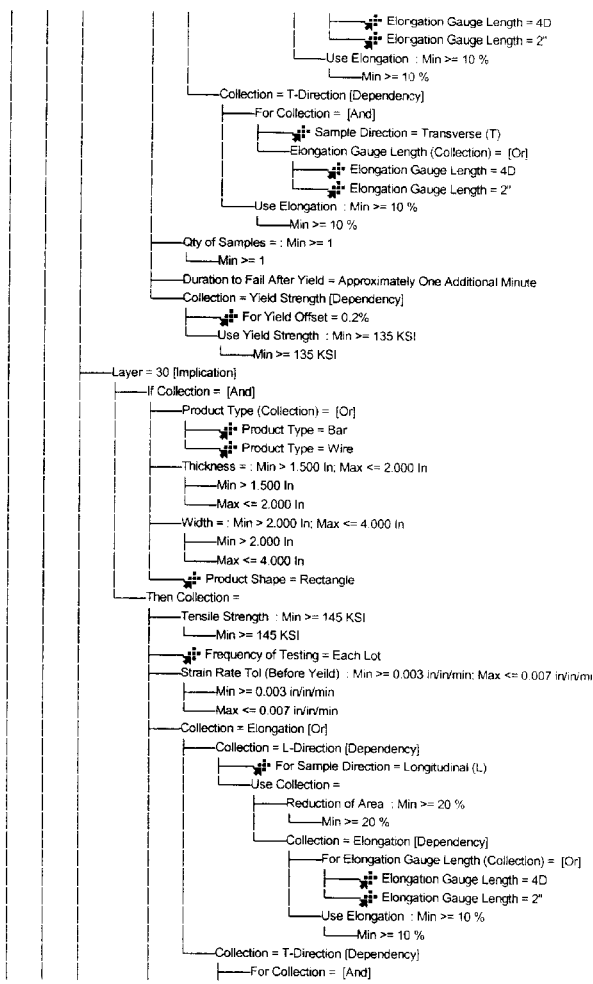

Appendix A
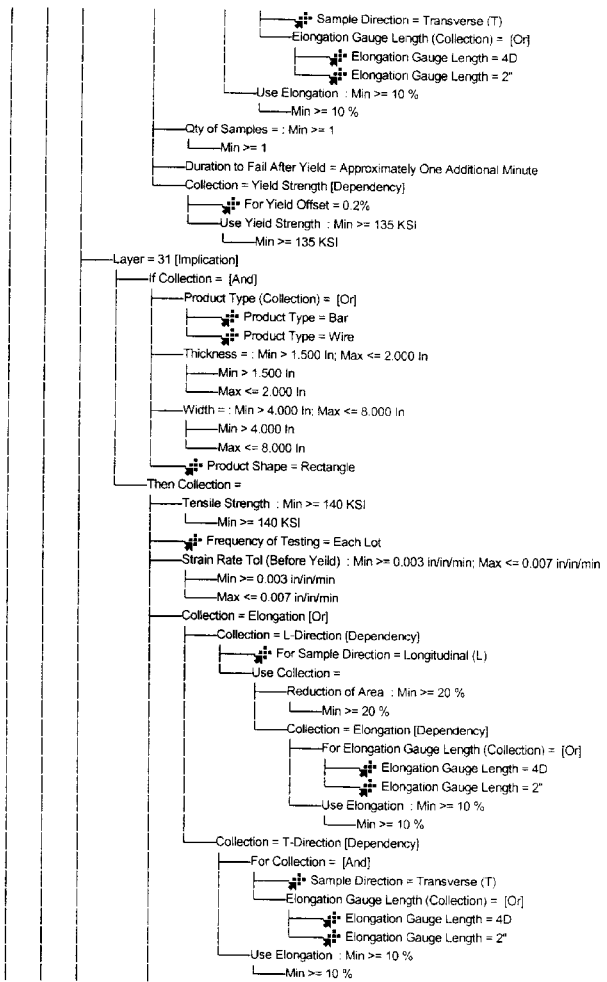

Appendix A
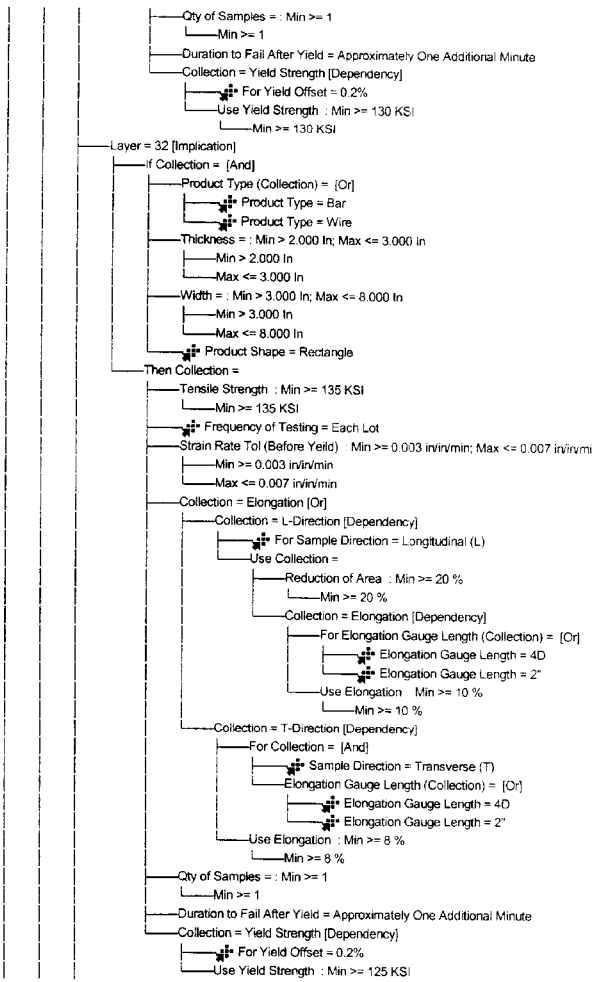

Appendix A
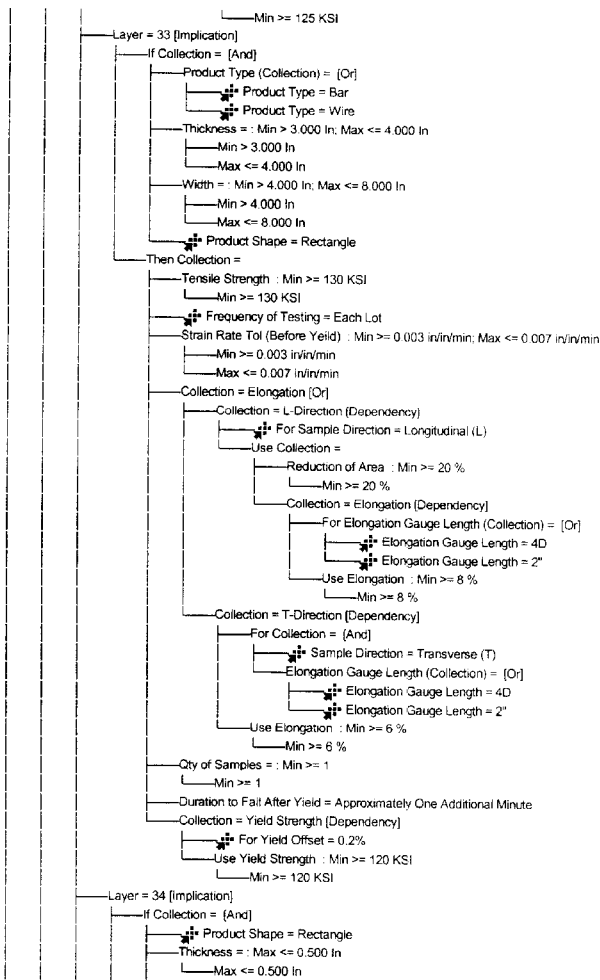

Appendix A
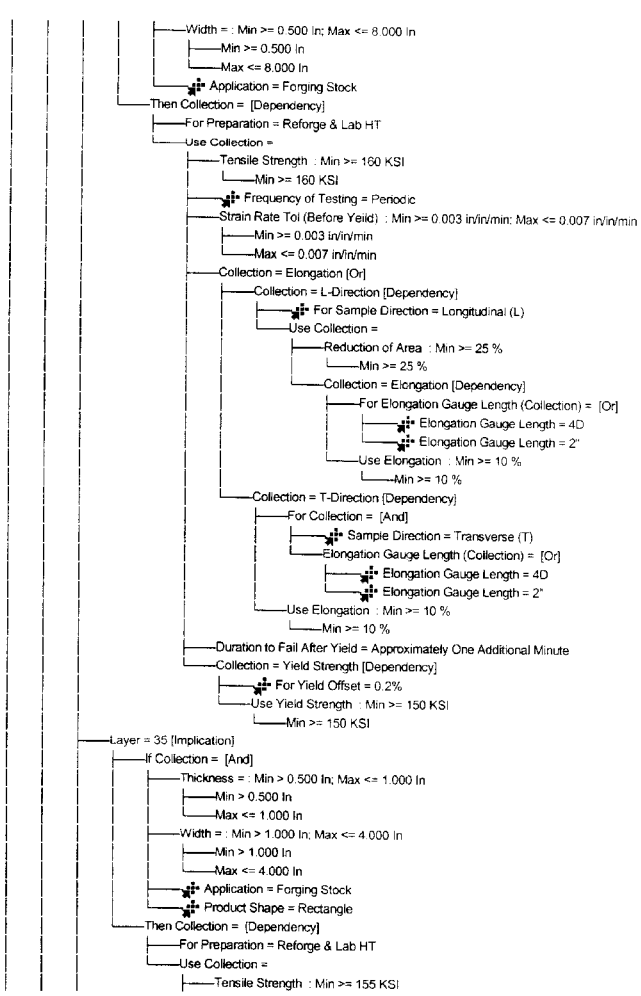

Appendix A
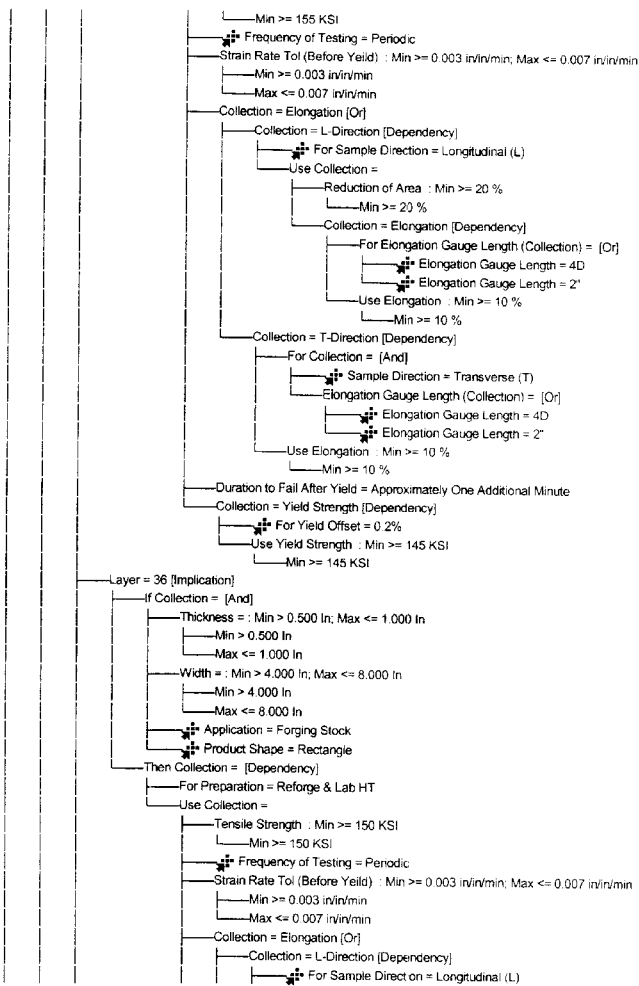

Appendix A
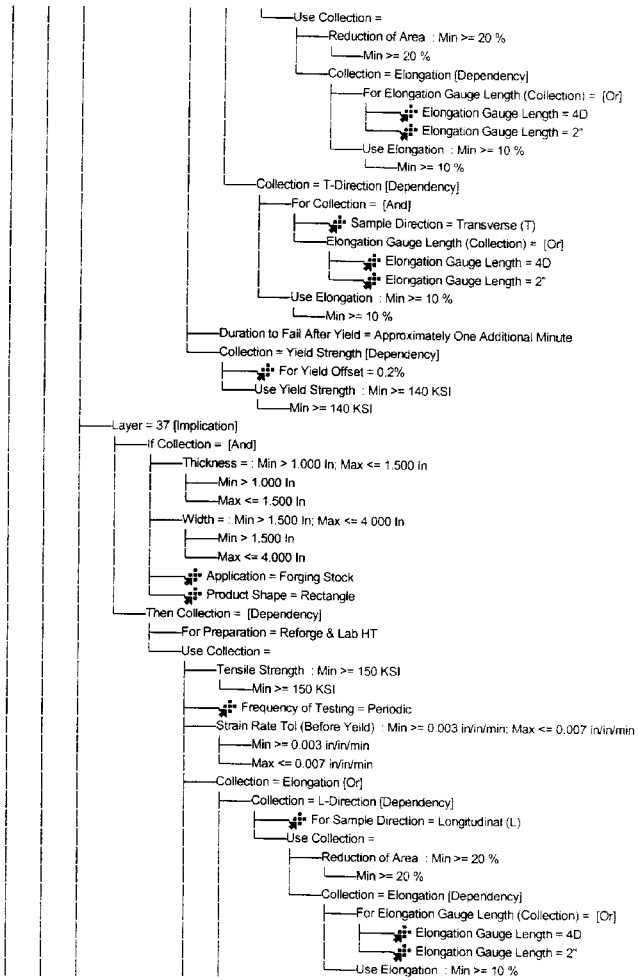

Appendix A
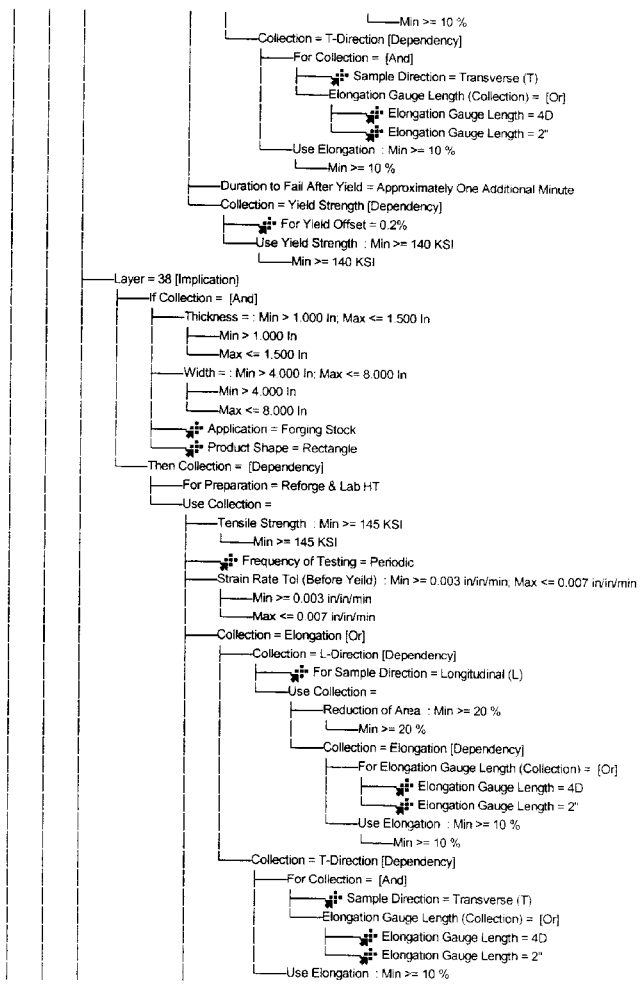

Appendix A
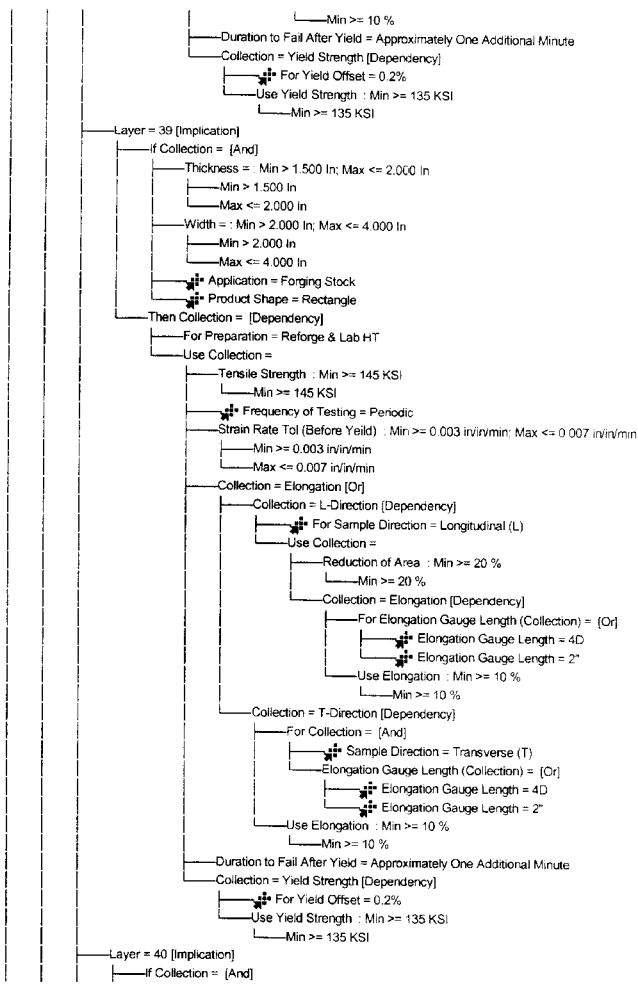

Appendix A
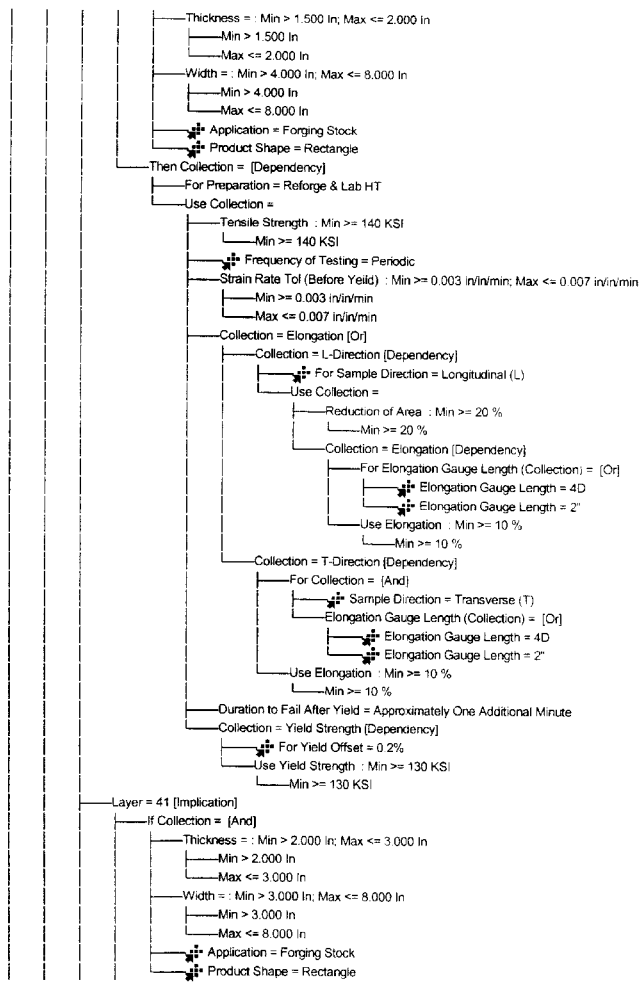

Appendix A
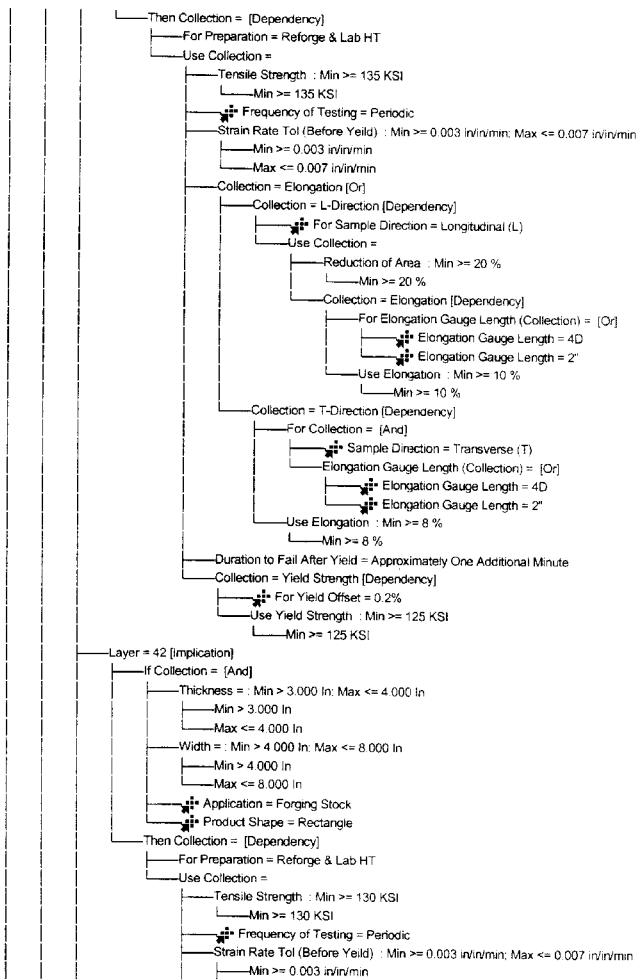

Appendix A

```
|  |  |         └----Max <= 0.007 in/in/min
|  |  |      ┌----Collection = Elongation [Or]
|  |  |      |    ┌----Collection = L-Direction [Dependency]
|  |  |      |    |    ┌---- For Sample Direction = Longitudinal (L)
|  |  |      |    |    └----Use Collection =
|  |  |      |    |         ┌----Reduction of Area  : Min >= 20 %
|  |  |      |    |         |    └----Min >= 20 %
|  |  |      |    |         └----Collection = Elongation [Dependency]
|  |  |      |    |              ┌----For Elongation Gauge Length (Collection) = [Or]
|  |  |      |    |              |    ┌---- Elongation Gauge Length = 4D
|  |  |      |    |              |    └---- Elongation Gauge Length = 2"
|  |  |      |    |              └----Use Elongation  : Min >= 8 %
|  |  |      |    |                   └----Min >= 8 %
|  |  |      |    └----Collection = T-Direction [Dependency]
|  |  |      |         ┌----For Collection = [And]
|  |  |      |         |    ┌---- Sample Direction = Transverse (T)
|  |  |      |         |    └----Elongation Gauge Length (Collection) = [Or]
|  |  |      |         |         ┌---- Elongation Gauge Length = 4D
|  |  |      |         |         └---- Elongation Gauge Length = 2"
|  |  |      |         └----Use Elongation  : Min >= 6 %
|  |  |      |              └----Min >= 6 %
|  |  |      ┌----Duration to Fail After Yield = Approximately One Additional Minute
|  |  |      └----Collection = Yield Strength [Dependency]
|  |  |           ┌---- For Yield Offset = 0.2%
|  |  |           └----Use Yield Strength  : Min >= 120 KSI
|  |  |                └----Min >= 120 KSI
|  |  ┌----Layer = 43 [Implication]
|  |  |    ┌----If Collection = [And]
|  |  |    |    ┌---- Product Shape = Rectangle
|  |  |    |    ┌----Thickness = : Max <= 0.500 In
|  |  |    |    |    └----Max <= 0.500 In
|  |  |    |    ┌----Width = : Min >= 0.500 In; Max <= 8.000 In
|  |  |    |    |    ┌----Min >= 0.500 In
|  |  |    |    |    └----Max <= 8.000 In
|  |  |    |    └---- Application = Forging Stock
|  |  |    └----Then Collection =
|  |  |         ┌----Tensile Strength  : Min >= 160 KSI
|  |  |         |    └----Min >= 160 KSI
|  |  |         ┌---- Frequency of Testing = Periodic
|  |  |         ┌----Strain Rate Tol (Before Yield)  : Min >= 0.003 in/in/min; Max <= 0.007 in/in/min
|  |  |         |    ┌----Min >= 0.003 in/in/min
|  |  |         |    └----Max <= 0.007 in/in/min
|  |  |         └----Collection = Elongation [Or]
|  |  |              ┌----Collection = L-Direction [Dependency]
|  |  |              |    ┌---- For Sample Direction = Longitudinal (L)
|  |  |              |    └----Use Collection =
|  |  |              |         ┌----Reduction of Area  : Min >= 25 %
|  |  |              |         |    └----Min >= 25 %
|  |  |              |         └----Collection = Elongation [Dependency]
|  |  |              |              ┌----For Elongation Gauge Length (Collection) = [Or]
|  |  |              |              |    ┌---- Elongation Gauge Length = 4D
|  |  |              |              |    └---- Elongation Gauge Length = 2"
```

Appendix A
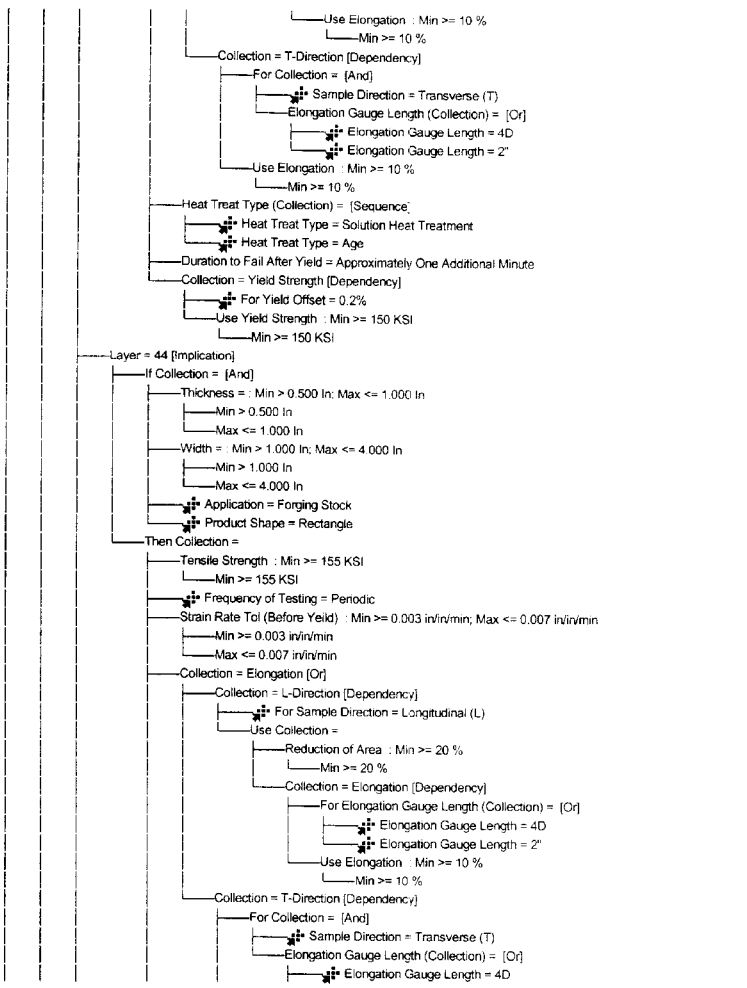

Appendix A
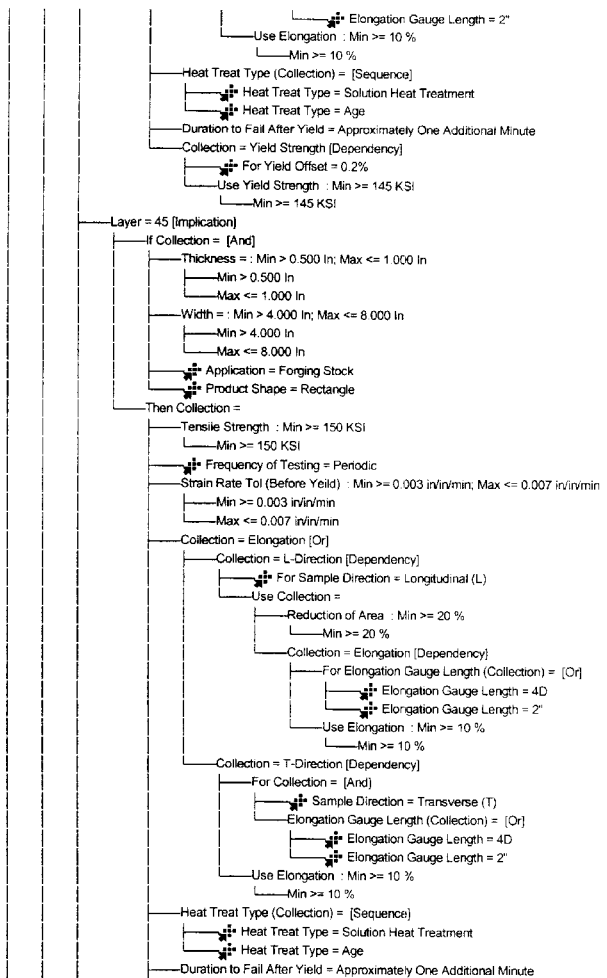

Appendix A
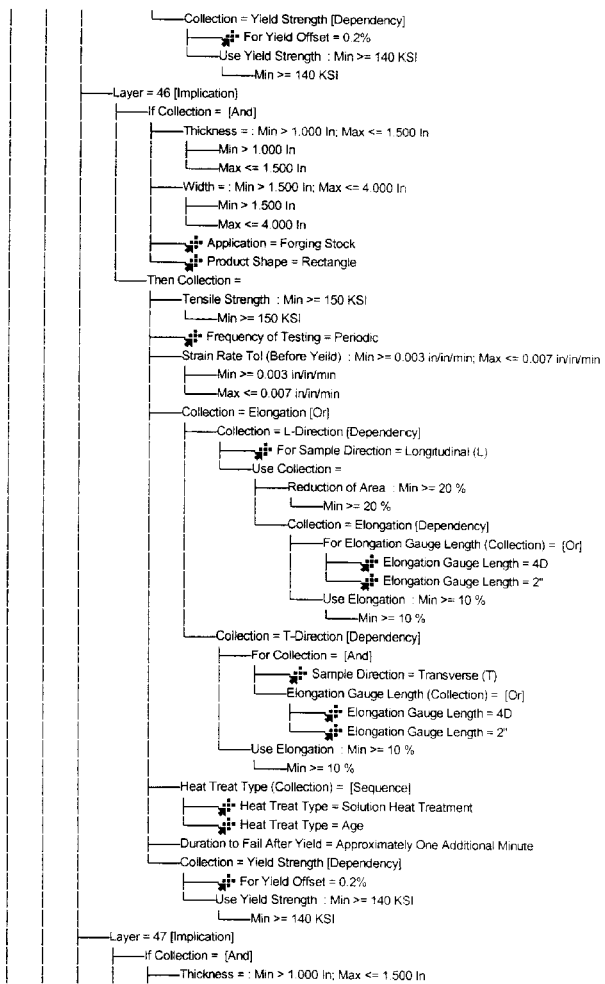

Appendix A
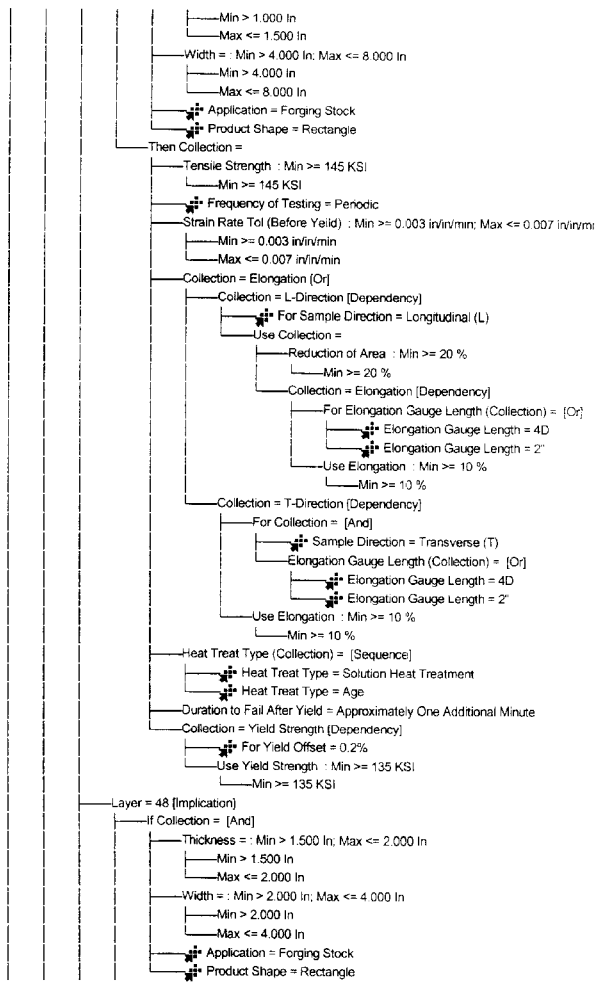

Appendix A
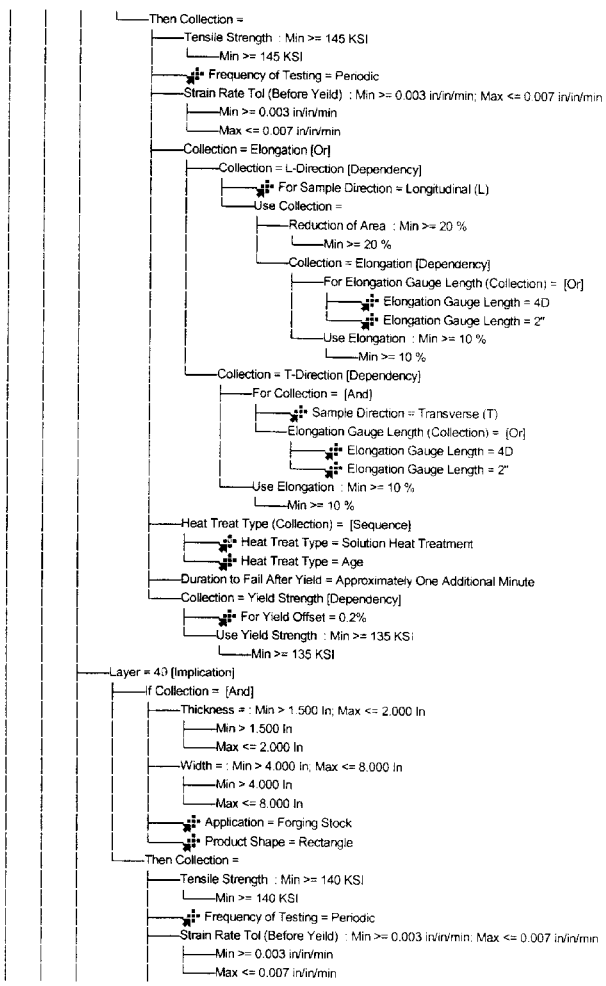

Appendix A
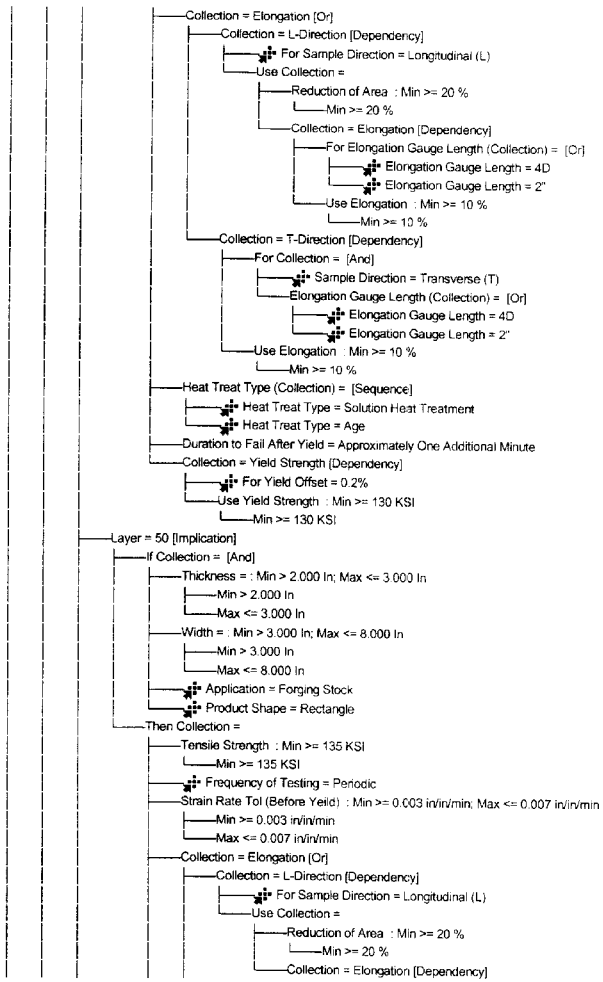

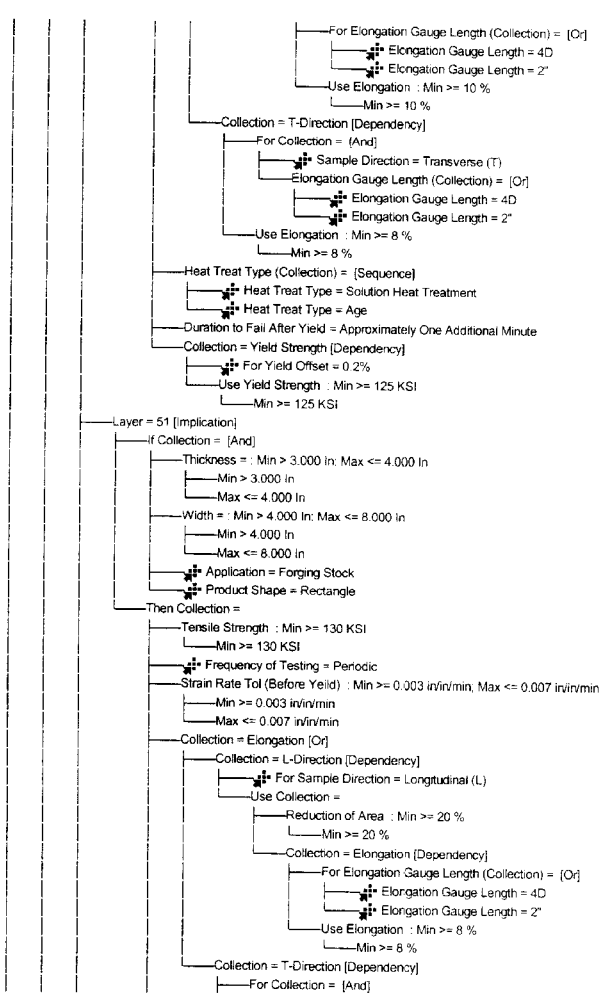
Appendix A

Appendix A
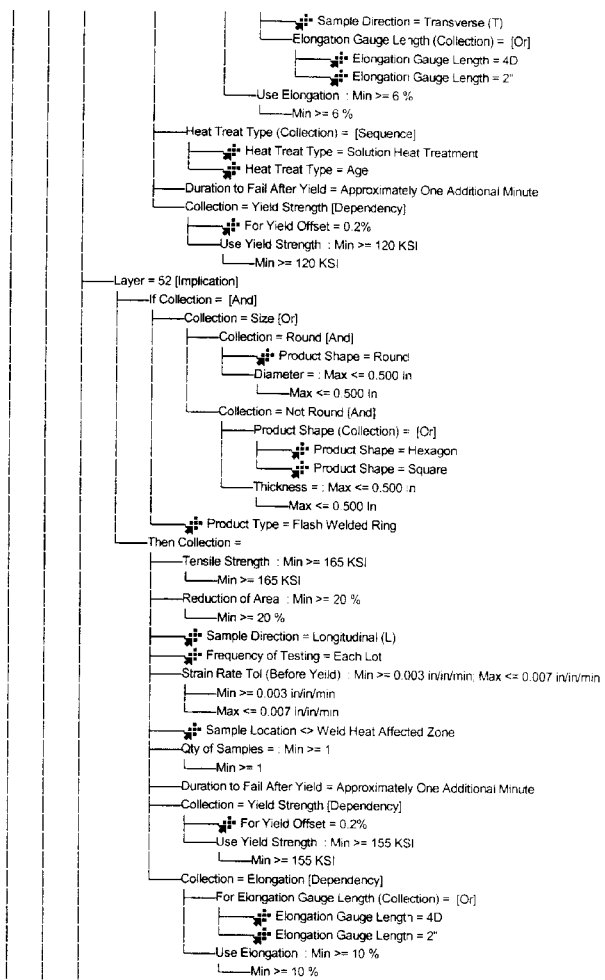

Appendix A
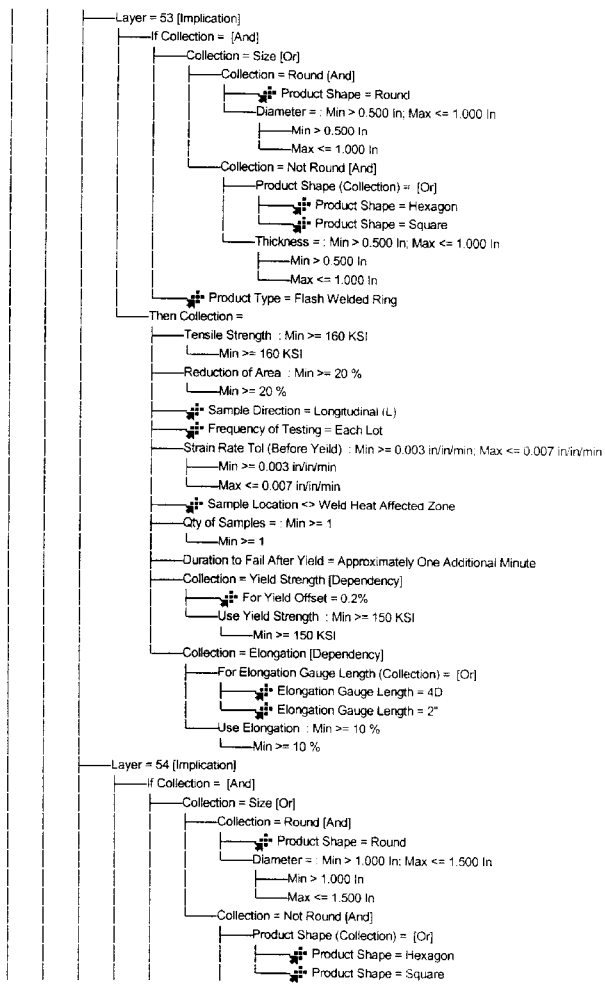

Appendix A
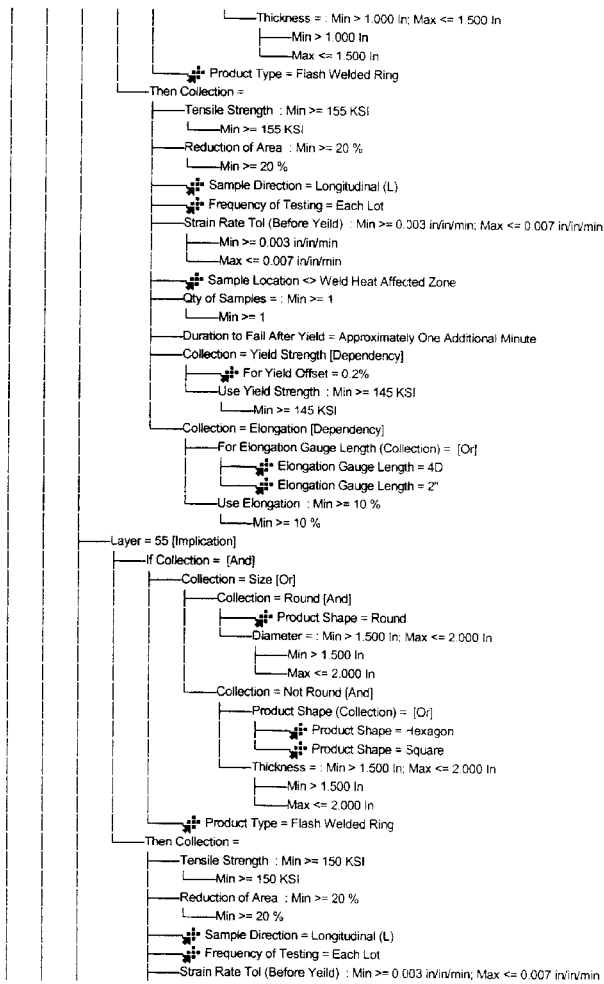

Appendix A
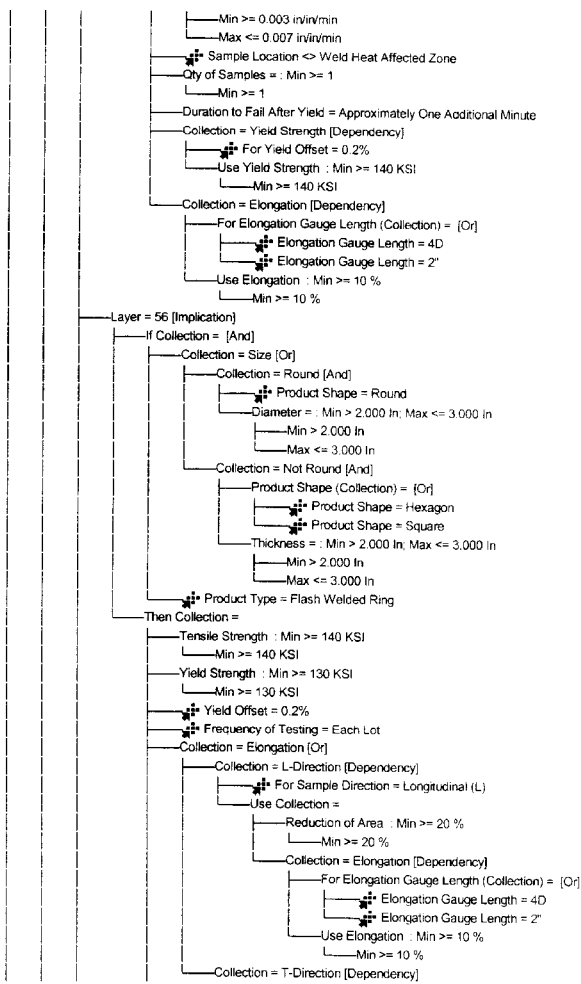

Appendix A
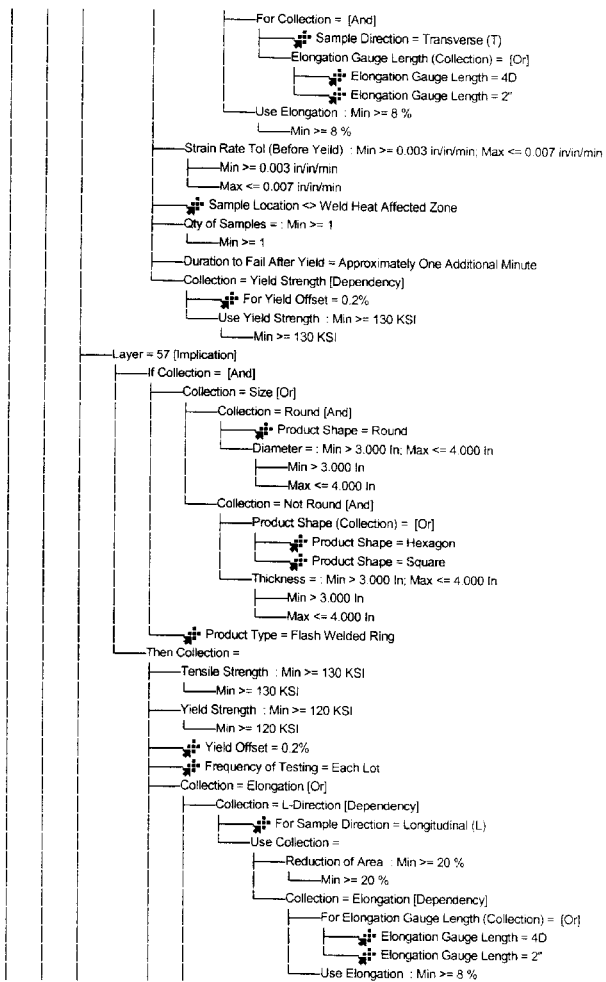

Appendix A
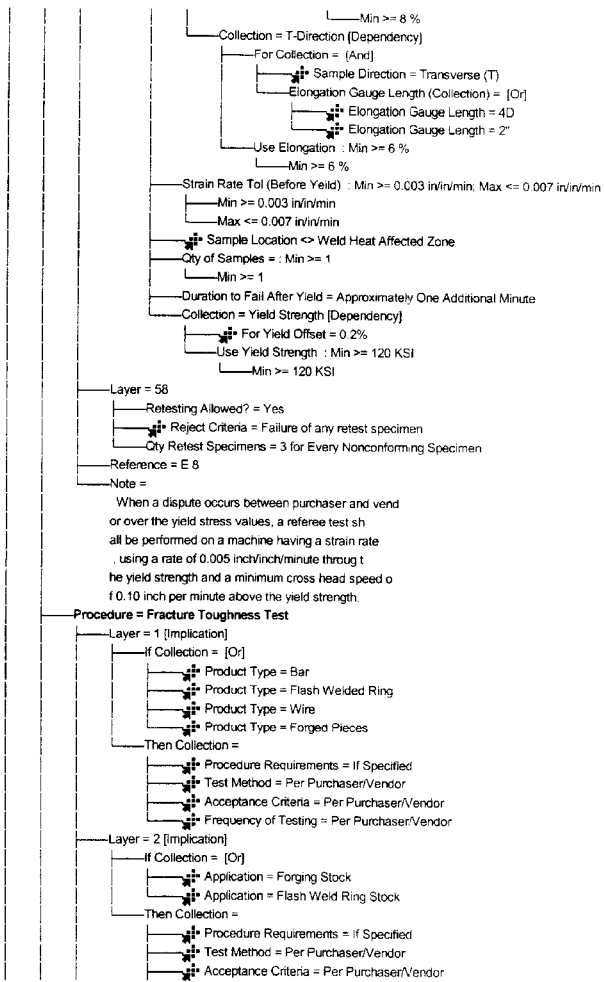

Appendix A
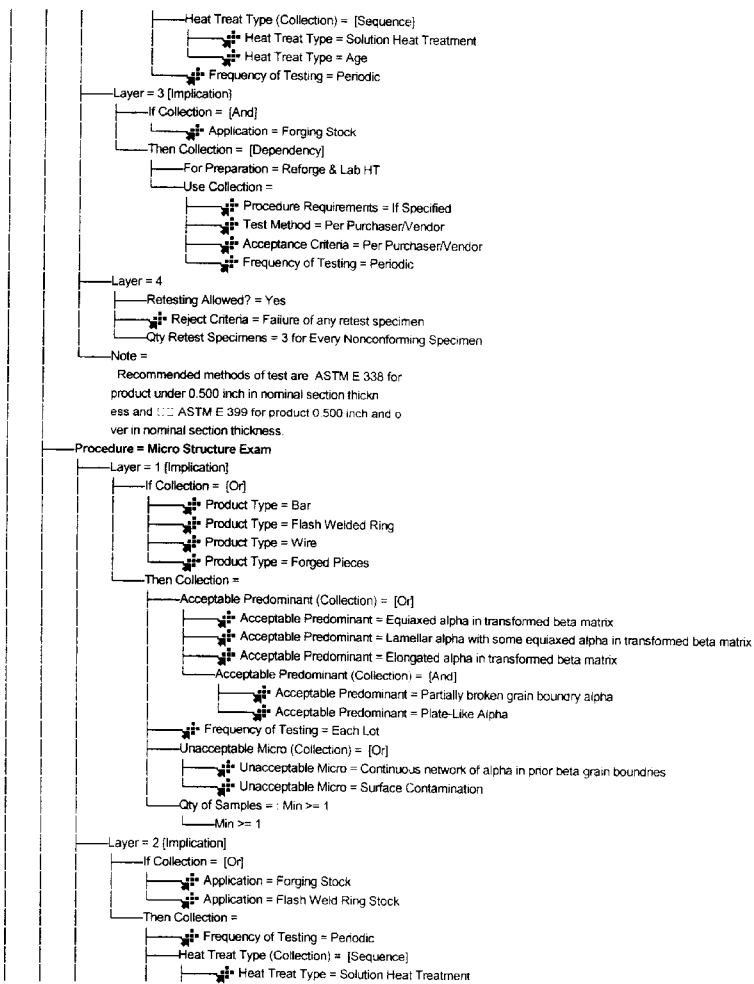

Appendix A
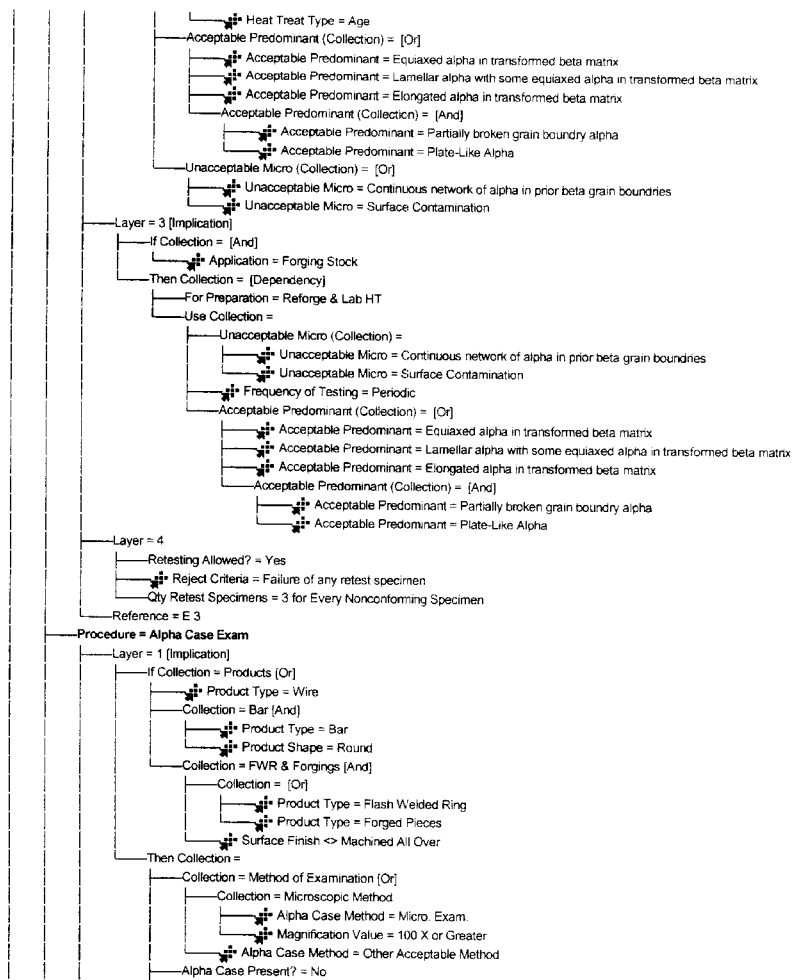

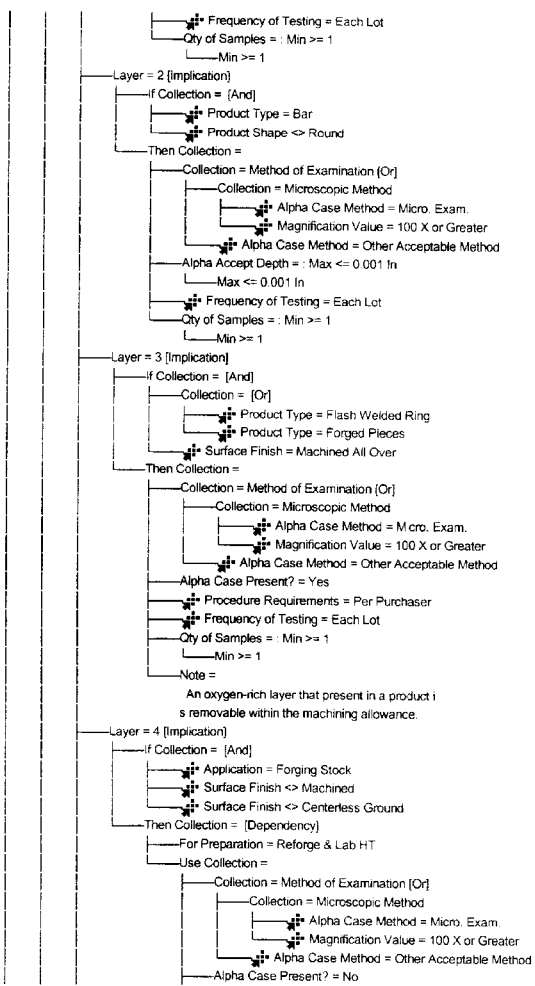
Appendix A

Appendix A

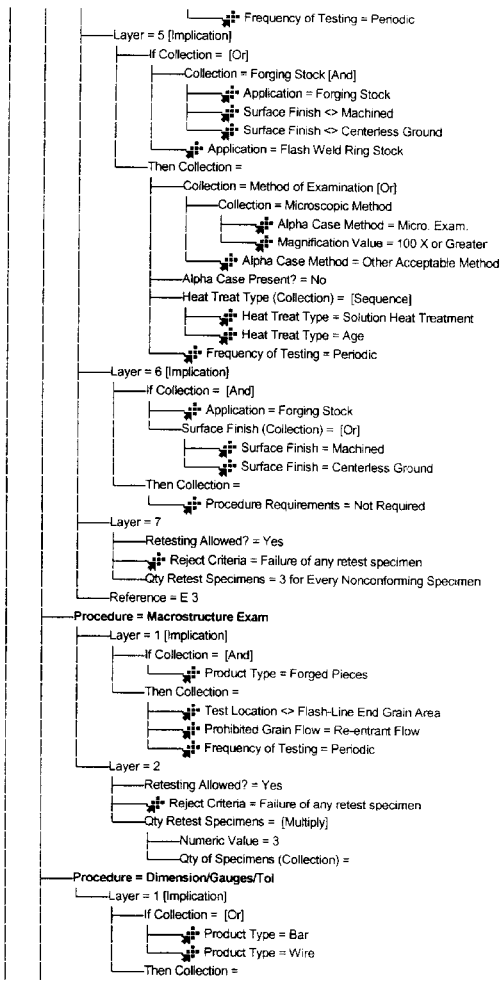

```
                    ┌──•ᵢ• Frequency of Testing = Periodic
├──Layer = 5 [Implication]
│    ├──If Collection = [Or]
│    │    ├──Collection = Forging Stock [And]
│    │    │    ├──•ᵢ• Application = Forging Stock
│    │    │    ├──•ᵢ• Surface Finish <> Machined
│    │    │    └──•ᵢ• Surface Finish <> Centerless Ground
│    │    └──•ᵢ• Application = Flash Weld Ring Stock
│    └──Then Collection =
│         ├──Collection = Method of Examination [Or]
│         │    ├──Collection = Microscopic Method
│         │    │    ├──•ᵢ• Alpha Case Method = Micro. Exam.
│         │    │    └──•ᵢ• Magnification Value = 100 X or Greater
│         │    └──•ᵢ• Alpha Case Method = Other Acceptable Method
│         ├──Alpha Case Present? = No
│         ├──Heat Treat Type (Collection) = [Sequence]
│         │    ├──•ᵢ• Heat Treat Type = Solution Heat Treatment
│         │    └──•ᵢ• Heat Treat Type = Age
│         └──•ᵢ• Frequency of Testing = Periodic
├──Layer = 6 [Implication]
│    ├──If Collection = [And]
│    │    ├──•ᵢ• Application = Forging Stock
│    │    └──Surface Finish (Collection) = [Or]
│    │         ├──•ᵢ• Surface Finish = Machined
│    │         └──•ᵢ• Surface Finish = Centerless Ground
│    └──Then Collection =
│         └──•ᵢ• Procedure Requirements = Not Required
├──Layer = 7
│    ├──Retesting Allowed? = Yes
│    ├──•ᵢ• Reject Criteria = Failure of any retest specimen
│    └──Qty Retest Specimens = 3 for Every Nonconforming Specimen
└──Reference = E 3
──Procedure = Macrostructure Exam
   ├──Layer = 1 [Implication]
   │    ├──If Collection = [And]
   │    │    └──•ᵢ• Product Type = Forged Pieces
   │    └──Then Collection =
   │         ├──•ᵢ• Test Location <> Flash-Line End Grain Area
   │         ├──•ᵢ• Prohibited Grain Flow = Re-entrant Flow
   │         └──•ᵢ• Frequency of Testing = Periodic
   └──Layer = 2
        ├──Retesting Allowed? = Yes
        ├──•ᵢ• Reject Criteria = Failure of any retest specimen
        └──Qty Retest Specimens = [Multiply]
             ├──Numeric Value = 3
             └──Qty of Specimens (Collection) =
──Procedure = Dimension/Gauges/Tol
   └──Layer = 1 [Implication]
        ├──If Collection = [Or]
        │    ├──•ᵢ• Product Type = Bar
        │    └──•ᵢ• Product Type = Wire
        └──Then Collection =
```

Appendix A

```
|          |              ├──── Frequency of Testing = Each Lot
|          |              └──── Reference = AMS 2241
|       ├── Procedure = Sampling
|       |     └── Layer = 1 [And]
|       |            ├──── Lot Definition = Same Heat
|       |            ├──── Lot Definition = Same Size
|       |            ├──── Lot Definition = Same Heat Treat Lot
|       |            └──── Lot Definition = Processed at same time
|       ├── Procedure = Certification
|       |     ├── Layer = 1 [Implication]
|       |     |     ├── If Collection = [Or]
|       |     |     |       ├──── Product Type = Bar
|       |     |     |       ├──── Product Type = Flash Welded Ring
|       |     |     |       └──── Product Type = Wire
|       |     |     └── Then Collection =
|       |     |             ├──── Cert Time Frame = With Each Shipment
|       |     |             ├──── Test Results Rqrd? = Yes
|       |     |             ├──── Chemistry Rqrd? = Yes
|       |     |             ├──── Tensile Result Rqrd? = Yes
|       |     |             ├──── Conformance Statement Rqrd? = Yes
|       |     |             ├──── PO Num Rqrd? = Yes
|       |     |             ├──── Heat Number Rqrd? = Yes
|       |     |             ├──── Lot Number Rqrd? = Yes
|       |     |             ├──── Specs Used Rqrd? = Yes
|       |     |             ├──── Revision Rqrd? = Yes
|       |     |             ├──── Heat Treat Rqrd? = Yes
|       |     |             └──── Quantity Rqrd? = Yes
|       |     ├── Layer = 2 [Implication]
|       |     |     ├── If Collection = [And]
|       |     |     |       └──── Product Type = Forged Pieces
|       |     |     └── Then Collection =
|       |     |             ├──── Cert Time Frame = With Each Shipment
|       |     |             ├──── Test Results Rqrd? = Yes
|       |     |             ├──── Chemistry Rqrd? = Yes
|       |     |             ├──── Tensile Result Rqrd? = Yes
|       |     |             ├──── Conformance Statement Rqrd? = Yes
|       |     |             ├──── PO Num Rqrd? = Yes
|       |     |             ├──── Heat Number Rqrd? = Yes
|       |     |             ├──── Lot Number Rqrd? = Yes
|       |     |             ├──── Specs Used Rqrd? = Yes
|       |     |             ├──── Revision Rqrd? = Yes
|       |     |             ├──── Heat Treat Rqrd? = Yes
|       |     |             ├──── Quantity Rqrd? = Yes
|       |     |             ├──── Part Number Rqrd? = Yes
|       |     |             ├──── Stock Size Rqrd? = Yes
|       |     |             └──── Stock Source Rqrd? = Yes
|       |     └── Layer = 3 [Implication]
|       |           ├── If Collection = [Or]
|       |           |       ├──── Application = Forging Stock
|       |           |       └──── Application = Flash Weld Ring Stock
|       |           └── Then Collection =
|       |                   ├──── Cert Time Frame = With Each Shipment
```

Appendix A

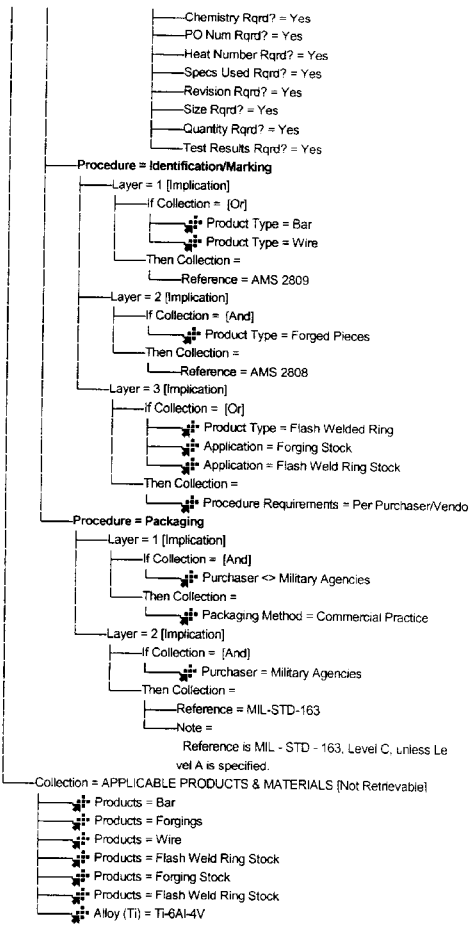

```
|    |----Chemistry Rqrd? = Yes
|    |----PO Num Rqrd? = Yes
|    |----Heat Number Rqrd? = Yes
|    |----Specs Used Rqrd? = Yes
|    |----Revision Rqrd? = Yes
|    |----Size Rqrd? = Yes
|    |----Quantity Rqrd? = Yes
|    |----Test Results Rqrd? = Yes
|----Procedure = Identification/Marking
|    |----Layer = 1 [Implication]
|    |    |----If Collection = [Or]
|    |    |    |---- Product Type = Bar
|    |    |    |---- Product Type = Wire
|    |    |----Then Collection =
|    |         |----Reference = AMS 2809
|    |----Layer = 2 [Implication]
|    |    |----If Collection = [And]
|    |    |    |---- Product Type = Forged Pieces
|    |    |----Then Collection =
|    |         |----Reference = AMS 2808
|    |----Layer = 3 [Implication]
|         |----If Collection = [Or]
|         |    |---- Product Type = Flash Welded Ring
|         |    |---- Application = Forging Stock
|         |    |---- Application = Flash Weld Ring Stock
|         |----Then Collection =
|              |---- Procedure Requirements = Per Purchaser/Vendor
|----Procedure = Packaging
     |----Layer = 1 [Implication]
     |    |----If Collection = [And]
     |    |    |---- Purchaser <> Military Agencies
     |    |----Then Collection =
     |         |---- Packaging Method = Commercial Practice
     |----Layer = 2 [Implication]
          |----If Collection = [And]
          |    |---- Purchaser = Military Agencies
          |----Then Collection =
               |----Reference = MIL-STD-163
               |----Note =
                    Reference is MIL - STD - 163, Level C, unless Le
                    vel A is specified.
|----Collection = APPLICABLE PRODUCTS & MATERIALS [Not Retrievable]
     |---- Products = Bar
     |---- Products = Forgings
     |---- Products = Wire
     |---- Products = Flash Weld Ring Stock
     |---- Products = Forging Stock
     |---- Products = Flash Weld Ring Stock
     |---- Alloy (Ti) = Ti-6Al-4V
```

APPENDIX B

| CLASS ID | CLASS NAME | PROCESSING FLAG |
|---|---|---|
| 0 | Collection | 3 |
| 1 | SDL Definition | 2 |
| 2 | Specification | 10 |
| 3 | Agreement | 10 |
| 4 | Virtual | 10 |
| 5 | Order | 10 |
| 6 | Practice | 10 |
| 7 | Change | 10 |
| 8 | Cross Reference | 0 |
| 9 | Drawing | 10 |
| 10 | Company | 0 |
| 11 | Revision | 1 |
| 12 | Review | 0 |
| 13 | Review Status | 0 |
| 15 | Library | 0 |
| 16 | Prodedure | 3 |
| 17 | Layer | 3 |
| 18 | Task | 3 |
| 19 | Sampling Definition | 1 |
| 26 | Organization | 2 |
| 27 | Location | 2 |
| 28 | Data Approval Type | 2 |
| 29 | Review Status Type | 2 |
| 30 | User | 0 |
| 31 | Security Level Identifier | 0 |
| 32 | Characteristic Definition | 2 |
| 33 | Procedure Definition | 2 |
| 34 | Preparation | 11 |
| 38 | Unit of Measure | 2 |
| 39 | Unit of Measure Family | 2 |
| 40 | Review Type | 2 |
| 41 | Spec Type | 2 |
| 42 | State | 2 |
| 43 | Predefined Value | 2 |
| 44 | Textual Value | 2 |
| 45 | Numeric Value | 2 |
| 47 | Tolerance | 3 |
| 50 | Controlled Term | 2 |
| 51 | Company Install | 2 |
| 52 | Order Type | 0 |
| 54 | Data Type | 0 |
| 55 | Role Indicator | 2 |
| 56 | Measurement System | 2 |
| 57 | Logical Value | 2 |
| 58 | Formula Value | 5 |
| 59 | Session | 0 |
| 60 | SQL Statement | 0 |
| 65 | Locked Object | 0 |
| 67 | Query Condition | 0 |
| 68 | Filter | 0 |
| 69 | Reference | 4 |
| 70 | Criteria | 0 |
| 71 | Report | 0 |
| 72 | Rule | 8 |
| 73 | Object Indicator | 0 |
| 74 | Relation | 0 |
| 75 | Retrieval | 0 |
| 76 | User Group | 0 |
| 77 | User of Group | 0 |
| 78 | UOM Reference | 0 |
| 79 | Range | 3 |
| 81 | Note | 7 |
| 82 | Multimedia Characteristic | 0 |
| 83 | User Preference | 0 |
| 85 | Event | 1 |
| 86 | Action Type | 1 |
| 87 | Include Action | 1 |
| 88 | Rule Condition 1 | 2 |
| 89 | Rule Condition 2 | 2 |
| 90 | Retrieval Log | 0 |
| 91 | Retrieval Source | 0 |
| 92 | Image | 0 |
| 93 | File Type | 0 |
| 94 | Acceptance Status Type | 0 |
| 95 | Requirement Type | 0 |
| 96 | Material Definition | 0 |
| 97 | Engineering Work Bench | 0 |
| 98 | Bottom Line Generate Summary | 0 |
| 99 | Source Documents | 0 |
| 100 | Bottom Line | 0 |
| 101 | System Parameters Set 1 | 0 |
| 110 | Retrieval Flag | 2 |
| 111 | Extraction Type | 0 |
| 112 | Extraction Status Type | 0 |
| 113 | MSysConf | 0 |
| 114 | Priority Type | 0 |
| 115 | Exposure Type | 0 |
| 117 | Server - Client Event | 0 |
| 118 | Characteristic Scope | 0 |
| 119 | Status | 0 |
| 120 | Copy Status | 0 |
| 121 | Conflict | 3 |
| 122 | Process | 0 |
| 123 | Step | 0 |
| 124 | Procedure Type | 2 |
| 125 | Practice Type | 0 |
| 126 | Agreement Type | 0 |
| 127 | Drawing Type | 0 |
| 128 | Organization Type | 0 |
| 129 | Constant | 2 |
| 130 | Execute Action | 0 |
| 131 | Pointer | 6 |
| 140 | Bill of Disassembly | 0 |
| 141 | Production Piece | 0 |
| 142 | Production Piece Type | 0 |
| 143 | Results Plan | 0 |

| Processing Flag | Meaning |
|---|---|
| 0 | Do not Process |
| 1 | Process Children Only |
| 2 | Regular Processing |
| 3 | Child Depended Processing |
| 4 | Reference Processing |
| 5 | Formula Processing |
| 6 | Unknown Processing |
| 7 | For Information Only |
| 8 | Rule Processing |
| 9 | Action Processing |
| 10 | Document Processing |
| 11 | Preparation Processing |

APPENDIX C

| CLASS ID | FIELD ID | FIELD NAME | FIELD_TYPE |
|---|---|---|---|
| 0 | 0 | Name | 0 |
| 1 | 0 | Name | 0 |
| 1 | 1 | Retrieval Status | 1 |
| 2 | 0 | Specification Name | 0 |
| 2 | 1 | Title | 0 |
| 2 | 2 | Originating Organization | 6 |
| 2 | 3 | Spec Type | 6 |
| 2 | 5 | Master List | 5 |
| 2 | 6 | Change Control | 5 |
| 3 | 0 | Agreement Name | 0 |
| 3 | 1 | Agreement | 0 |
| 3 | 2 | Originating Organization | 6 |
| 3 | 3 | Agreement Type | 6 |
| 4 | 0 | Virtual Name | 0 |
| 4 | 1 | Virtual Title | 0 |
| 4 | 2 | Customer | 6 |
| 4 | 3 | Generated For Order | 0 |
| 5 | 0 | Order Name | 0 |
| 5 | 1 | Order Date | 2 |
| 5 | 2 | Customer | 6 |
| 5 | 3 | Delivery Date | 2 |
| 5 | 4 | Combine Priority | 1 |
| 5 | 5 | Order Type | 6 |
| 6 | 0 | Practice Name | 0 |
| 6 | 1 | Practice Title | 0 |
| 6 | 2 | Originating Organization | 6 |

APPENDIX C-continued

| | | | |
|---|---|---|---|
| 6 | 3 | Practice Type | 6 |
| 7 | 0 | Change Name | 0 |
| 7 | 1 | Description | 0 |
| 7 | 2 | Change Status | 0 |
| 7 | 3 | Requestor | 0 |
| 7 | 4 | Date Requested | 2 |
| 7 | 5 | Date Completed | 2 |
| 7 | 6 | Current Revision | 0 |
| 7 | 7 | New Revision | 0 |
| 7 | 8 | Update Rev | 5 |
| 8 | 0 | Cross Reference Name | 0 |
| 8 | 1 | Description | 0 |
| 9 | 0 | Drawing Name | 0 |
| 9 | 1 | Drawing Title | 0 |
| 9 | 2 | Originating Organization | 6 |
| 9 | 3 | Drawing Type | 6 |
| 10 | 0 | Company Name | 0 |
| 10 | 1 | Company Address 1 | 0 |
| 10 | 2 | Company Address 2 | 0 |
| 11 | 0 | Revision Name | 0 |
| 11 | 1 | Revision Date | 2 |
| 11 | 2 | Acceptance Status | 6 |
| 11 | 3 | Extraction Type | 6 |
| 11 | 4 | Extraction Status | 6 |
| 11 | 5 | Priority | 6 |
| 12 | 0 | Review Type | 6 |
| 12 | 2 | Location | 6 |
| 12 | 3 | Paragraph | 0 |
| 12 | 4 | Text | 0 |
| 12 | 5 | Responsible | 6 |
| 12 | 6 | Exposure | 6 |
| 13 | 0 | Review Status Type | 6 |
| 13 | 1 | Responsible | 6 |
| 13 | 2 | Review Status Date | 2 |
| 15 | 0 | Copy Number | 1 |
| 15 | 1 | Location | 6 |
| 15 | 2 | Cabinet | 0 |
| 15 | 3 | Copy Status | 6 |
| 15 | 4 | Date Out | 2 |
| 15 | 5 | Date Due | 2 |
| 15 | 6 | Requestor | 0 |
| 16 | 0 | Procedure Definition | 6 |
| 17 | 0 | Name | 0 |
| 18 | 0 | Name | 0 |
| 26 | 0 | Organization Name | 0 |
| 26 | 1 | Address | 0 |
| 26 | 3 | State | 6 |
| 26 | 4 | Zip | 0 |
| 26 | 5 | Zip4 | 0 |
| 26 | 6 | Organization Type | 6 |
| 27 | 0 | Location Name | 0 |
| 27 | 1 | Location Abbreviation | 0 |
| 28 | 0 | Name | 0 |
| 29 | 0 | Review Status Type | 0 |
| 30 | 0 | User Login ID | 0 |
| 30 | 1 | User Password | 0 |
| 31 | 2 | User Full Name | 0 |
| 30 | 3 | User Description | 0 |
| 30 | 4 | User Status | 5 |
| 30 | 5 | User Location | 6 |
| 30 | 6 | Admin Rights Granted | 5 |
| 31 | 0 | Security ClassID | 1 |
| 31 | 1 | View Security Level | 1 |
| 31 | 2 | Add Security Level | 1 |
| 31 | 3 | Modify Security Level | 1 |
| 31 | 4 | Delete Security Level | 1 |
| 31 | 5 | Miscellaneous Security Level | 1 |
| 32 | 0 | Characteristic Name | 0 |
| 32 | 1 | Characteristic Description | 0 |
| 32 | 2 | Characteristic Abbreviation | 0 |
| 32 | 3 | Default Datatype | 6 |
| 32 | 4 | Default UOM | 6 |
| 32 | 5 | Min Realistic Value | 1 |
| 32 | 6 | Max Realistic Value | 1 |
| 32 | 7 | Default Role Indicator | 6 |
| 32 | 8 | Default Criteria Scope | 6 |
| 32 | 9 | Default Requirement Level | 6 |
| 33 | 0 | Procedure Name | 0 |
| 33 | 1 | Procedure Description | 0 |
| 33 | 2 | Procedure Role | 6 |
| 33 | 3 | Procedure Full Cost | 1 |
| 33 | 4 | Procedure Unit Cost | 1 |
| 33 | 5 | Procedure Order | 1 |
| 33 | 7 | Results Entry | 5 |
| 33 | 8 | Procedure Type | 6 |
| 34 | 0 | Task | 8 |
| 38 | 0 | UOM Name | 0 |
| 38 | 1 | UOM Description | 0 |
| 38 | 2 | UOM Abbreviation | 0 |
| 38 | 3 | UOM Status | 1 |
| 38 | 4 | UOM System | 6 |
| 38 | 5 | UOM Family | 6 |
| 39 | 0 | UOM Family | 0 |
| 39 | 1 | UOM Family English Pref | 6 |
| 39 | 2 | UOM Family Metric Pref | 6 |
| 39 | 3 | Base UOM | 0 |
| 40 | 0 | Review Type Name | 0 |
| 41 | 0 | Spec Type Name | 0 |
| 41 | 1 | Spec Type Description | 0 |
| 42 | 0 | State Name | 0 |
| 42 | 1 | State Abbreviation | 0 |
| 43 | 0 | Controlled Term | 9 |
| 44 | 0 | Text | 0 |
| 45 | 0 | Number | 3 |
| 50 | 0 | Controlled Term | 0 |
| 50 | 1 | Description | 0 |
| 51 | 0 | Local Company Name | 0 |
| 51 | 1 | Field 1 | 1 |
| 51 | 2 | Field 2 | 1 |
| 51 | 3 | Field 3 | 1 |
| 51 | 4 | Field 4 | 0 |
| 52 | 0 | Order Type Name | 0 |
| 54 | 0 | Data Type Name | 0 |
| 55 | 0 | Role Name | 0 |
| 55 | 1 | Role Description | 0 |
| 56 | 0 | UOM System Name | 0 |
| 57 | 0 | Value | 5 |
| 58 | 0 | Formula Value | 3 |
| 58 | 1 | UOM Reference | 6 |
| 59 | 0 | User | 6 |
| 59 | 1 | Host | 0 |
| 59 | 2 | Admin | 1 |
| 59 | 3 | Everlasting | 1 |
| 59 | 4 | Report ID | 1 |
| 59 | 5 | Session Status | 1 |
| 59 | 6 | Retrieval ID | 1 |
| 59 | 7 | Login Time | 7 |
| 59 | 8 | On Line Time | 7 |
| 59 | 9 | Last Transaction Time | 7 |
| 60 | 0 | Class ID | 1 |
| 65 | 0 | Class ID | 1 |
| 65 | 1 | Object ID | 1 |
| 65 | 2 | Lock ID | 1 |
| 65 | 3 | Object Name | 0 |
| 68 | 0 | Class ID | 1 |
| 68 | 1 | Field ID | 1 |
| 68 | 2 | Value | 0 |
| 68 | 3 | Operator | 1 |
| 68 | 4 | Relation | 6 |
| 68 | 5 | Interpretation Class ID | 1 |
| 68 | 6 | Interpretation Object ID | 1 |
| 68 | 7 | Tree Depth | 1 |
| 69 | 0 | Referenced Document | 6 |
| 69 | 1 | Revision Name | 0 |
| 69 | 2 | Priority | 1 |
| 69 | 3 | Pass Parameters On | 5 |
| 72 | 0 | Name | 0 |
| 72 | 1 | Fuzzy Number | 3 |
| 72 | 2 | Event | 6 |
| 72 | 3 | Message | 0 |
| 72 | 4 | Level | 1 |
| 72 | 5 | Interpretation | 6 |
| 72 | 6 | Active Status | 5 |
| 72 | 7 | Unique Use | 5 |
| 73 | 0 | Class ID | 1 |
| 73 | 1 | Object ID | 1 |
| 74 | 0 | Name | 0 |
| 75 | 0 | Result | 1 |

APPENDIX C-continued

| | | | |
|---|---|---|---|
| 75 | 1 | Stop Class ID | 1 |
| 75 | 2 | Stop Object ID | 1 |
| 75 | 3 | Stop Rule ID | 1 |
| 75 | 4 | Stop Rule Location | 1 |
| 76 | 0 | Group Name | 0 |
| 76 | 1 | Group Description | 0 |
| 76 | 2 | Group Abbreviation | 0 |
| 77 | 0 | User | 6 |
| 78 | 0 | Unit of Measure | 6 |
| 81 | 0 | Name | 0 |
| 81 | 1 | Note Text | 0 |
| 82 | 0 | Value | 0 |
| 83 | 0 | Date Format | 0 |
| 83 | 1 | Prompt For Exit | 5 |
| 83 | 2 | Unique Query Record Autoload | 5 |
| 83 | 3 | Wild Card Character | 1 |
| 85 | 0 | Name | 0 |
| 86 | 0 | Name | 0 |
| 87 | 0 | Included Object | 6 |
| 88 | 0 | Class ID | 1 |
| 88 | 1 | Interpretation | 6 |
| 88 | 2 | Field ID | 1 |
| 88 | 3 | Relation | 6 |
| 88 | 4 | Value | 0 |
| 89 | 0 | Class ID | 1 |
| 89 | 1 | Interpretation | 6 |
| 89 | 2 | field1 | 1 |
| 89 | 3 | field2 | 1 |
| 89 | 4 | Relation | 6 |
| 90 | 0 | Lof Info | 0 |
| 91 | 0 | Class ID | 1 |
| 91 | 1 | Object ID | 1 |
| 91 | 2 | Top Class ID | 1 |
| 91 | 3 | Top Object ID | 1 |
| 93 | 0 | File Name Path | 0 |
| 92 | 1 | File Type | 6 |
| 92 | 2 | Page Size | 0 |
| 92 | 3 | Page Quantity | 1 |
| 93 | 0 | File Type Name | 0 |
| 94 | 0 | Acceptance Status Name | 0 |
| 95 | 0 | Requirement Type | 0 |
| 96 | 0 | Material Name | 0 |
| 96 | 1 | Material Description | 0 |
| 96 | 2 | Density | 3 |
| 96 | 3 | UNS Designator | 0 |
| 98 | 0 | Order | 0 |
| 98 | 1 | Date Generated | 2 |
| 98 | 2 | Quantity of Retrieved Documents | 1 |
| 98 | 3 | Quantity of Gross Procedures | 1 |
| 98 | 4 | Quantity of Net Procedures | 1 |
| 98 | 5 | Quantity of Generated Characteristics | 1 |
| 98 | 6 | Quantity of Rules Applied | 1 |
| 98 | 7 | Quantity of Generated Conflicts | 1 |
| 98 | 8 | Quantity of Resolved Conflicts | 1 |
| 98 | 9 | Quantity of Data Approval Issues | 1 |
| 99 | 8 | Quantity of Resolved Conflicts | 1 |
| 100 | 0 | Bottom Line (Virtual) Name | 0 |
| 100 | 1 | Generated for Order | 6 |
| 100 | 2 | Generated On | 2 |
| 100 | 3 | Customer | 6 |
| 101 | 0 | Set Name | 0 |
| 101 | 1 | File Path to PDF Inages | 0 |
| 101 | 2 | File Path to Reports | 0 |
| 101 | 3 | N/A Unit of Measure | 6 |
| 101 | 4 | "Accepted"" Revision Acceptance Status | 6 |
| 110 | 0 | Flag | 1 |
| 111 | 0 | Extraction Type | 0 |
| 112 | 0 | Extraction Status | 0 |
| 113 | 0 | Config | 1 |
| 113 | 1 | chValue | 0 |
| 113 | 2 | nValue | 1 |
| 113 | 3 | Comments | 0 |
| 114 | 0 | Priority Type Name | 0 |
| 115 | 0 | Exposure Type Name | 0 |
| 117 | 0 | Event Type | 1 |
| 117 | 1 | Parameter 1 | 1 |
| 117 | 2 | Parameter 2 | 1 |
| 117 | 3 | Parameter 3 | 0 |
| 118 | 0 | Scope Name | 0 |
| 120 | 0 | Copy Status Name | 0 |
| 121 | 0 | Conflict Description | 0 |
| 124 | 0 | Name | 0 |
| 125 | 0 | Practice Type Name | 0 |
| 126 | 0 | Agreement Type Name | 0 |
| 127 | 0 | Drawing Type Name | 0 |
| 128 | 0 | Organization Type Name | 0 |
| 129 | 0 | Name | 0 |
| 129 | 1 | Value | 3 |
| 130 | 0 | Program | 0 |
| 130 | 1 | Parameters | 0 |
| 131 | 0 | Pointer | 6 |
| 140 | 0 | Bill of Disassembly Name | 0 |
| 140 | 1 | Order | 6 |
| 141 | 0 | Name | 0 |
| 141 | 1 | Location | 9 |
| 141 | 2 | Position | 9 |
| 141 | 3 | Direction | 9 |
| 141 | 4 | Procedure | 9 |
| 141 | 5 | Layer | 9 |
| 142 | 0 | Name | 0 |
| 143 | 0 | Results Plan Name | 0 |
| 143 | 1 | Order | 0 |

| FIELD TYPE | Meaning |
|---|---|
| 0 | String |
| 1 | Integer |
| 2 | Date |
| 3 | Number |
| 4 | Pointer |
| 5 | Logical |
| 6 | Reference |
| 7 | Time |
| 8 | Internal Reference |
| 9 | External Reference |

APPENDIX D

| CLASS ID | CHILD CLASS ID | MIN | MAX |
|---|---|---|---|
| 0 | 16 | 0 | 0 |
| 0 | 43 | 0 | 0 |
| 0 | 44 | 0 | 0 |
| 0 | 45 | 0 | 0 |
| 0 | 57 | 0 | 0 |
| 0 | 58 | 0 | 0 |
| 2 | 7 | 0 | 0 |
| 2 | 8 | 0 | 0 |
| 2 | 11 | 0 | 0 |
| 2 | 43 | 0 | 0 |
| 2 | 69 | 0 | 0 |
| 2 | 81 | 0 | 0 |
| 3 | 11 | 0 | 0 |
| 3 | 43 | 0 | 0 |
| 3 | 81 | 0 | 0 |
| 4 | 11 | 0 | 0 |
| 4 | 16 | 0 | 0 |
| 4 | 43 | 0 | 0 |
| 4 | 44 | 0 | 0 |
| 4 | 45 | 0 | 0 |
| 5 | 16 | 0 | 0 |
| 5 | 44 | 0 | 0 |
| 5 | 45 | 0 | 0 |
| 5 | 69 | 0 | 0 |
| 5 | 122 | 0 | 0 |
| 6 | 11 | 0 | 0 |
| 6 | 16 | 0 | 0 |
| 6 | 43 | 0 | 0 |
| 6 | 81 | 0 | 0 |
| 9 | 7 | 0 | 0 |
| 9 | 8 | 0 | 0 |
| 9 | 11 | 0 | 0 |
| 9 | 43 | 0 | 0 |

APPENDIX D-continued

| CLASS ID | CHILD CLASS ID | MIN | MAX |
|---|---|---|---|
| 9 | 69 | 0 | 0 |
| 9 | 81 | 0 | 0 |
| 11 | 8 | 0 | 0 |
| 11 | 12 | 0 | 0 |
| 11 | 13 | 0 | 0 |
| 11 | 15 | 0 | 0 |
| 11 | 16 | 0 | 0 |
| 11 | 18 | 0 | 0 |
| 11 | 43 | 0 | 0 |
| 11 | 69 | 0 | 0 |
| 11 | 81 | 0 | 0 |
| 11 | 92 | 0 | 0 |
| 16 | 17 | 0 | 0 |
| 16 | 34 | 0 | 0 |
| 16 | 43 | 0 | 0 |
| 16 | 44 | 0 | 0 |
| 16 | 45 | 0 | 0 |
| 16 | 47 | 0 | 0 |
| 16 | 57 | 0 | 0 |
| 16 | 58 | 0 | 0 |
| 16 | 69 | 0 | 0 |
| 16 | 79 | 0 | 0 |
| 16 | 81 | 0 | 0 |
| 17 | 16 | 0 | 0 |
| 17 | 34 | 0 | 0 |
| 17 | 43 | 0 | 0 |
| 17 | 44 | 0 | 0 |
| 17 | 45 | 0 | 0 |
| 17 | 47 | 0 | 0 |
| 17 | 57 | 0 | 0 |
| 17 | 58 | 0 | 0 |
| 17 | 69 | 0 | 0 |
| 17 | 79 | 0 | 0 |
| 17 | 81 | 0 | 0 |
| 18 | 16 | 0 | 0 |
| 18 | 17 | 0 | 0 |
| 30 | 71 | 0 | 0 |
| 30 | 83 | 1 | 1 |
| 32 | 50 | 0 | 0 |
| 32 | 81 | 0 | 0 |
| 33 | 45 | 0 | 0 |
| 33 | 47 | 0 | 0 |
| 33 | 57 | 0 | 0 |
| 33 | 58 | 0 | 0 |
| 33 | 79 | 0 | 0 |
| 33 | 81 | 0 | 0 |
| 39 | 43 | 0 | 0 |
| 39 | 44 | 0 | 0 |
| 39 | 45 | 0 | 0 |
| 39 | 72 | 0 | 0 |
| 39 | 78 | 0 | 0 |
| 47 | 43 | 0 | 1 |
| 47 | 44 | 0 | 1 |
| 47 | 45 | 0 | 1 |
| 47 | 58 | 0 | 1 |
| 47 | 79 | 0 | 1 |
| 50 | 50 | 0 | 0 |
| 58 | 43 | 0 | 0 |
| 58 | 44 | 0 | 0 |
| 58 | 45 | 0 | 0 |
| 58 | 78 | 0 | 0 |
| 58 | 79 | 0 | 0 |
| 59 | 65 | 0 | 0 |
| 59 | 75 | 0 | 0 |
| 59 | 117 | 0 | 0 |
| 69 | 11 | 0 | 0 |
| 69 | 16 | 0 | 0 |
| 69 | 43 | 0 | 0 |
| 69 | 44 | 0 | 0 |
| 69 | 45 | 0 | 0 |
| 69 | 57 | 0 | 0 |
| 69 | 79 | 0 | 0 |
| 70 | 16 | 0 | 0 |
| 70 | 43 | 0 | 0 |
| 70 | 44 | 0 | 0 |
| 70 | 45 | 0 | 0 |
| 70 | 57 | 0 | 0 |
| 70 | 58 | 0 | 0 |
| 70 | 69 | 0 | 0 |
| 72 | 43 | 0 | 0 |
| 72 | 44 | 0 | 0 |
| 72 | 45 | 0 | 0 |
| 72 | 57 | 0 | 0 |
| 72 | 58 | 0 | 0 |
| 72 | 68 | 0 | 0 |
| 72 | 69 | 0 | 0 |
| 72 | 72 | 0 | 0 |
| 72 | 87 | 0 | 0 |
| 72 | 130 | 0 | 0 |
| 76 | 77 | 0 | 0 |
| 79 | 43 | 0 | 0 |
| 79 | 44 | 0 | 0 |
| 79 | 45 | 0 | 0 |
| 79 | 47 | 0 | 0 |
| 79 | 58 | 0 | 0 |
| 79 | 69 | 0 | 0 |
| 122 | 43 | 0 | 0 |
| 122 | 45 | 0 | 0 |
| 122 | 123 | 0 | 0 |
| 123 | 43 | 0 | 0 |
| 123 | 45 | 0 | 0 |
| 140 | 141 | 0 | 0 |
| 141 | 141 | 0 | 0 |
| 143 | 141 | 0 | 0 |

What is claimed is:

1. A method of storing a semantic representation of a machine, a manufacture, a composition of matter, a process, a system or a methodology, using a controlled taxonomy, comprising
   storing in a memory, a plurality of information objects,
   at least a first one of said information objects identifying (i) an attribute, and (ii) a value or value range or description for said attribute, without reference to the machine, manufacture, composition of matter, process, system or methodology to which the attribute relates,
   at least a second one of said information objects being a meaning object defining a meaning for said first information object relating to a machine, manufacture, composition of matter, process, system or methodology to which said attribute relates, said first information object including a pointer to said meaning object.

2. The method of claim 1 wherein each of said objects include properties characterizing the object and/or an attribute represented by the object.

3. The method of claim 2 wherein each of said objects are a member of an object class, objects in a common class having common properties.

4. The method of claim 2 wherein properties of said parent object include a pointer of said child object.

5. The method of claim 1 further comprising a third information object comprising an implication object identifying conditional characterizations of one or more properties, said first information object being a child of said implication object defining a condition for said conditional characterizations identifying circumstances under which said implication object provides relevant information about said properties based upon attribute values of said first information object.

6. The method of claim 5 further comprising a fourth information object comprising a THEN child of said implication object, said THEN child providing characterizations of one or more properties when said condition is met.

7. The method of claim 5 further comprising a fourth information object comprising an ELSE child of said implication object, said ELSE child providing characterizations of one or more properties when said condition is not met.

8. The method of claim 5 wherein said first information object defines a range, and further comprising fourth and fifth information objects comprising endpoint objects defining endpoints of said range.

9. The method of claim 5 wherein said first information object defines a value for an attribute.

10. The method of claim 9 wherein the value defined by said first information object is a predefined text value.

11. The method of claim 9 wherein the value defined by said first information object is a predefined text value.

12. The method of claim 5 wherein said first information object has an object operator property defining an operator to be applied to said value.

13. The method of claim 12 wherein said object operator is on of:

equal(=), not equal ($\neq$), greater than (>)

grater than or equal ($\geq$)

less than (<), or less than or equal ($\leq$).

14. The method of claim 5 wherein said first information object defines a group of conditions, and further comprising child objects of said first information object defining each of said conditions.

15. The method of claim 14 wherein said first information object has a child logic property indicating a logical relationship between said conditions that must be met for the condition to be met.

16. The method of claim 1 wherein said information objects are formatted in accordance with a computer based markup language.

17. The method of claim 16 wherein said information objects are formatted in accordance with Extensible Markup Language and incorporate an XML document type definition (DTD).

18. The method of claim 1 wherein said meaning object defines possible values for a controlled term that is an attribute of said first information object.

19. The method of claim 1 wherein said meaning object defines a type of a part or product.

20. The method of claim 19 further comprising comparing attributes of a part or product to values, value ranges or descriptions in said information objects.

21. The method of claim 1 wherein said meaning object defines a practice or procedure.

22. The method of claim 1 wherein said meaning object defines an agreement.

23. The method of claim 1 wherein said meaning object defines research data.

24. The method of claim 1 wherein said meaning object defines technical information relevant to business or legal analysis.

25. Apparatus for storing a semantic representation of a machine, a manufacture, a composition of matter, a process, a system or a methodology, using a controlled taxonomy, comprising storage containing a plurality of information objects, at least a first one of said information objects identifying (i) an attribute and (ii) a value or value range or description for said attribute, without reference to the machine, manufacture, composition of matter, process, system or methodology to which the attribute relates, at least a second one of said information objects being a meaning object defining a meaning for said first information object relating to a machine, manufacture, composition of matter, process, system or methodology to which said attribute relates, said first information object including a pointer to said meaning object.

26. The apparatus of claim 25 wherein said meaning object defines a type of a part or product.

27. The apparatus of claim 26 further comprising a processor comparing attributes of a part or product to values, value ranges or descriptions in said information objects.

* * * * *

UNITED STATES PATENT AND TRADEMARK OFFICE
CERTIFICATE OF CORRECTION

PATENT NO. : 6,658,428 B2
APPLICATION NO. : 10/144104
DATED : December 2, 2003
INVENTOR(S) : Dan Z. Sokol, Igor K. Berkovich and Oleg V. Dashevsky It is certified that error appears in the above-identified patent and that said Letters Patent is hereby corrected as shown below:

Column 1, line 55, delete "document than", insert --document that--,

Column 2
Line 8, delete "Internet There", insert --Internet. There--.
Line 21, delete "interpretation These", insert --interpretation. These--.
Line 39, delete "structures These", insert --structures. These--.

Column 3
Line 18, delete "taxonomy The", insert --taxonomy. The--.
Line 47, delete "in an hierarchy", insert --in a hierarchy--.

Column 4
Line 1, delete "accordance the", insert --accordance with the--.
Line19, delete "the invention,", insert --the invention;--.

Column 5
Line 29, delete "invention Additional", insert --invention. Additional--.
Line 30, delete "also connection to", insert --also connected to--.

Column 6, line 48, delete "specification As", insert --specification. As--.

Column 7,
Line 1, delete "fields store", insert --fields that store--.
Line 47, delete "parameter are.", insert --parameter are:--.

Column 8
Line 27, delete "Fig. 260", insert --object 260--.
Line 43, delete "object The", insert --object. The--.
Line 48, delete "indication the", insert --indication of the--.
Line 63, delete "(=), "not equal' (≠)", insert --(=), 'not equal' (≠)--.
Line 67, delete "range,", insert --range),--.

UNITED STATES PATENT AND TRADEMARK OFFICE
CERTIFICATE OF CORRECTION

| | |
|---|---|
| PATENT NO. | : 6,658,428 B2 |
| APPLICATION NO. | : 10/144104 |
| DATED | : December 2, 2003 |
| INVENTOR(S) | : Dan Z. Sokol, Igor K. Berkovich and Oleg V. Dashevsky |

It is certified that error appears in the above-identified patent and that said Letters Patent is hereby corrected as shown below:

Column 9
Line 1, delete "range.", insert --range).--.
Line 11, delete "discussion in FIG. 3", insert --discussion of FIG. 3--.
Line 30, delete "can he obtained", insert --can be obtained--.
Line 40, delete "definition 100", insert --definition 100.--.
Line 43, delete "may he made", insert --may be made--.
Line 44, delete "hierarchal", insert --hierarchical--.
Line 51, delete "that be", insert --that can be--.
Line 53, delete "added A", insert --added. A--.
Line 55, delete "object Where", insert --object. Where--.
Lines 58-59, delete "class The", insert --class. The--.

Column 10, line 47, delete "and therefore and is", insert --and therefore is--.

Column 11
Line 8, delete "air Pyrometry", insert --air. Pyrometry--.
Line 14, delete "apply An tree", insert --apply. A tree--.
Line 16, delete "FIG. 3", insert --FIG. 3.--.
Line 22, delete "This application", insert --For reference by the reader, Appendix A to this application--.
Line 55, delete "substantially number", insert --substantially greater number--.

Column 12
Lines 1-2, delete "class Each", insert --class. Each--.
Line 7, delete "class In", insert --class. In--.
Line 42, delete "a object", insert --an object--.
Lines 48-49, delete "specification These", insert --specification. These--.
Lines 62-63, delete "step These", insert --step. These--.

UNITED STATES PATENT AND TRADEMARK OFFICE
CERTIFICATE OF CORRECTION

| | | |
|---|---|---|
| PATENT NO. | : 6,658,428 B2 | |
| APPLICATION NO. | : 10/144104 | |
| DATED | : December 2, 2003 | |
| INVENTOR(S) | : Dan Z. Sokol, Igor K. Berkovich and Oleg V. Dashevsky | |

It is certified that error appears in the above-identified patent and that said Letters Patent is hereby corrected as shown below:

Column 13
Line 9, delete "33 Properties", insert --33. Properties--.
Line 23, delete "circumstances One", insert --circumstances. One--.
Line 32, delete "having d value", insert --having a value--.
Line 33, delete "field 93-54,", insert --fields 93-154,--.

Column 14
Line 21, delete "objects Predefined", insert --objects. Predefined--.
Lines 50-51, delete "controlled tern "die forgin-g"Each", insert --controlled term "die forging". Each--.
Line 61, delete "controlled tern", insert --controlled term--.

Column 15
Line 5, delete "that of any", insert --that if any--.
Line 39, delete "treatment steps", insert --treatment step--.
Line 59, delete "properties illustrated", insert --properties are illustrated--.

Column 17
Line 32, delete "a customers request", insert --a customer's request--.
Line 47, delete "232 As", insert --232. As--.

Column 18
Line 5, delete "specifications deals", insert --specification deals--.
Line 43, delete "for references objects", insert --for reference objects--.
Line 56, delete "the customers", insert --the customer's--.

UNITED STATES PATENT AND TRADEMARK OFFICE
CERTIFICATE OF CORRECTION

PATENT NO. : 6,658,428 B2
APPLICATION NO. : 10/144104
DATED : December 2, 2003
INVENTOR(S) : Dan Z. Sokol, Igor K. Berkovich and Oleg V. Dashevsky It is certified that error appears in the above-identified patent and that said Letters Patent is hereby corrected as shown below:

Column 19
Line 13, delete "Because of procedure", insert --Because procedure--.
Line 14, delete "parameters with override", insert --parameters will override--.
Line 29, delete "specification are", insert --specifications are--.
Line 35, delete "computer be", insert --computer by--.
Line 44, delete "readily be resolved", insert --readily resolved--.
Lines 50-51, delete "customers order.", insert --customer's order.--.
Line 59, delete "information is included", insert --information are included--.

Column 20
Line 4, delete "customers references", insert --customer's references--.
Line 10, delete "applied a fulfillment", insert --applied in fulfillment--.
Line 20, delete "object 272", insert --object 274--.
Line 38, delete "272 Each", insert --272. Each--.
Line 52, delete "level is references,", insert --level references,--.
Line 57-58, delete "object °123" This", insert --object "123". This--.
Lines 61-62, delete "called "A" Procedure", insert --called "A". Procedure--.

Column 21, line 29, delete "thus, thus", insert --thus--.

Column 23
Line 6, delete "application the", insert --application of the--.
Line 50, delete "will continued", insert --will continue--.

UNITED STATES PATENT AND TRADEMARK OFFICE
CERTIFICATE OF CORRECTION

PATENT NO. : 6,658,428 B2
APPLICATION NO. : 10/144104
DATED : December 2, 2003
INVENTOR(S) : Dan Z. Sokol, Igor K. Berkovich and Oleg V. Dashevsky It is certified that error appears in the above-identified patent and that said Letters Patent is hereby corrected as shown below:

Column 24
Line 36, delete "procedure In", insert --procedure. In--.
Line 51, delete "retrieved After", insert --retrieved. After--.
Line 59, delete "objects' reference", insert --object's reference--.
Line 64, delete "revision If", insert --revision. If--.

Column 25, line 8, delete "objects' reference", insert --object's reference--.

Column 26
Line 43, delete "preformed", insert --performed--.
Line 52, delete "7J If", insert --7J. If--.
Line 54, delete "7K If", insert --7K. If--.

Column 27, line 65, delete "described As", insert --described. As--.

Column 28
Line 5, delete "that the there", insert --that there--.
Line 10, delete "children is", insert --children are--.
Lines 14-15, delete "children Accordingly,", insert --children. Accordingly,--.
Line 47, delete "7E, in processing", insert --7E, processing--.
Line 50, delete "exists only to convey information to users, and no to", insert --exist only to convey information to users, and not to--.
Line 56, delete "step 4389", insert --step 438--.

UNITED STATES PATENT AND TRADEMARK OFFICE
CERTIFICATE OF CORRECTION

PATENT NO.      : 6,658,428 B2
APPLICATION NO. : 10/144104
DATED           : December 2, 2003
INVENTOR(S)     : Dan Z. Sokol, Igor K. Berkovich and Oleg V. Dashevsky It is certified that error appears in the above-identified patent and that said Letters Patent is hereby corrected as shown below:

Column 29
Line 6, delete "the objects special", insert --the object's special--.
Line 14, delete "456 After either step 456 of step", insert --456. After either step 456 or step--.
Line 18, delete "then-stops", insert --then stops--.
Line 37, delete "tree of in", insert --tree in--.
Line 59, delete "tree In", insert --tree. In--.

Column 30
Line 42, delete "568 in all", insert --568 and all--.
Line 62, delete "the retrieve of", insert --the retrieval of--.
Line 66, delete "to the results to the results", insert --to the results--.

Column 33
Line 38, delete "the Input parent", insert --the input parent--.
Line 48, delete "below If", insert --below. If--.
Line 56, delete "pointed in", insert --pointer in--.
Line 59, delete "778, it", insert --778, if--.
Line 63, delete "compatibility If", insert --compatibility. If--.

Column 35
Line 16, delete "to he taken", insert --to be taken--.
Line 27, delete first occurrence of "of FIG 9B".
Line 42, delete first occurrence of "of FIG 9C".
Line 45, delete first occurrence of "of FIG 9C".
Line 58, delete first occurrence of "of FIG 9B".
Line 63, delete first occurrence of "of FIG 9B".

UNITED STATES PATENT AND TRADEMARK OFFICE
CERTIFICATE OF CORRECTION

PATENT NO.       : 6,658,428 B2
APPLICATION NO. : 10/144104
DATED            : December 2, 2003
INVENTOR(S)      : Dan Z. Sokol, Igor K. Berkovich and Oleg V. Dashevsky It is certified that error appears in the above-identified patent and that said Letters Patent is hereby corrected as shown below:

Column 36
Line 11, delete first occurrence of "of FIG 9B".
Line 19, delete first occurrence of "of FIG 9B".

Column 37, line 24, delete "then step", insert --then in step--.

Column 38
Line 11, delete "will he noted", insert --will be noted--.
Line 25, delete "is grater", insert --is greater--.

In the appendix, in Column 49, line 40; Column 51, line 35; Column 53, line 25; Column 53, line 60; Column 57, line 25; Column 59, line 25; Column 61, line 25; Column 63, line 25; Column 65, line 30; Column 65, line 60; Column 69, line 35; Column 71, line 40; Column 73, line 25; Column 75, line 20; Column 75, line 50; Column 77, line 45; Column 79, line 45; Column 81, line 45; Column 83, line 25; Column 83, line 55; Column 85, line 45; Column 87, line 45; Column 89, line 45; Column 91, line 45; Column 93, line 25; Column 95, line 25; Column 97, line 20; Column 97, line 55; Column 99, line 45; Column 101, line 45; Column 103, line 45; Column 105, line 40; Column 107, line 35; Column 109, line 30; Column 111, line 10; Column 111, line 45; Column 113, line 45; Column 115, line 40; Column 117, line 40; Column 119, line 35; Column 121, line 30; Column 121, line 50; Column 123, line 45; Column 125, line 45; Column 127, line 40; Column 129, line 35; Column 131, line 30; Column 133, line 25; Column 133, line 55; Column 135, line 50; Column 137, line 45; Column 139, line 45; Column 141, line 40; Column 143, line 30; Column 143, line 55; Column 147, line 30; and, Column 149, line 30, delete "Yeild", insert --Yield--.

UNITED STATES PATENT AND TRADEMARK OFFICE
CERTIFICATE OF CORRECTION

PATENT NO. : 6,658,428 B2
APPLICATION NO. : 10/144104
DATED : December 2, 2003
INVENTOR(S) : Dan Z. Sokol, Igor K. Berkovich and Oleg V. Dashevsky It is certified that error appears in the above-identified patent and that said Letters Patent is hereby corrected as shown below:

In the appendix, Column 164, line 54, delete "Agreement", insert --Agreement Title--.

In the appendix, Column 165, line 40, insert missing line, "26 2 City 0".

In the appendix, Column 165, line 48, delete "31", insert --30--.

In the appendix, Column 166, line 14, delete "Family", insert --Family Name--.

In the appendix, Column 167, line 26, delete "Lof", insert --Log--.

In the appendix, Column 167, line 30, delete "93", insert --92--.

Column 170
Claim 1, line 38, delete "relates,", insert --relates; and,--.
Claim 2, line 46, delete "include properties", insert --includes properties--.
Claim 3, line 48, delete "objects are", insert --objects is--.
Claim 4, line 52, delete "pointer to", insert --pointer of--.

Column 171
Claim 10, line 10, delete "is a predefined text value.", insert --is a numeric value.--.
Claim 13, line 17, delete "is on of:", insert --is one of:--.
Claim 13, line 20, delete "($>$)", insert --($>$),--.
Claim 13, line 21, delete "($\geq$)", insert --($\geq$),--.

UNITED STATES PATENT AND TRADEMARK OFFICE
CERTIFICATE OF CORRECTION

PATENT NO. : 6,658,428 B2
APPLICATION NO. : 10/144104
DATED : December 2, 2003
INVENTOR(S) : Dan Z. Sokol, Igor K. Berkovich and Oleg V. Dashevsky It is certified that error appears in the above-identified patent and that said Letters Patent is hereby corrected as shown below:

Column 172, Claim 25, line 26, delete "relates,", insert --relates; and,--.

Signed and Sealed this

Twelfth Day of September, 2006

JON W. DUDAS
*Director of the United States Patent and Trademark Office*